Figure 5:
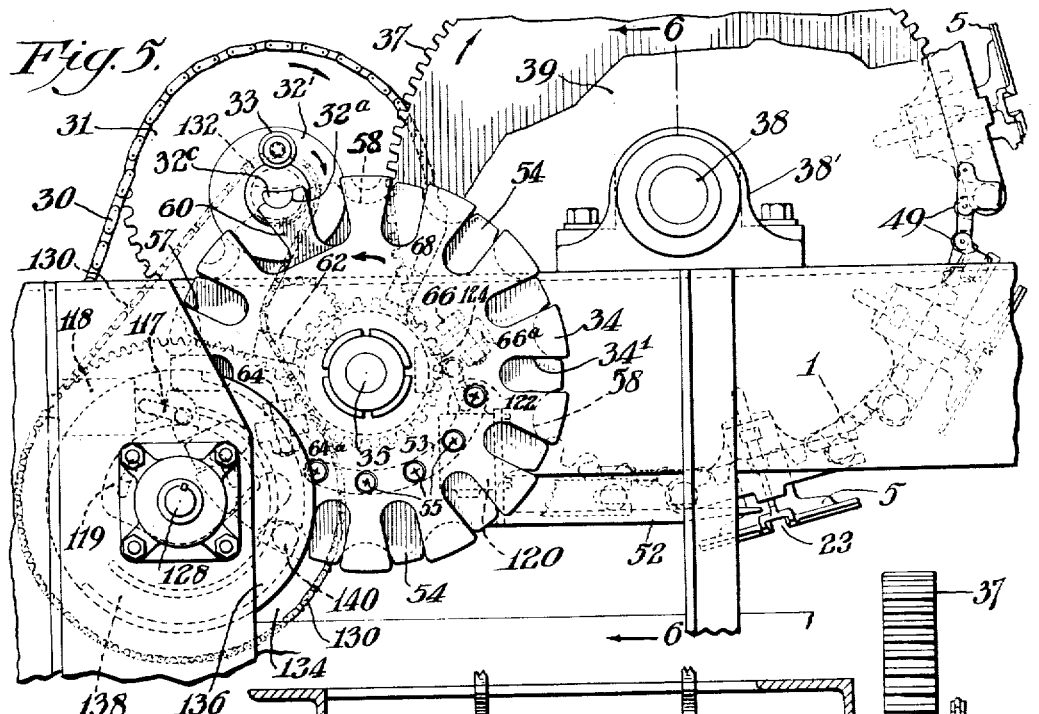

Nov. 21, 1950      E. H. SCHMIDT      2,530,484
MACHINE FOR MAKING COMPOSITE STRUCTURES
Filed Nov. 19, 1947      26 Sheets-Sheet 1
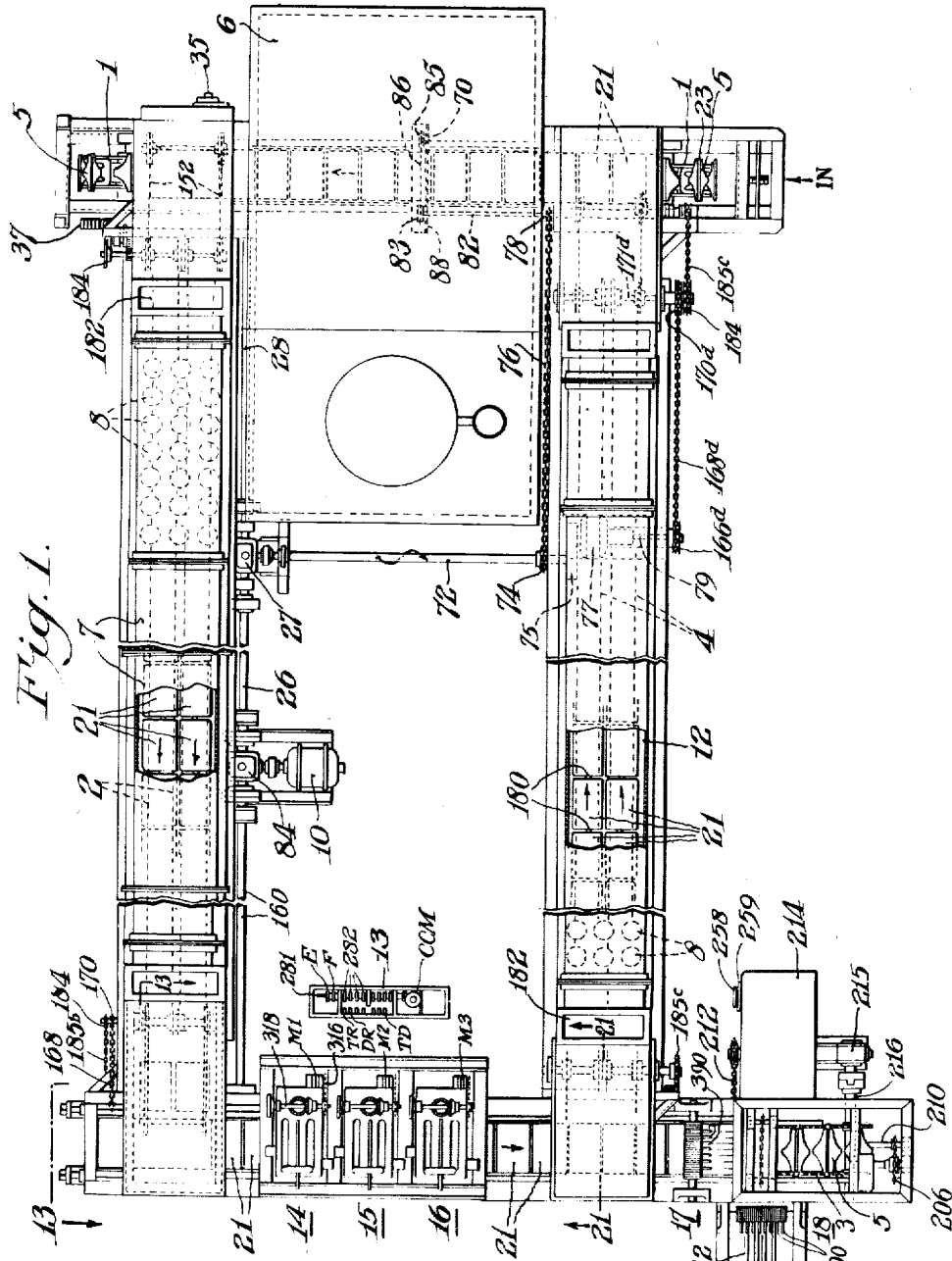
INVENTOR.
Edgar H. Schmidt
BY
Walter C. Wheeler
ATTORNEY

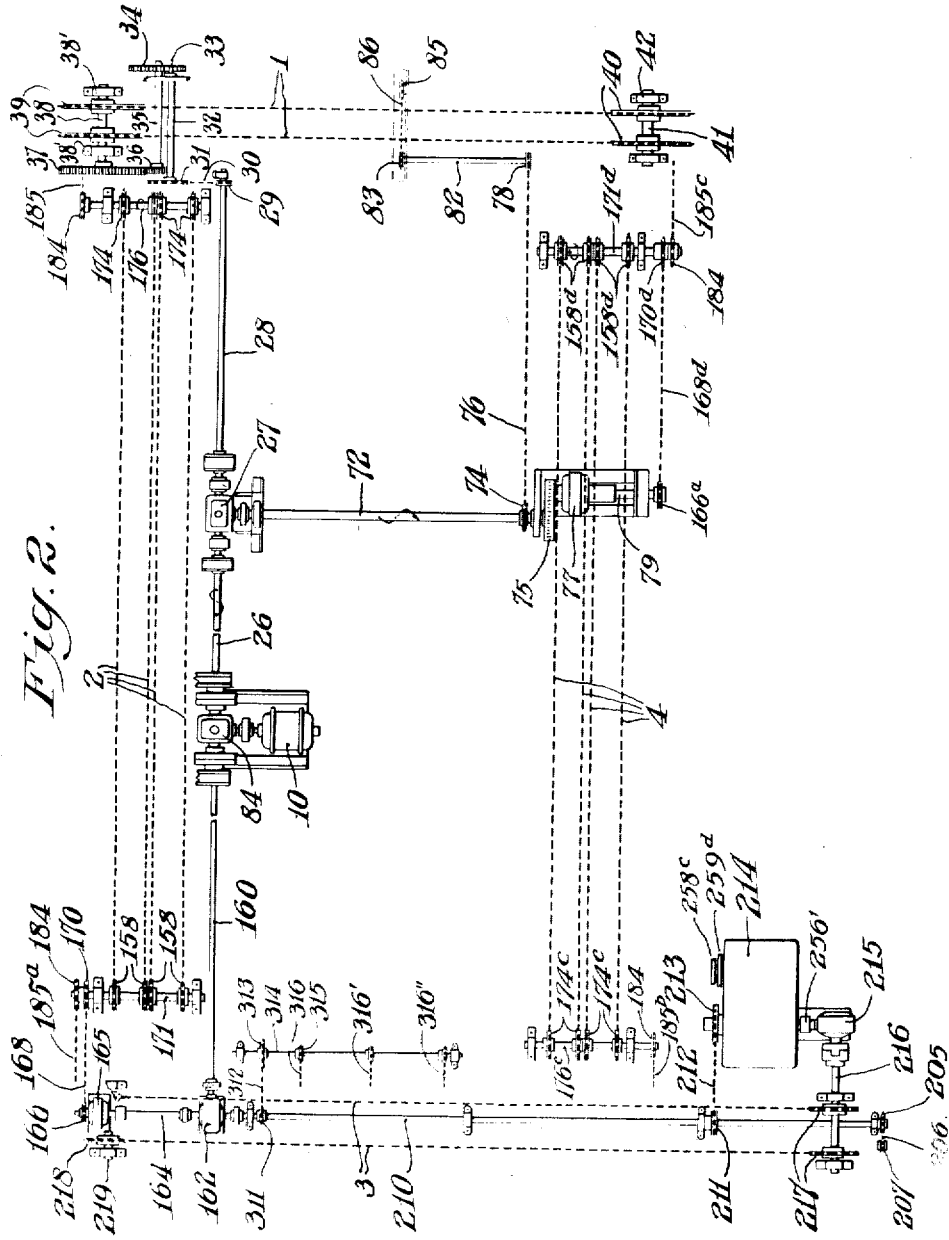

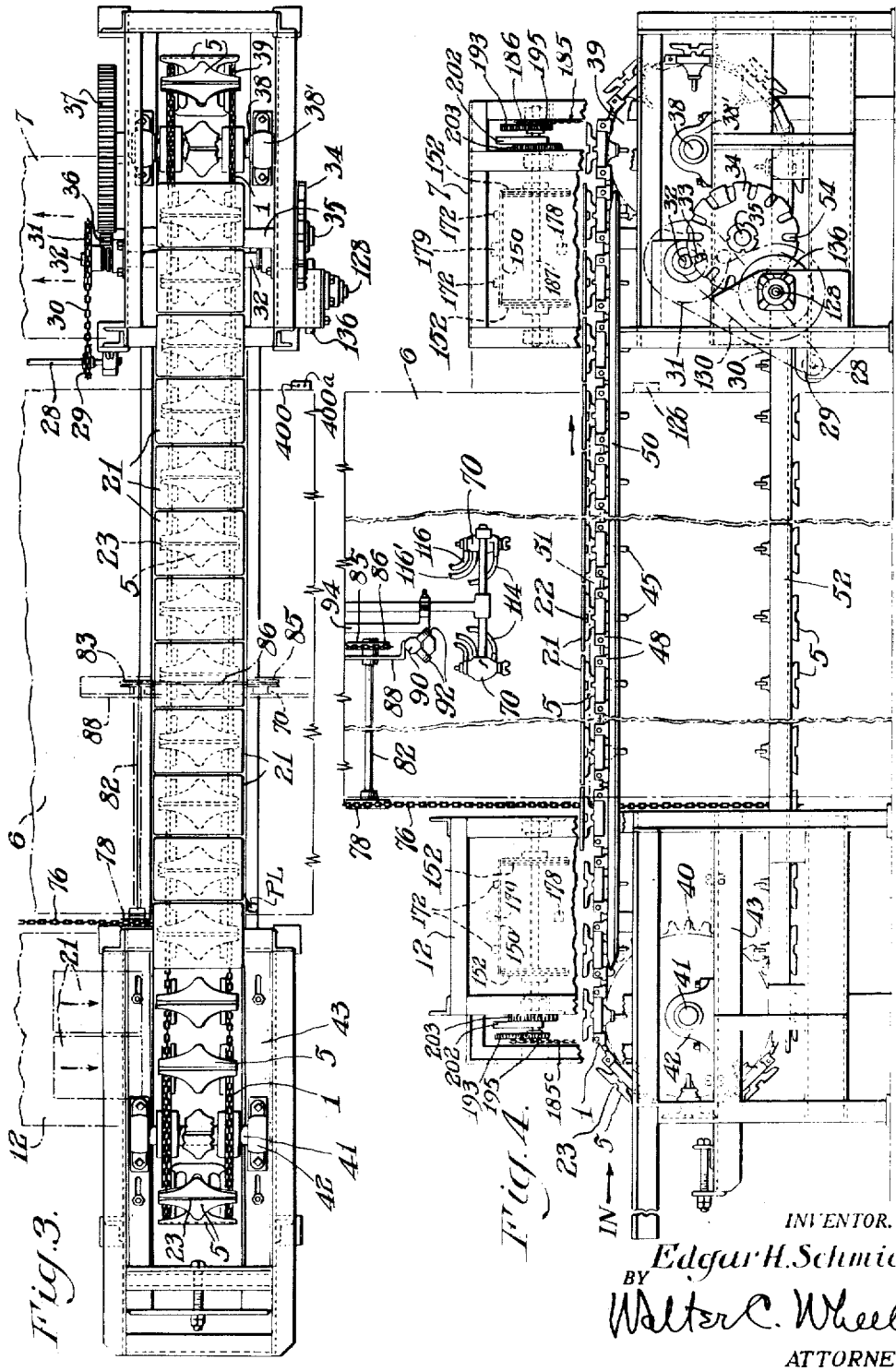

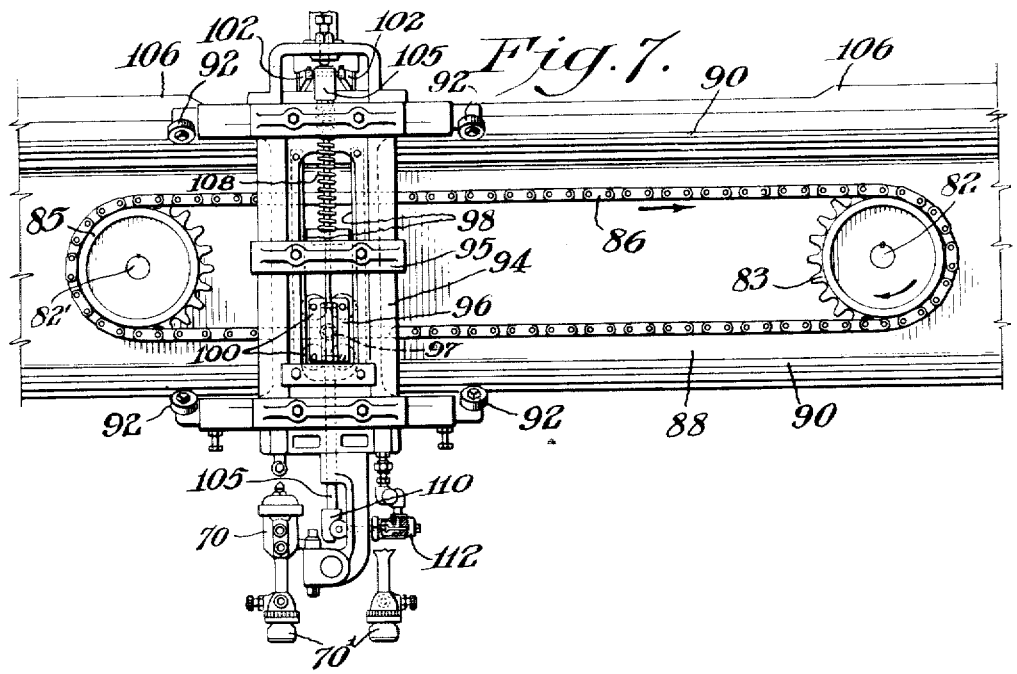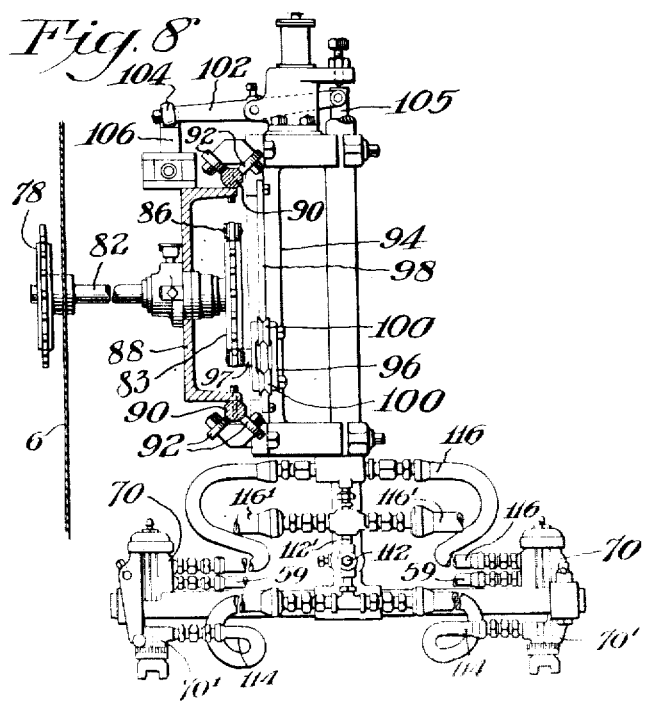

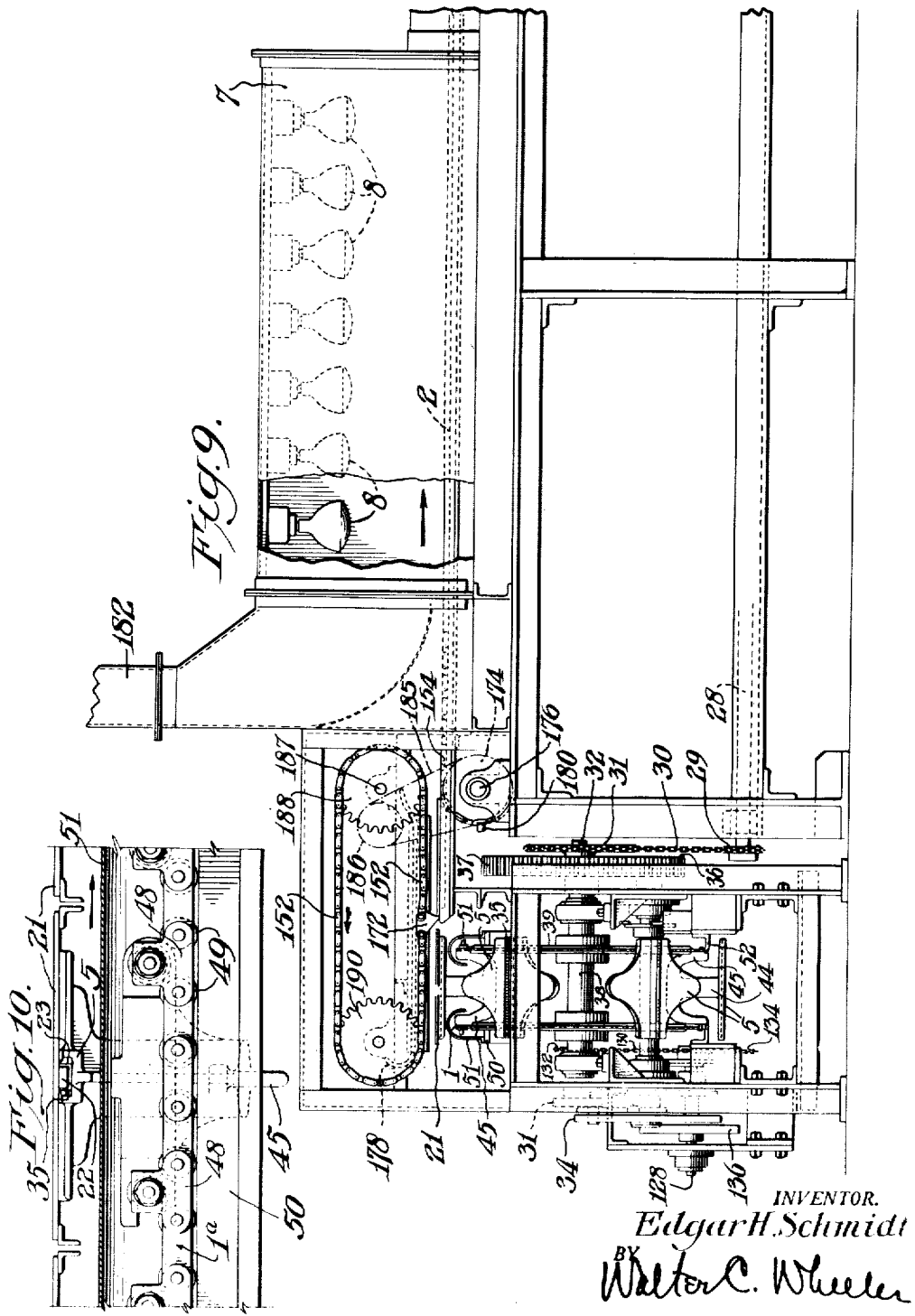

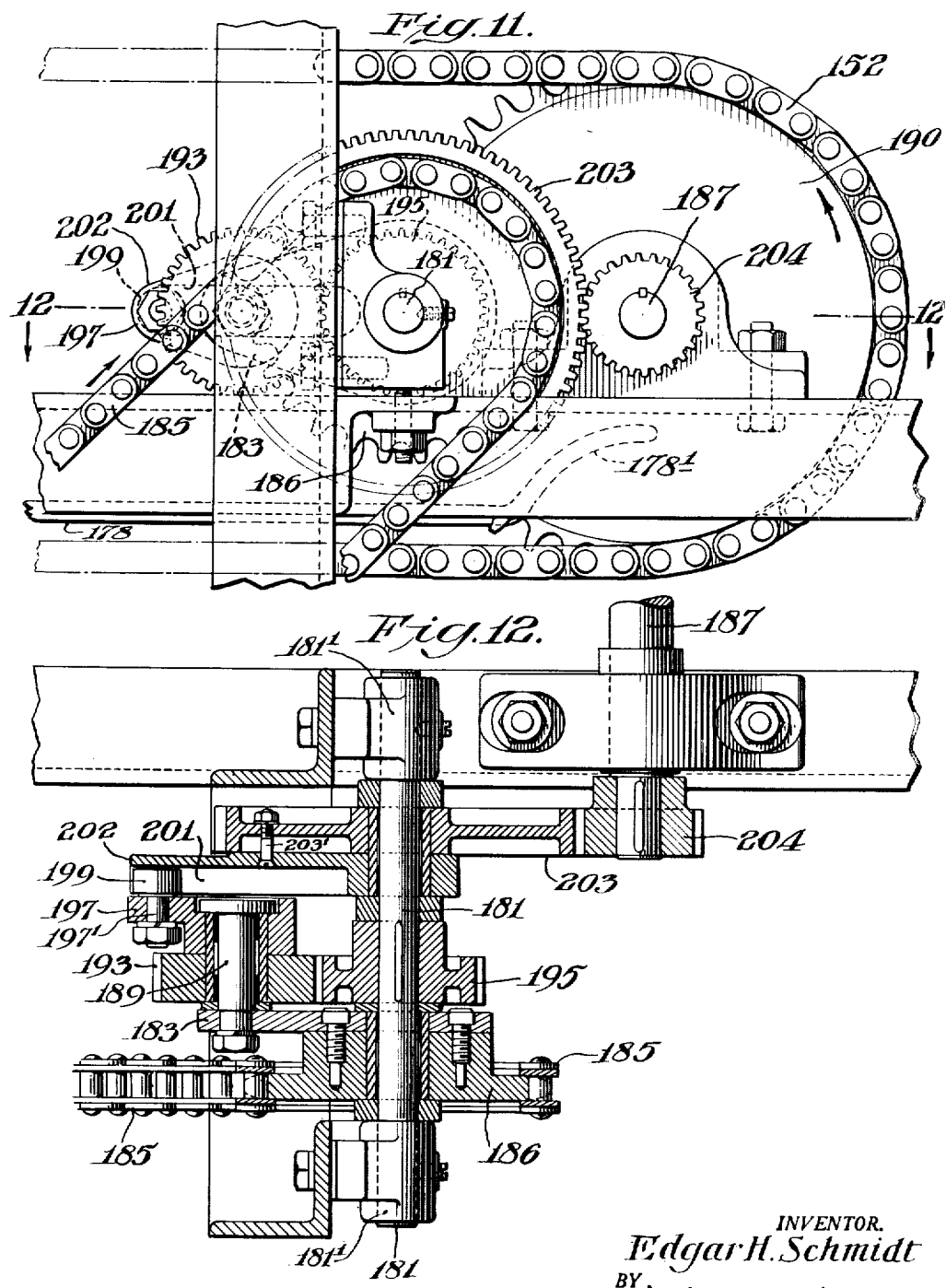

Nov. 21, 1950  E. H. SCHMIDT  2,530,484
MACHINE FOR MAKING COMPOSITE STRUCTURES
Filed Nov. 19, 1947  26 Sheets-Sheet 8
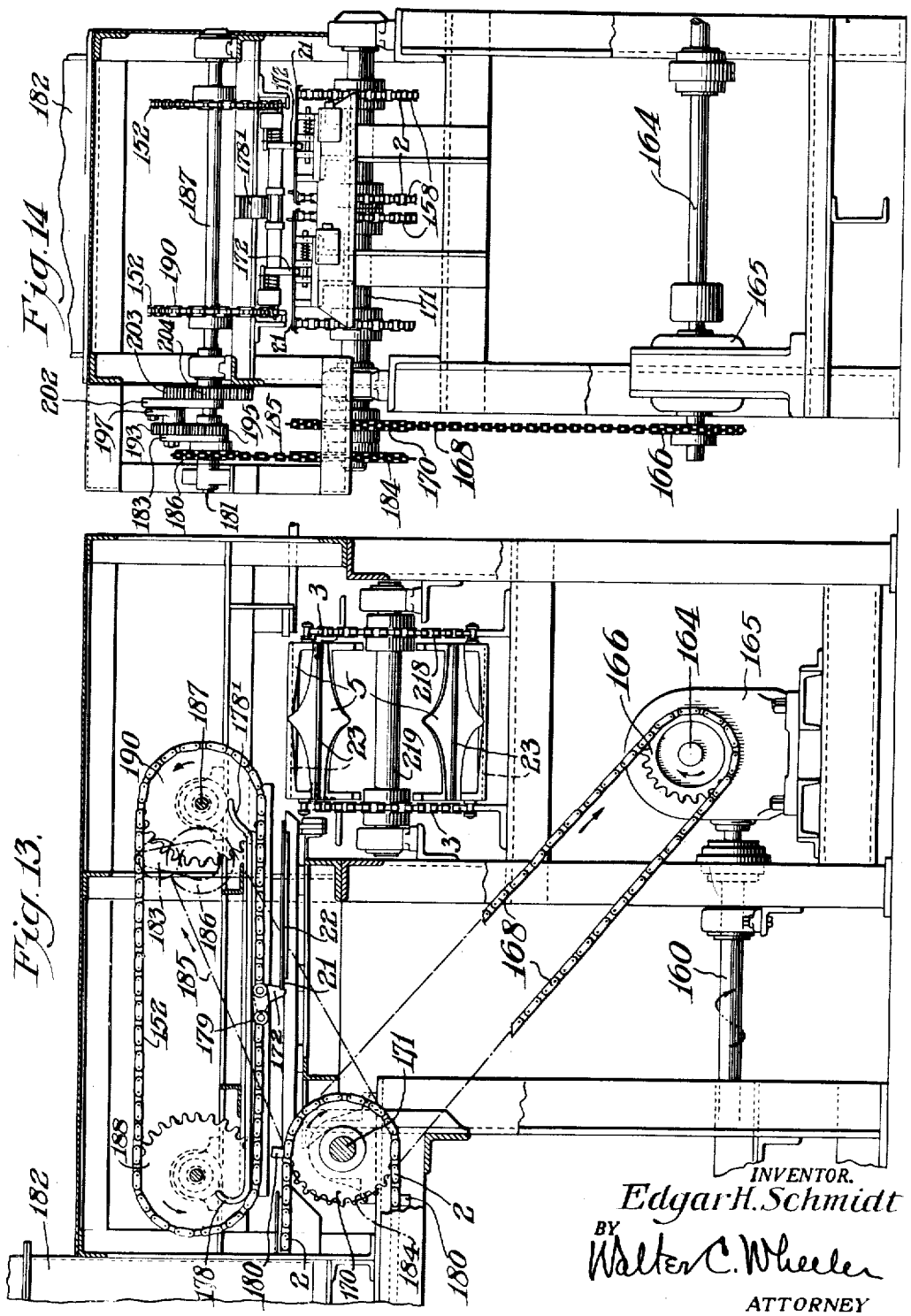
INVENTOR.
Edgar H. Schmidt
BY
Walter C. Wheeler
ATTORNEY

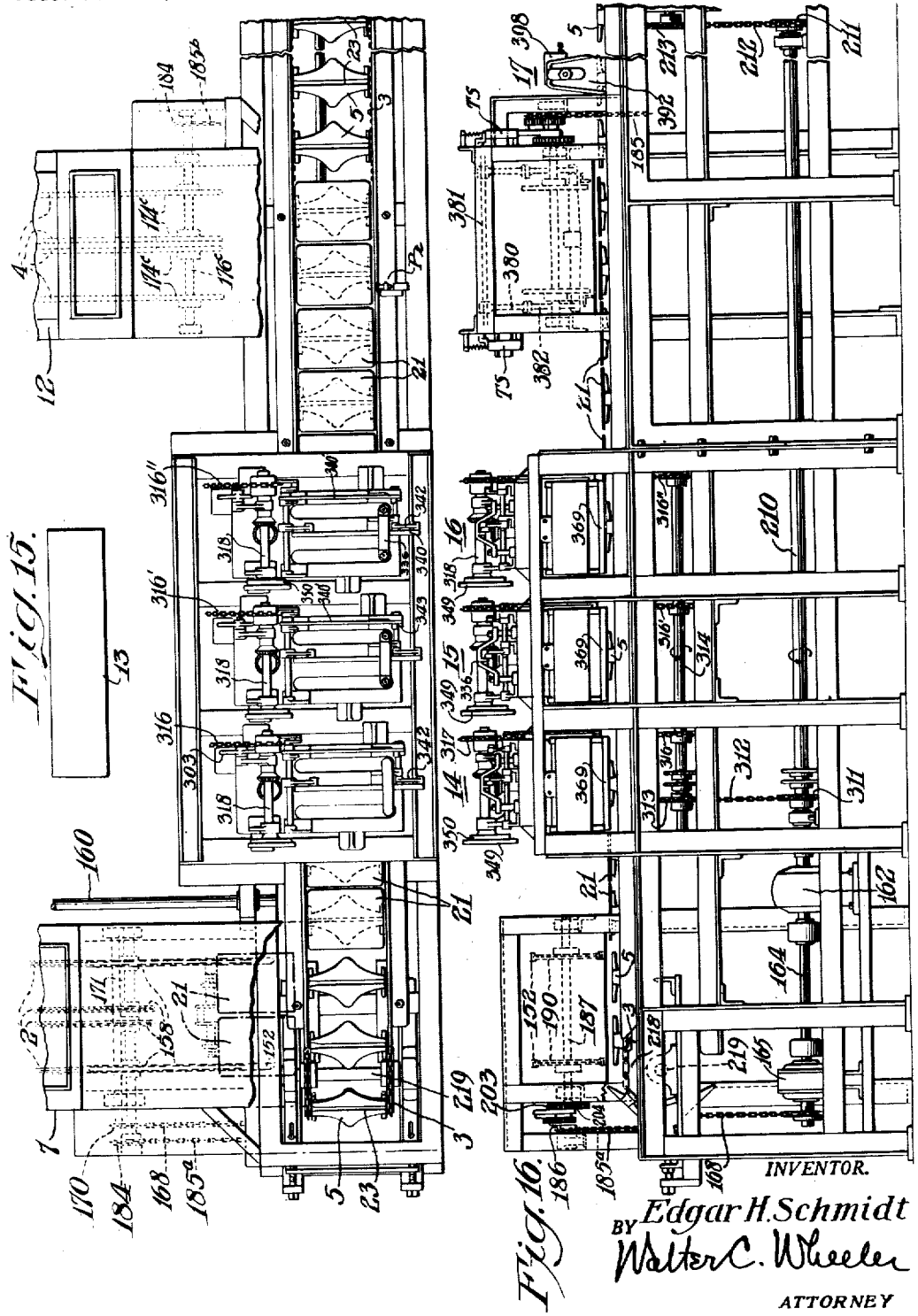

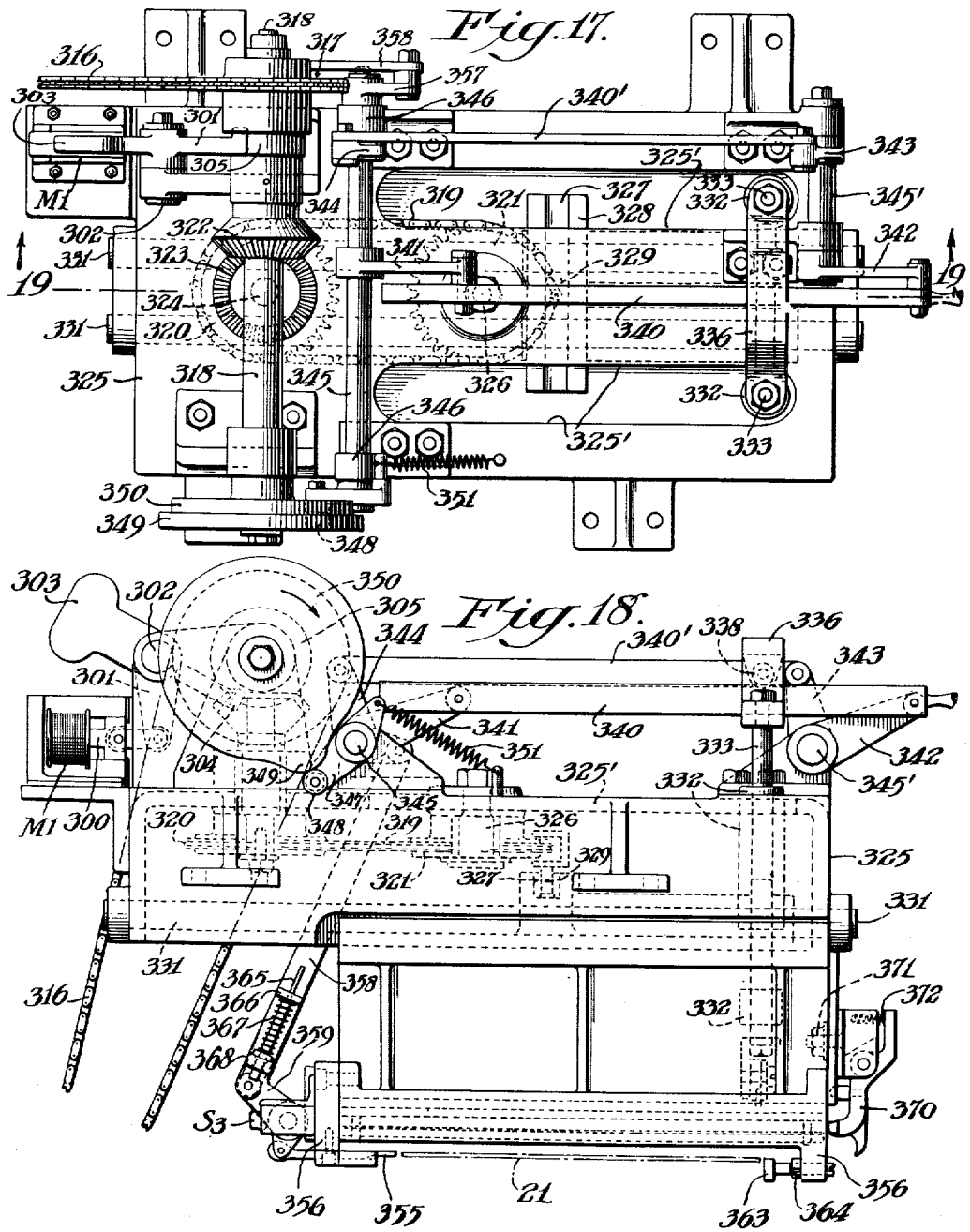

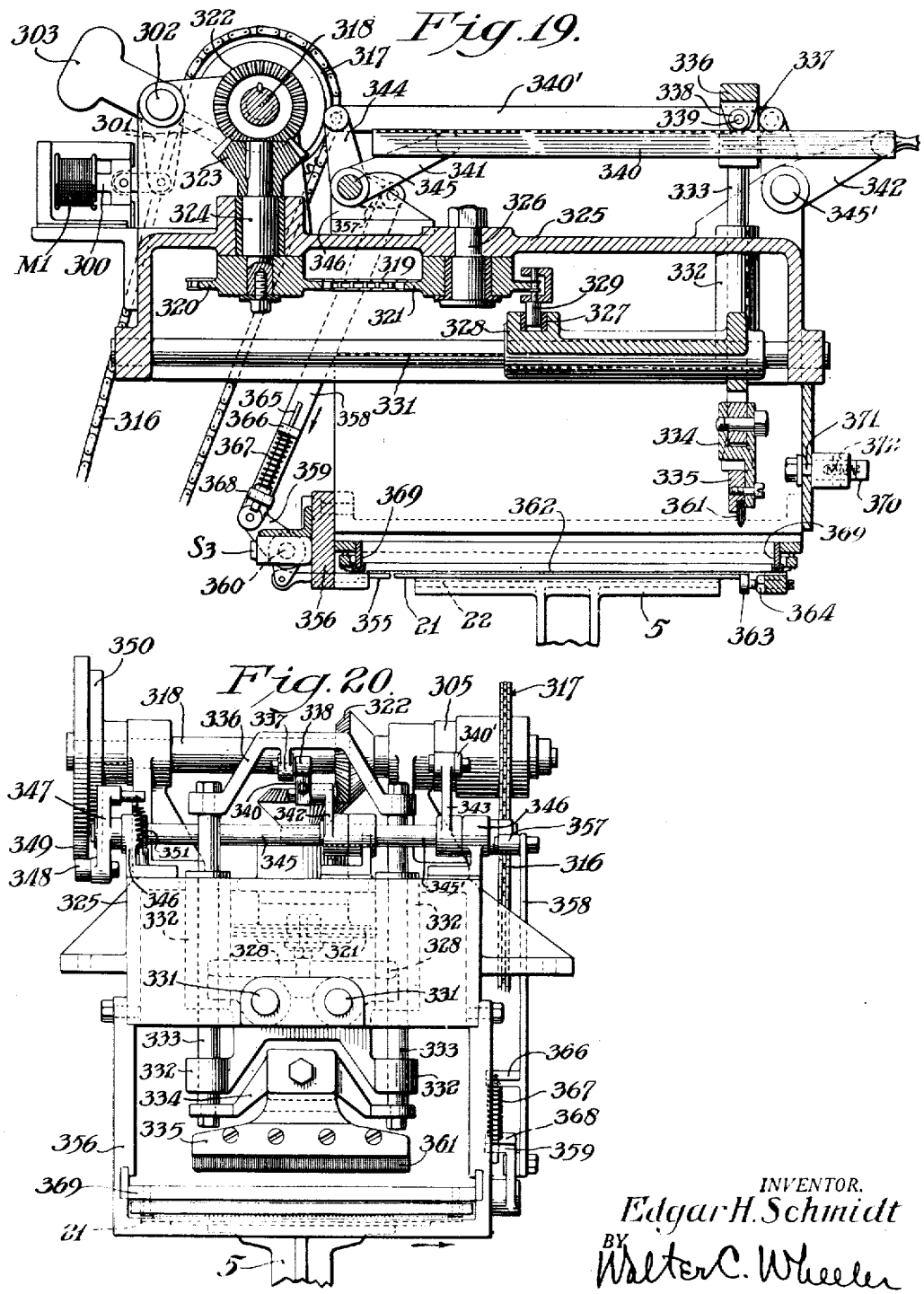

Nov. 21, 1950 — E. H. SCHMIDT — 2,530,484
MACHINE FOR MAKING COMPOSITE STRUCTURES
Filed Nov. 19, 1947 — 26 Sheets-Sheet 12
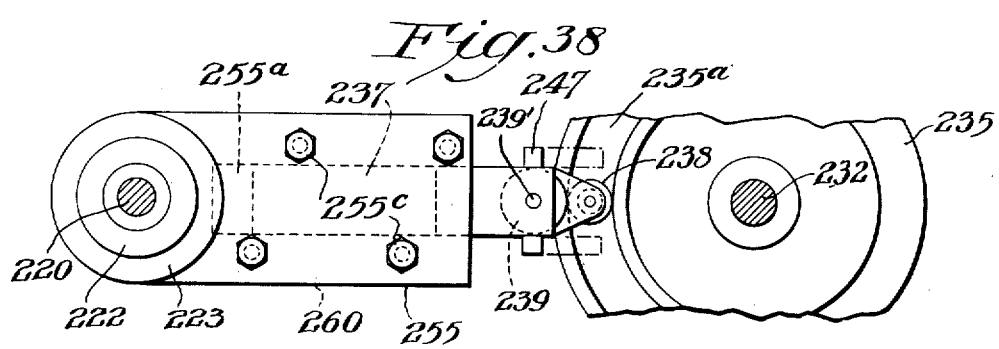
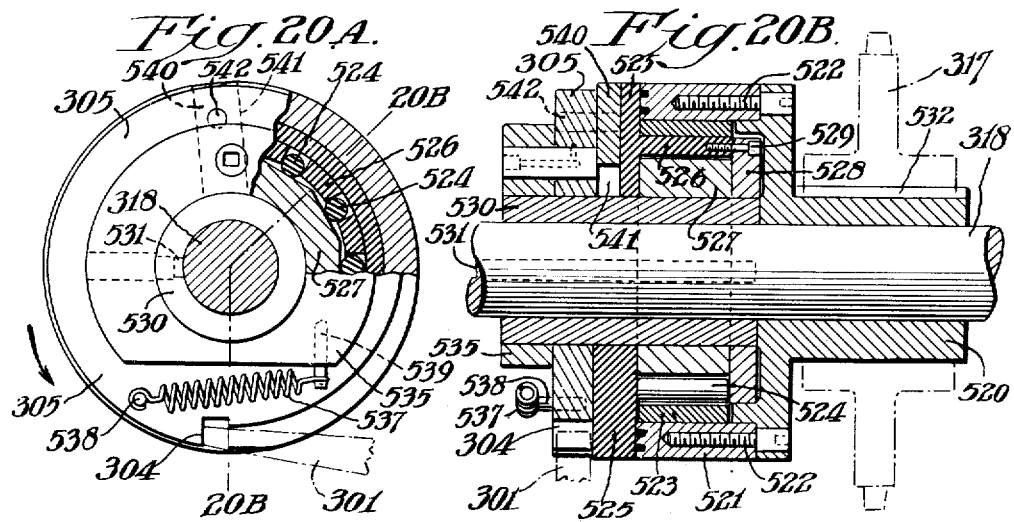
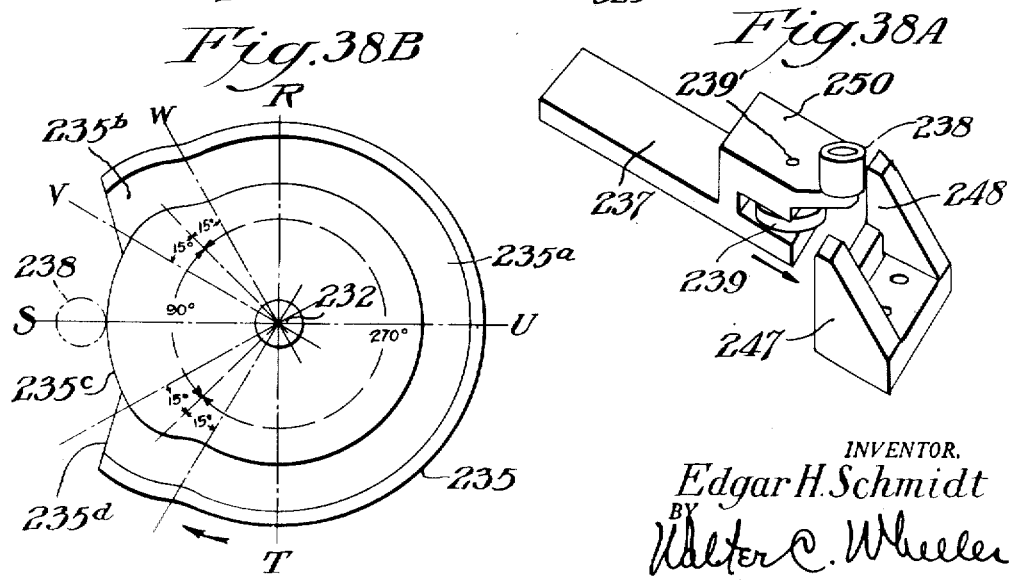
INVENTOR.
Edgar H. Schmidt
BY
Walter C. Wheeler
ATTORNEY

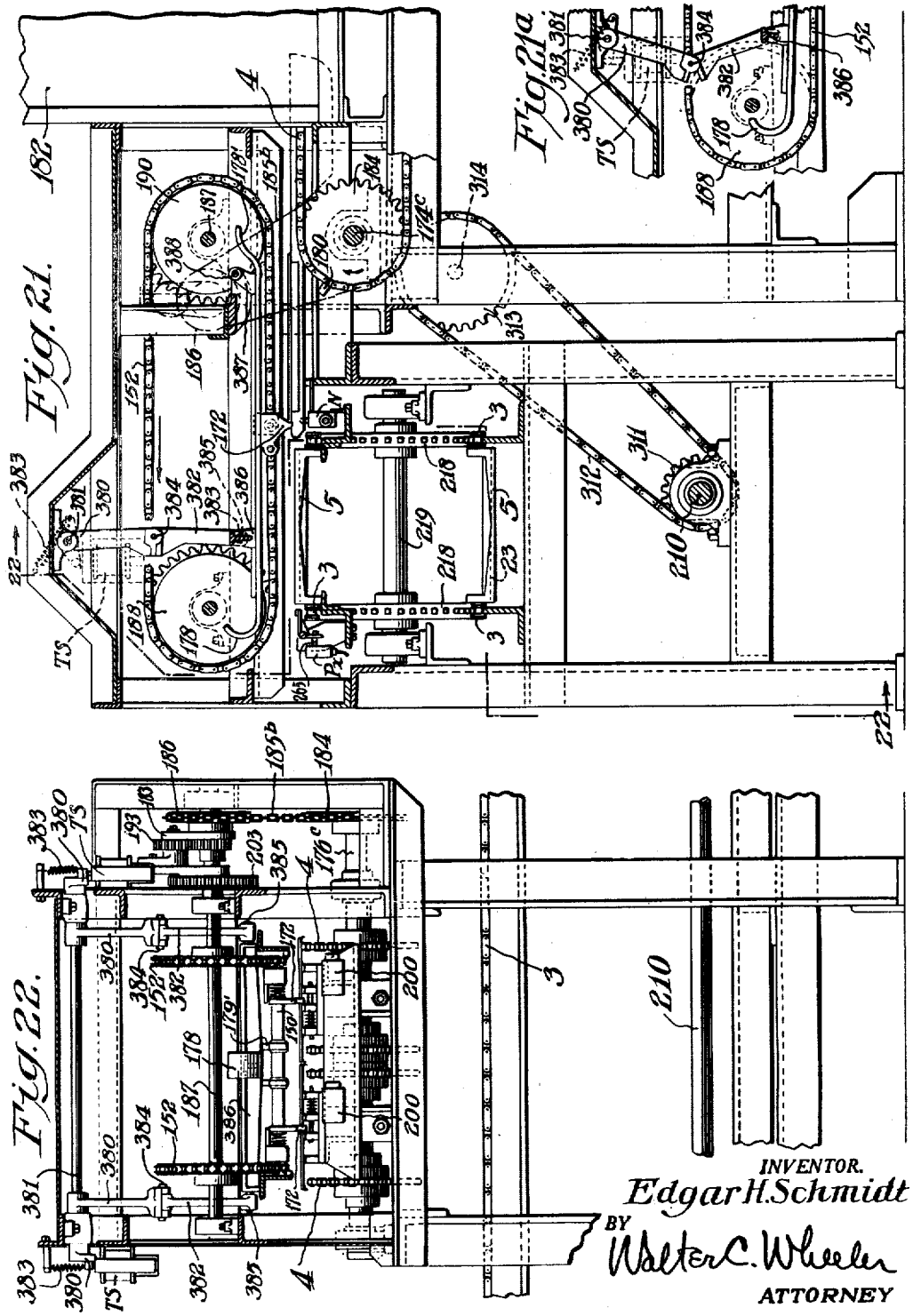

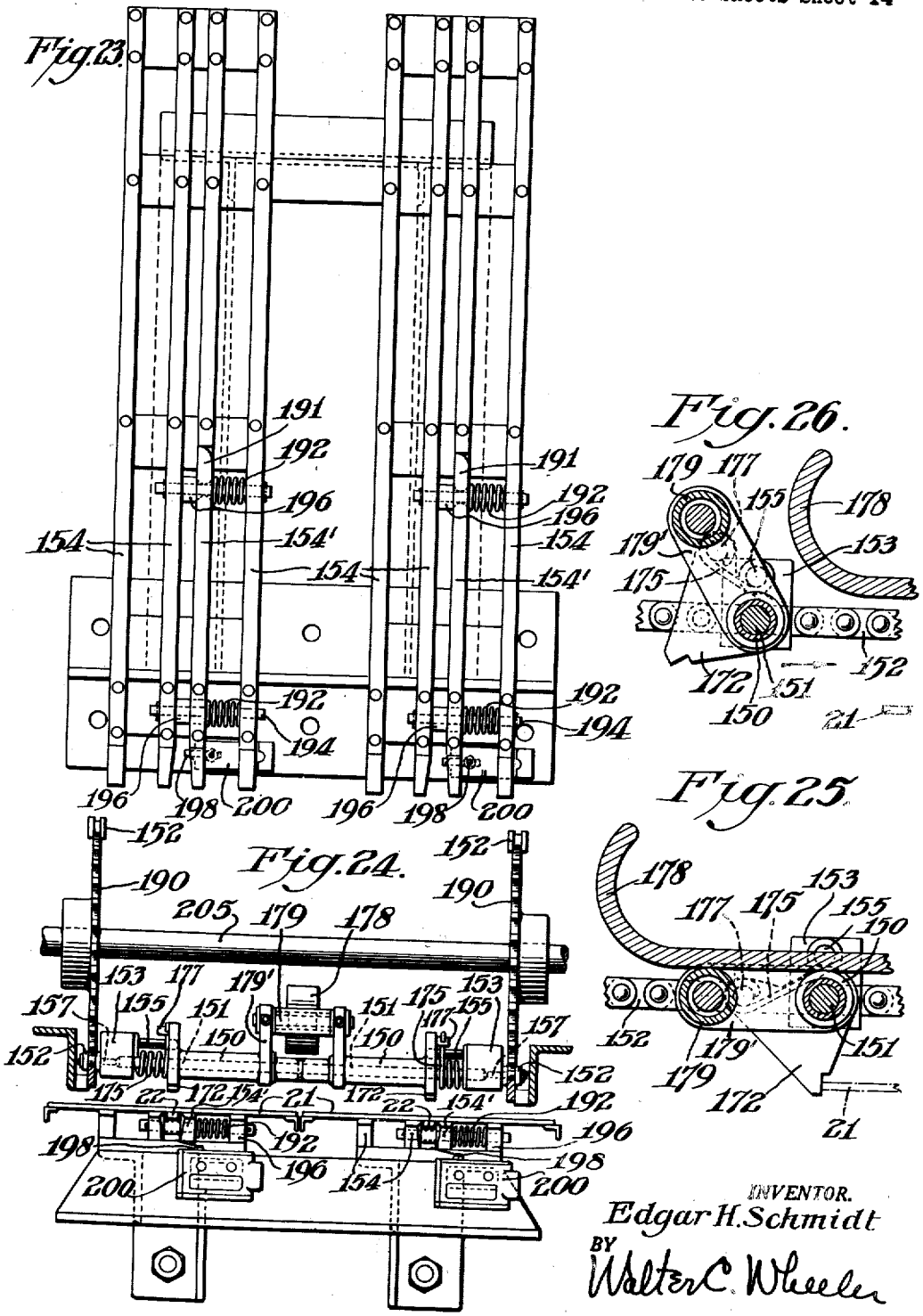

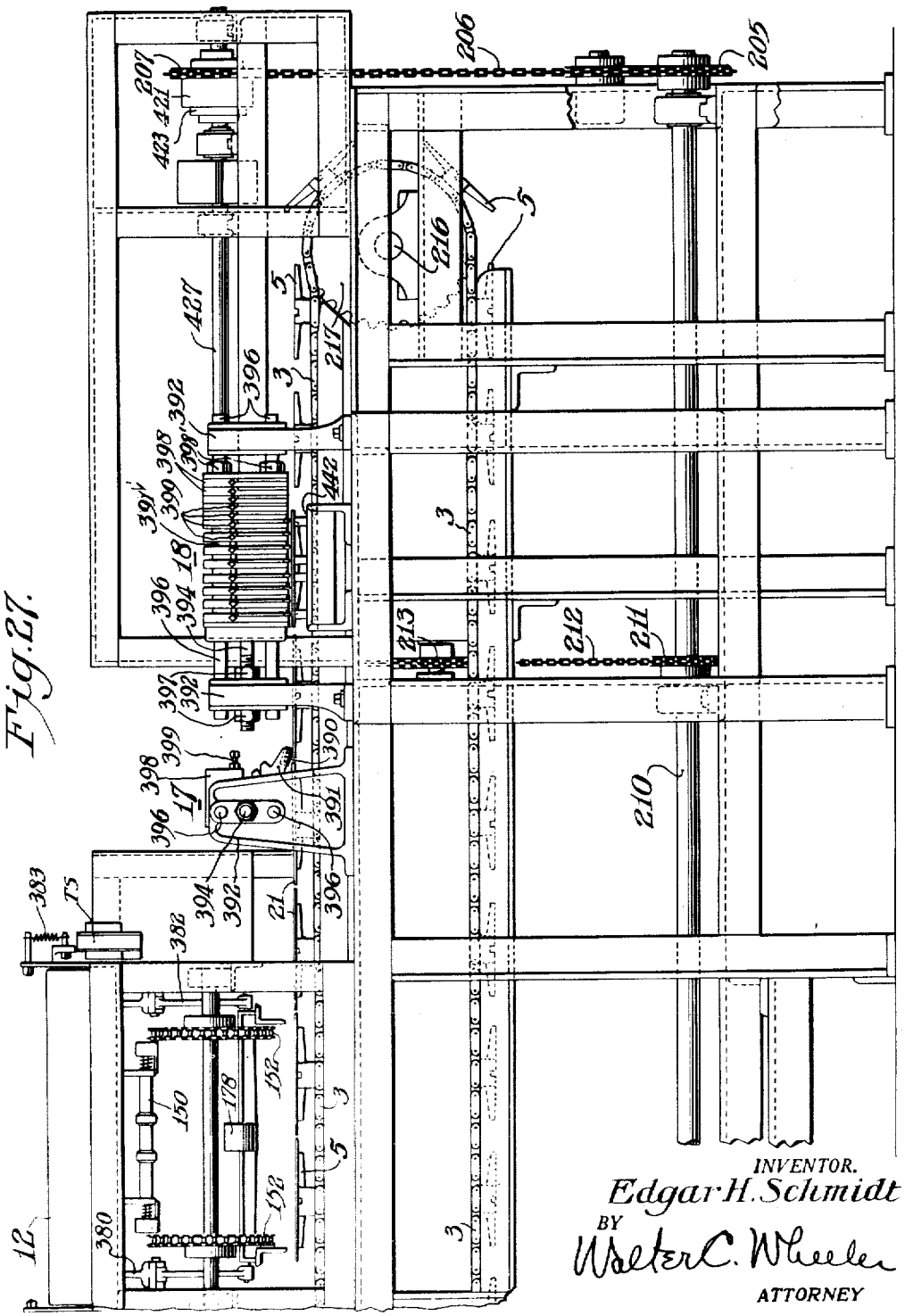

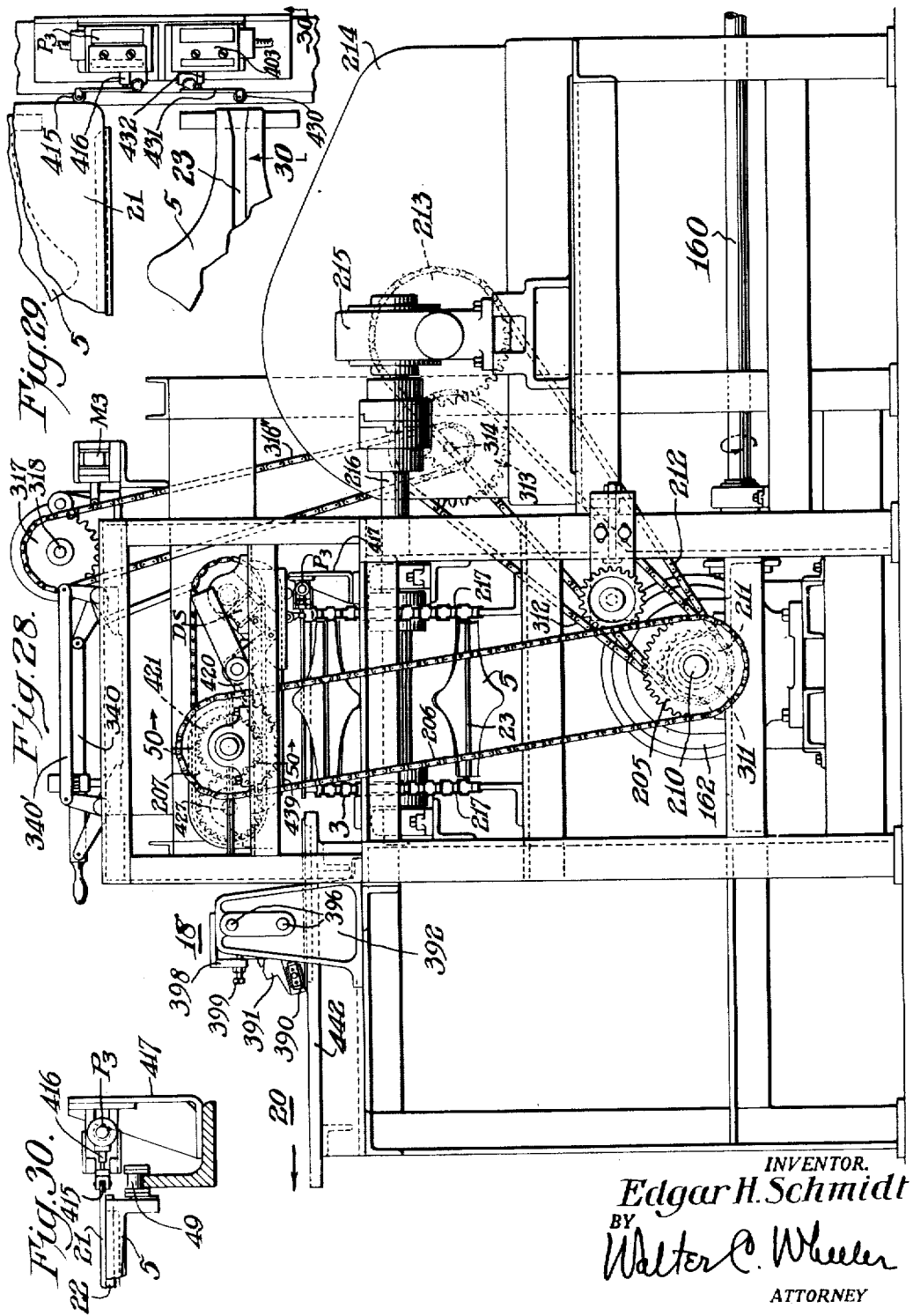

Nov. 21, 1950
E. H. SCHMIDT
2,530,484
MACHINE FOR MAKING COMPOSITE STRUCTURES
Filed Nov. 19, 1947
26 Sheets-Sheet 17
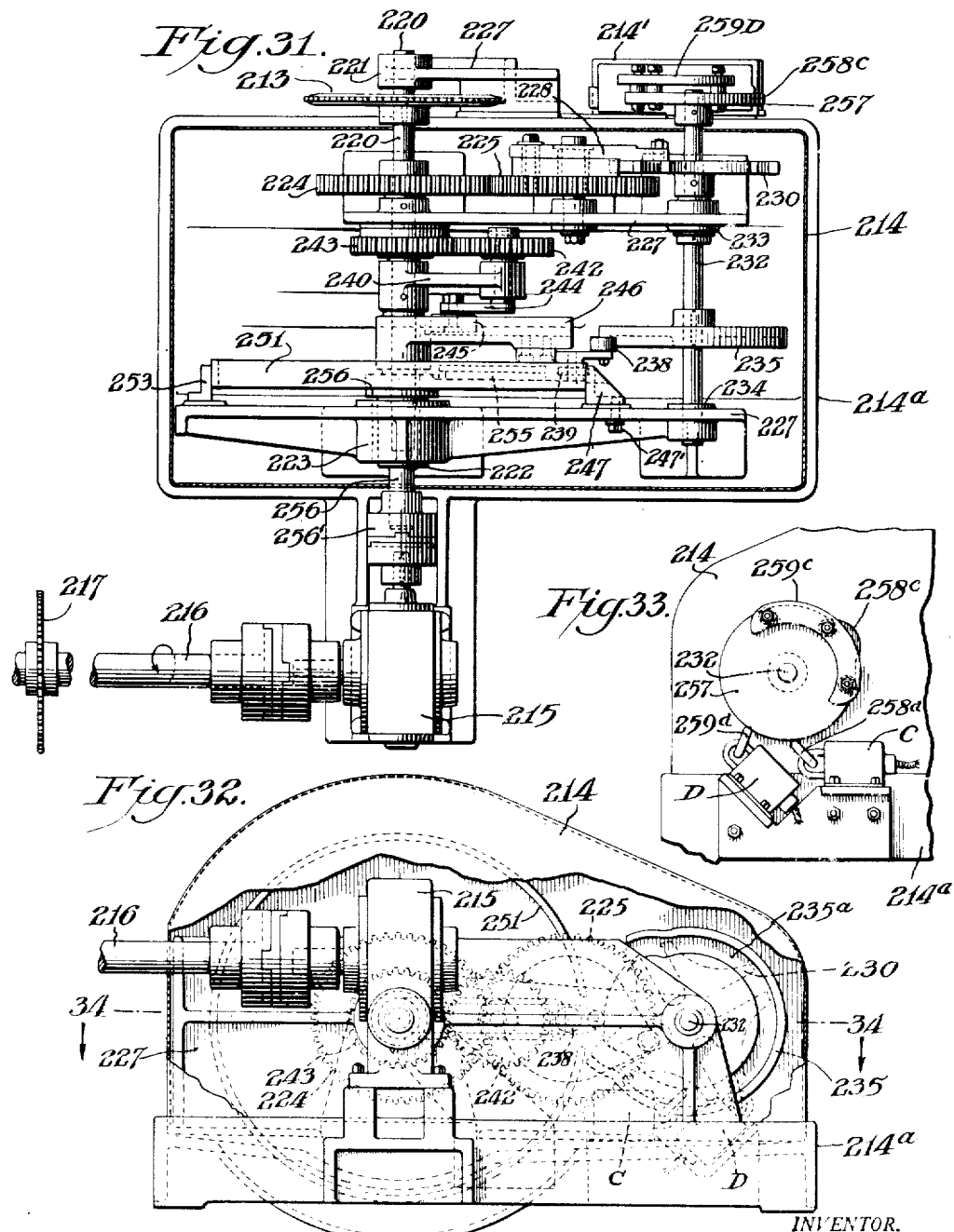
INVENTOR.
Edgar H. Schmidt
BY
Walter C. Wheeler
ATTORNEY

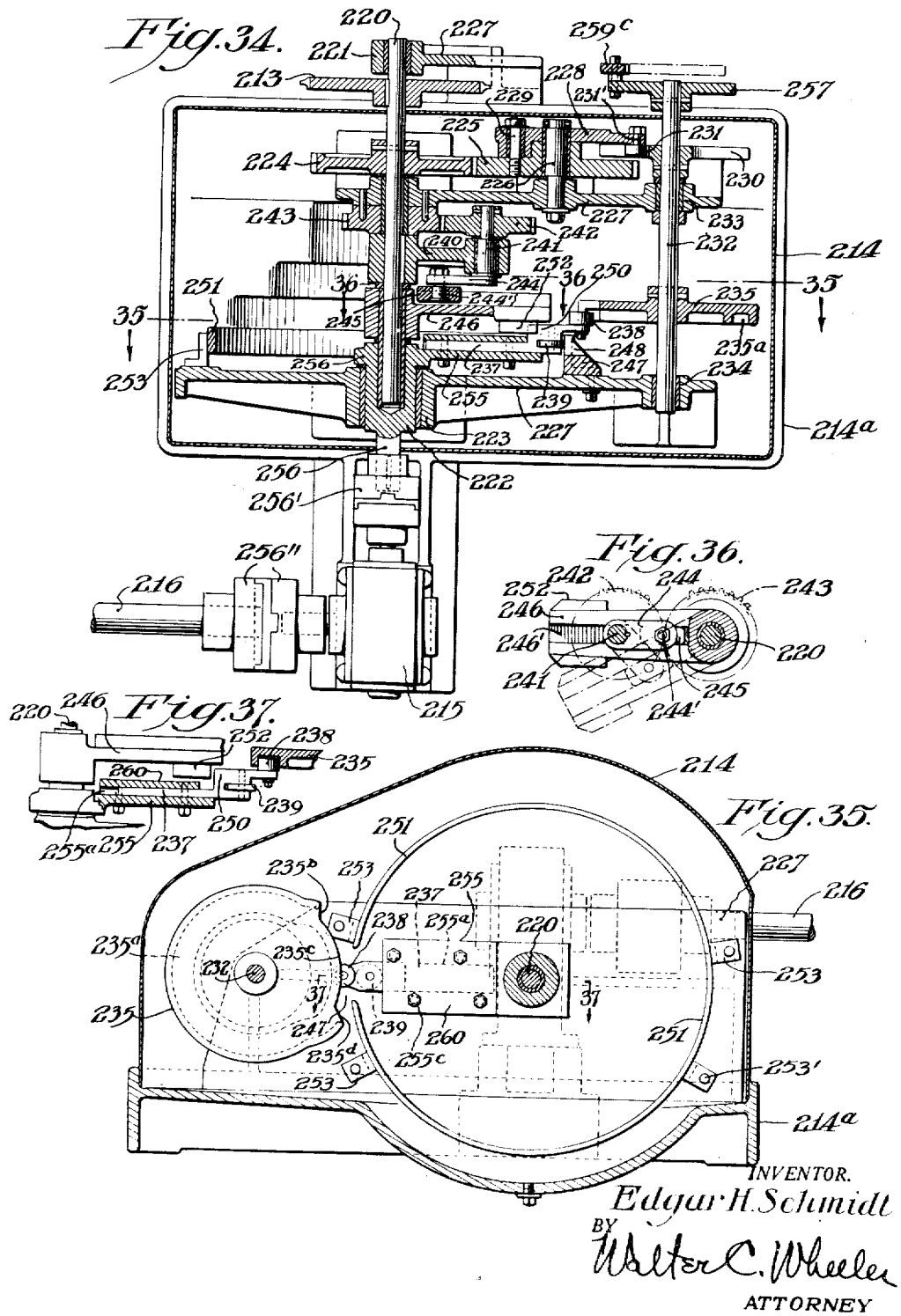

Nov. 21, 1950     E. H. SCHMIDT     2,530,484
MACHINE FOR MAKING COMPOSITE STRUCTURES
Filed Nov. 19, 1947     26 Sheets-Sheet 19
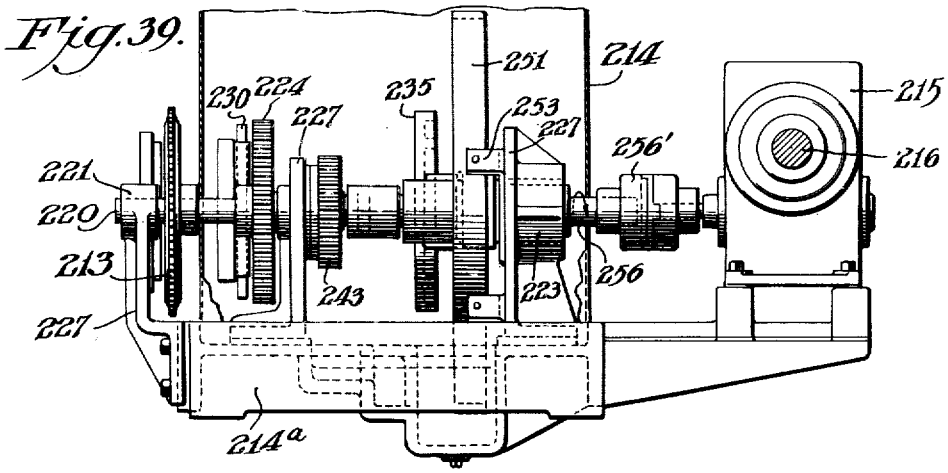
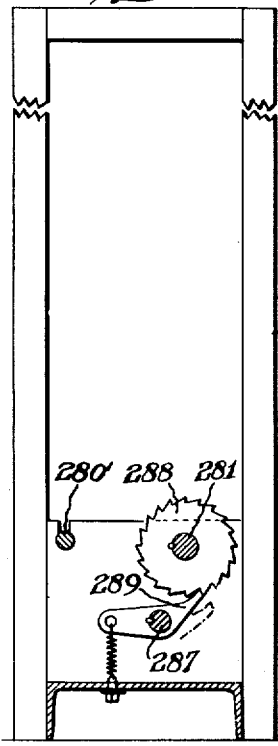
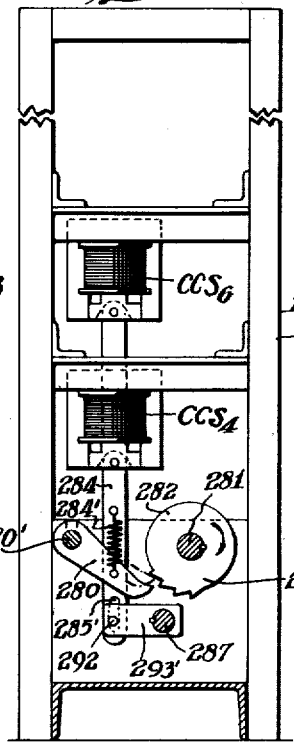
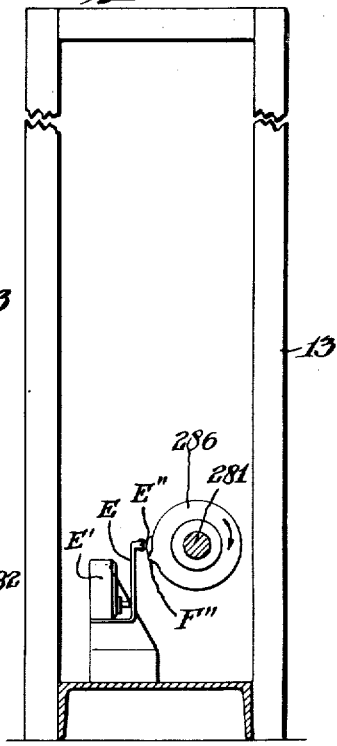
INVENTOR.
Edgar H. Schmidt
BY
ATTORNEY Nov. 21, 1950 — E. H. SCHMIDT — 2,530,484
MACHINE FOR MAKING COMPOSITE STRUCTURES
Filed Nov. 19, 1947 — 26 Sheets-Sheet 20
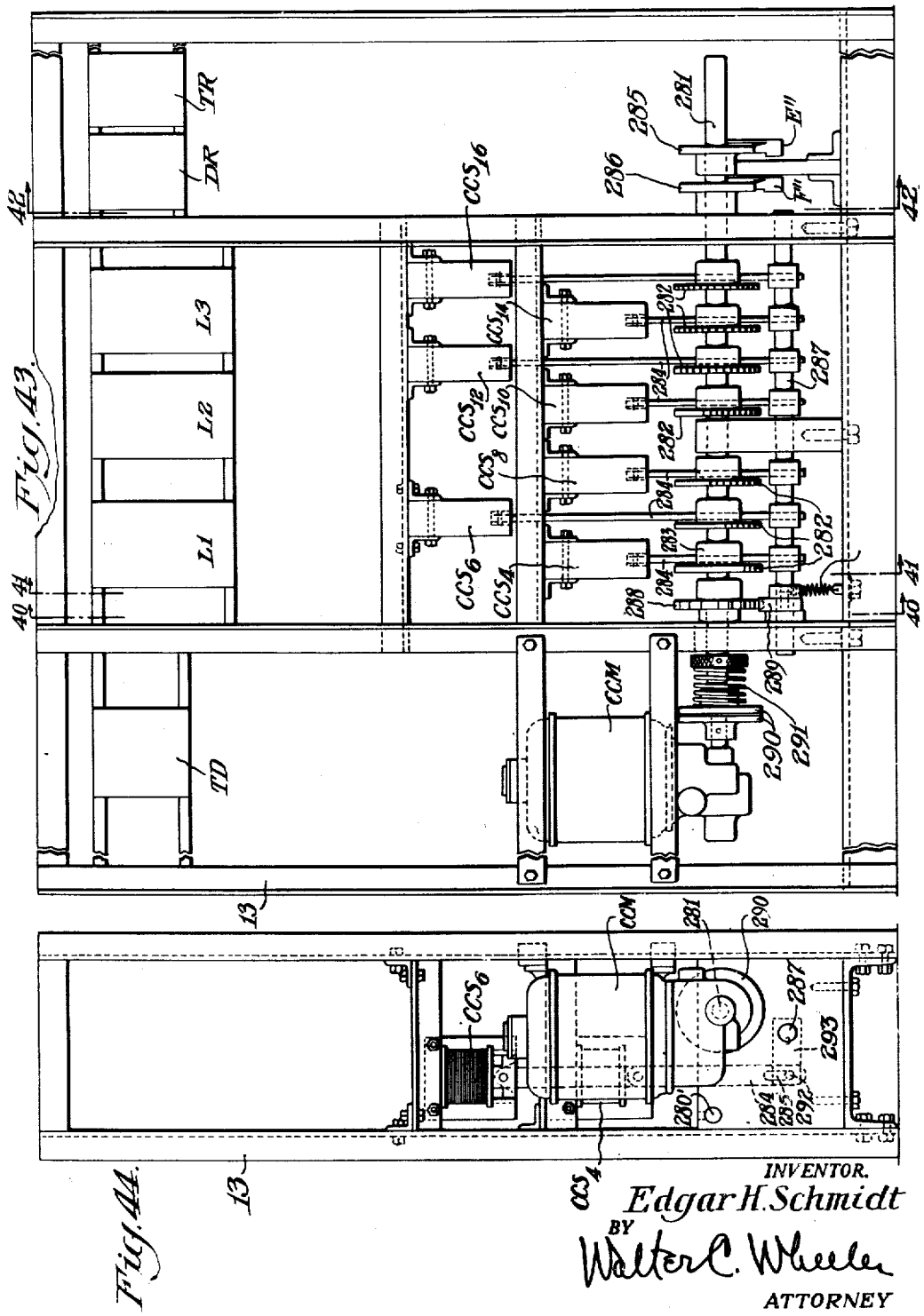
INVENTOR.
Edgar H. Schmidt
BY Walter C. Wheeler
ATTORNEY

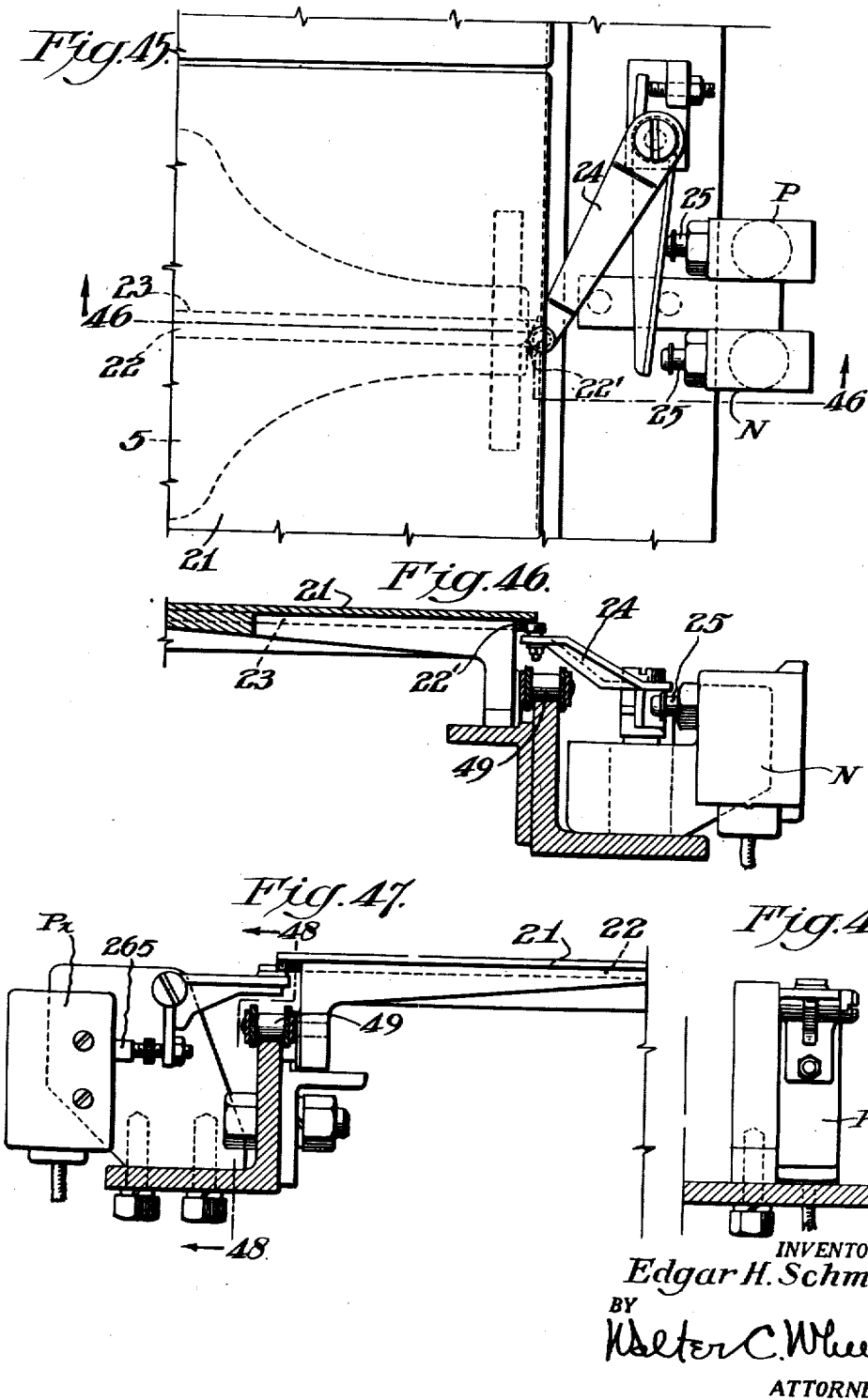

Nov. 21, 1950 — E. H. SCHMIDT — 2,530,484
MACHINE FOR MAKING COMPOSITE STRUCTURES
Filed Nov. 19, 1947 — 26 Sheets-Sheet 22

INVENTOR.
Edgar H. Schmidt
BY Walter C. Wheeler
ATTORNEY

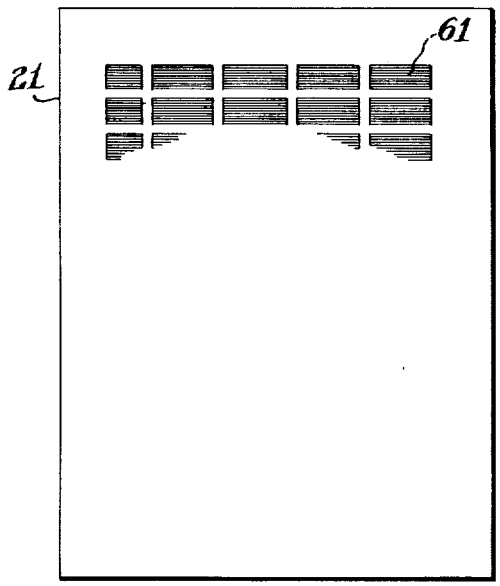
Fig. 54.
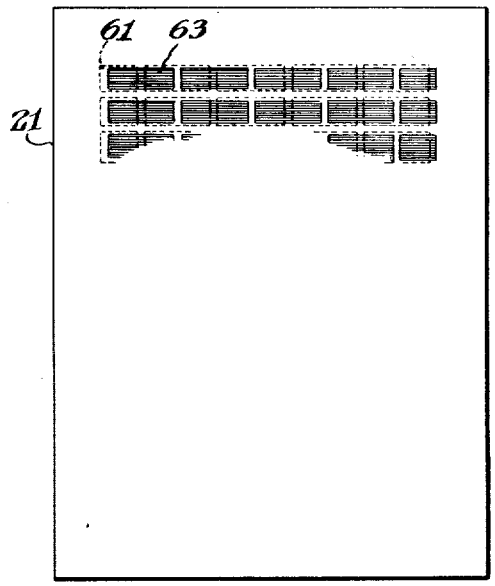
Fig. 55.
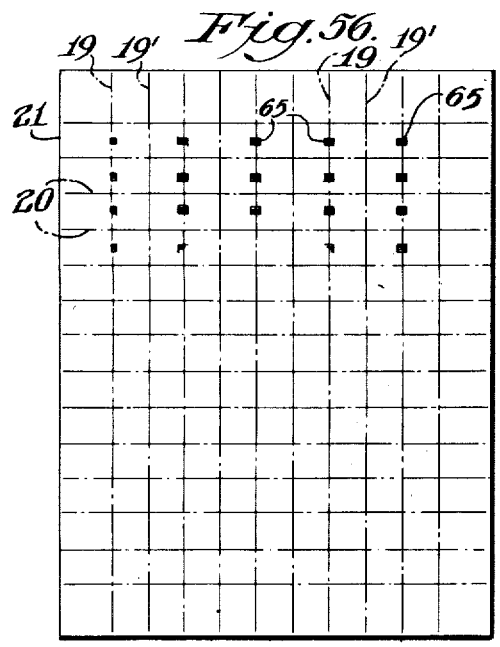
Fig. 56.
Fig. 57.
Fig. 58.
Fig. 59.
Fig. 60.
Fig. 61.
Fig. 62.
Fig. 63.
INVENTOR.
Edgar H. Schmidt
BY
Walter C. Wheeler
ATTORNEY Nov. 21, 1950     E. H. SCHMIDT     2,530,484
MACHINE FOR MAKING COMPOSITE STRUCTURES
Filed Nov. 19, 1947     26 Sheets-Sheet 25
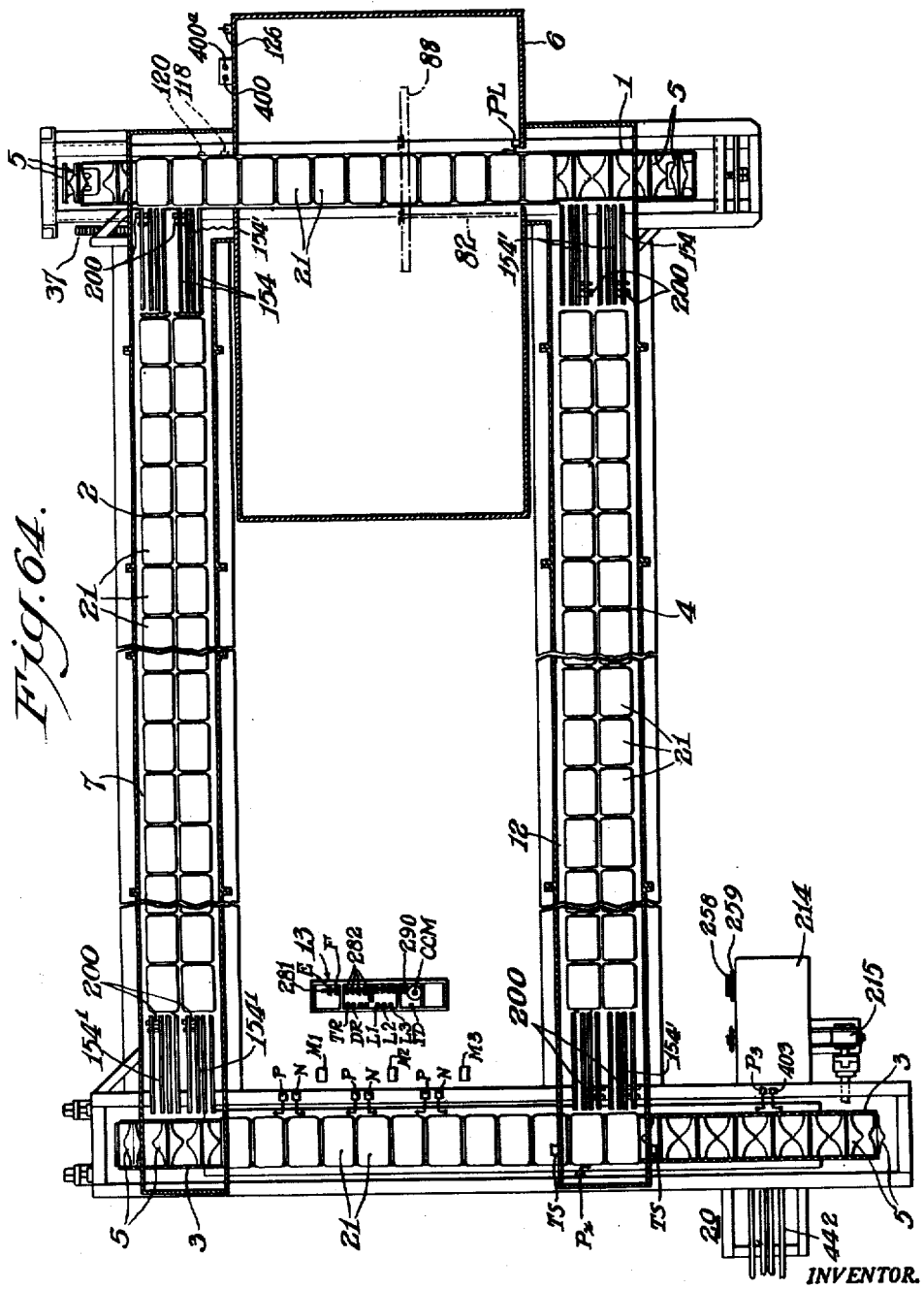
INVENTOR.
*Edgar H. Schmidt*
BY
*Walter C. Wheeler*
ATTORNEY

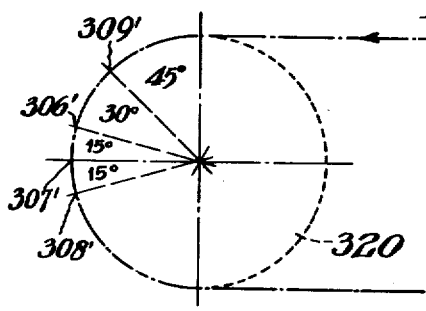
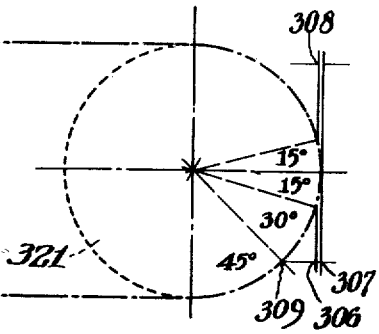
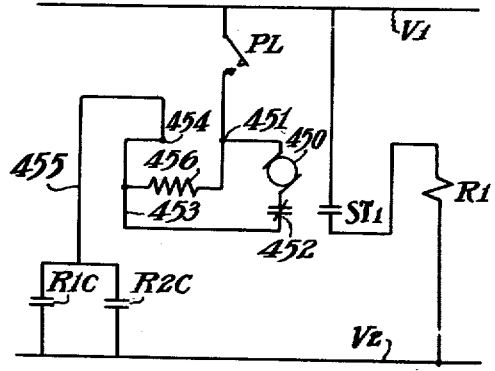
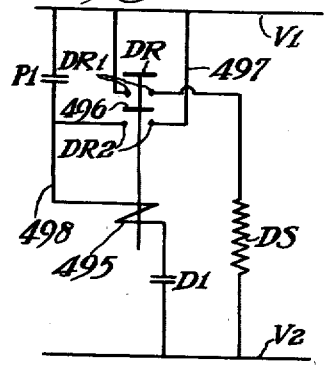
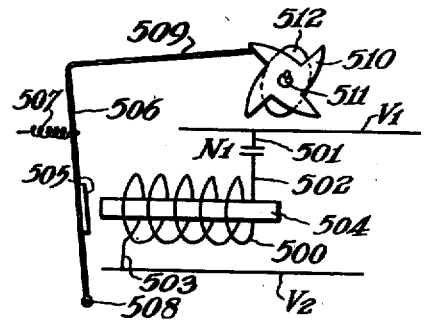
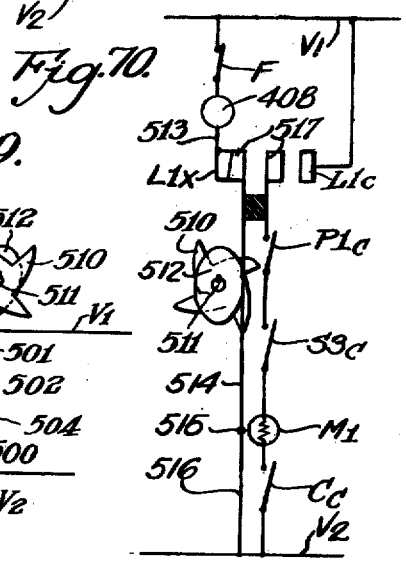
INVENTOR.
Edgar H. Schmidt
BY Walter C. Wheeler
ATTORNEY Patented Nov. 21, 1950

2,530,484

UNITED STATES PATENT OFFICE 2,530,484

MACHINE FOR MAKING COMPOSITE STRUCTURES

Edgar H. Schmidt, Wilmington, Del., assignor to E. I. du Pont de Nemours & Company, Wilmington, Del., a corporation of Delaware Application November 19, 1947, Serial No. 786,844

22 Claims. (Cl. 91—14)

This invention relates to the manufacture of composite structures and especially to structures which are made by serially superimposing or depositing upon each other a number of coatings of a liquid or plastic material which is self-sustaining or is capable of being made so. The invention relates more particularly to machines for depositing these coatings one upon the other in regulated manner in accordance with a predetermined scheme controllable by the means herein provided. The invention is especially applicable to the manufacture of electrical capacitors which are composed of suitably arranged alternate layers of dielectric and conductive material and the invention will be described with reference to an embodiment thereof which is suitable for such purposes.

Figure 6:
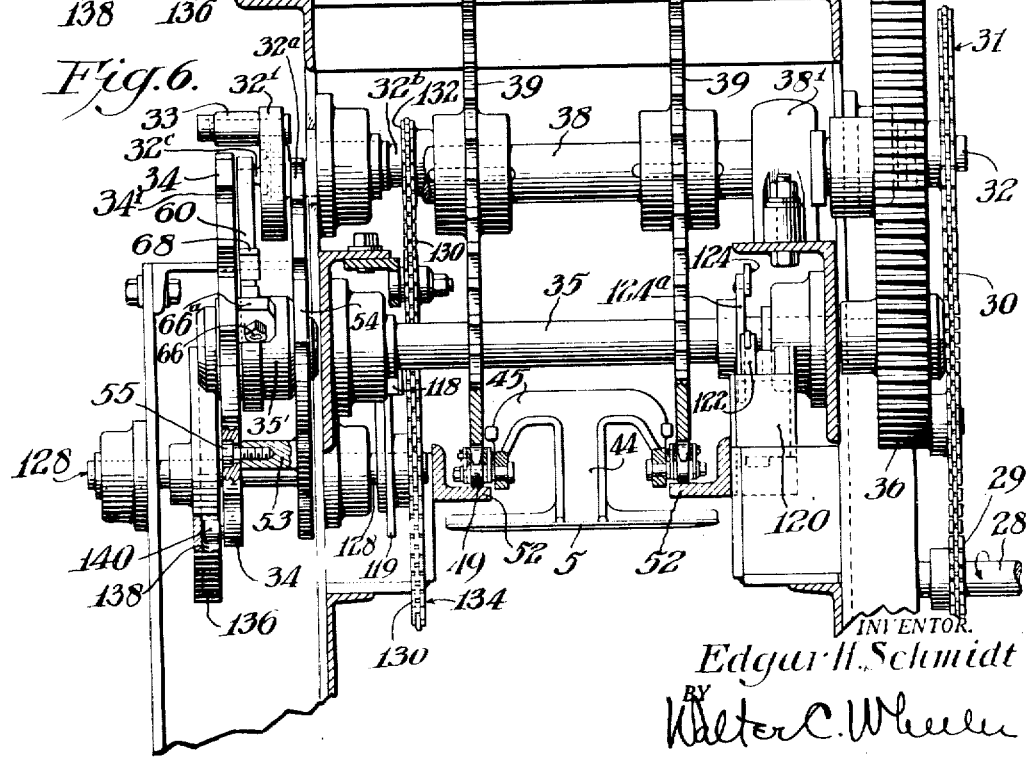

The general object of the invention is to provide a machine which will operate to produce composite laminated structures comprising films or layers of materials which are superimposed successively one upon the other with relative solidification or firming of each layer before a succeeding layer is deposited so that the layers will adhere sufficiently to form a self-sustaining structure but co-mingling of the layers will be nil or relatively small. A more specific object of the present invention is to provide machines for producing such laminated structures wherein the layers, or some of them, are deposited in accordance with a predetermined pattern and sequence. A further object of the invention is to provide machines for forming electrical capacitors which are composed of a series of layers of heat cured dielectric material, such as a solidifiable or sinterable composition such as a vitreous enamel, and intervening layers of conductive material, such as a metallic silver paint, disposed in accordance with a predetermined pattern or patterns. Other objects of the invention will be apparent from the following description of a particular embodiment of the invention which will be made with reference to the accompanying drawings in which:

Fig. 1 is a top plan view of the entire machine with certain portions of the drying chambers broken away, Fig. 2 is a partial schematic plan view showing the main parts of the driving mechanism segregated from the remainder of the machine, Fig. 3 is a top plan view of the loading and spraying end of the machine showing the indexing conveying mechanism, the spray booth and a part of the spray gun connection, Fig. 4 is a side elevational view with parts broken away of the loading and spraying end of the machine, Fig. 5 is an enlarged fragmentary detail in side elevation of the mechanism for intermittently advancing the spray conveyor chain, Fig. 6 is a section taken on line 6—6 of Fig. 5, Fig. 7 is an elevational view of the spray gun operating mechanism, Fig. 8 is an end view of the device shown in Fig. 7, Fig. 9 is a side elevational view of the ceramic drying chamber, showing the transfer mechanism for conveying the plates from the spray conveyor to the first drying conveyor, Fig. 10 is a detail of a section of the conveyor chain and its supporting rail for supporting the transferable plates upon which the product is formed, Fig. 11 is an enlarged fragmentary elevational view illustrating an epicycloidal movement essential to the timing of the transfer mechanism, Fig. 12 is a section of the device shown in Fig. 11, taken on the line 12—12 and looking in the direction indicated by the arrows, Fig. 13 is a side elevational view, partly in cross section, of the delivery end of the ceramic dryer shown in Fig. 9 and on a larger scale, showing the mechanism for transferring plates to, and one end of, the squeegee conveyor, taken substantially on line 13—13 of Fig. 1, Fig. 14 is an end view of the parts shown in Fig. 13, the squeegee conveyor being omitted for clearness, Fig. 15 is a top plan view of the squeegee conveyor and associated mechanisms on the same relative scale as used in Figs. 3 and 4, certain portions being broken away, Fig. 16 is a front elevational view of the parts shown in Fig. 15, Fig. 17 is a detailed top plan view of one of the squeegee mechanisms, somewhat enlarged over that shown in Fig. 15, Fig. 18 is a side view of the parts shown in Fig. 17, Fig. 19 is a cross sectional elevational view taken along the line 19—19 of Fig. 17, Fig. 20 is a front elevational view of the parts shown in Figs. 17 and 18.

Fig. 20A is a partial sectional and partial end elevational view of the type of clutch used in the driving train of the squeegee device, Fig. 20B is a sectional view of the clutch shown in Fig. 20A taken along the line 20B—20B of Fig. 20A, Fig. 21 is a cross sectional view and elevational view, taken along the line 21—21 of Fig. 1, showing the mechanism for transferring the plates from the squeegee conveyor to the second or paint drying conveyor, the scale being enlarged over that shown in Fig. 1, Fig. 21A is a view showing the finger depressor cam of Fig. 21 retracted into inoperative position, Fig. 22 is a sectional elevational view taken on line 22—22 of Fig. 21, Fig. 23 is a plan view of a plate aligning mechanism, arranged at the four transfer stations for guiding the plates from the spray conveyor to the slip drying conveyor, and from the paint drying conveyor to the spray conveyor, Fig. 24 is an end view of the parts shown in Fig. 23 and showing additionally the transferable plates and the overhead mechanism for moving the same from one conveyor to another, Fig. 25 is a partial cross sectional view of a transfer chain carrying a plate engaging finger in position for engaging and moving a transferable plate, Fig. 26 is a view similar to Fig. 25 with the engaging finger in an unengaged position, Fig. 27 is a front elevational view of the discharge end of the squeegee conveyor showing two sets of severing knives and mechanism for discharging the completed product, Fig. 28 is an end elevational view of the parts shown in Fig. 27, Fig. 29 is a fragmentary top plan view of two conveyor plate supports and associated electric contact mechanism, Fig. 30 is a sectional view taken along the line 30—30 of Fig. 29, Fig. 31 is a top plan view (with cover plate in section) of the epicycloidal mechanism for indexing the squeegee conveyor in proper synchronization with associated moving devices, Fig. 32 is an end elevation of the device shown in Fig. 31 with a portion of the casing broken away, Fig. 33 is a fragmentary elevational view of a portion of the opposite end to that shown in Fig. 32, illustrating a dual cam mechanism and associated electric switches, Fig. 34 is a sectional plan view taken along the line 34—34 of Fig. 32, Fig. 35 is a sectional elevational view taken along the line 35—35 of Fig. 34 and looking in the direction indicated by the arrows, Fig. 36 is a fragmentary sectional view taken along the line 36—36 of Fig. 34, illustrating the latching mechanism, Fig. 37 is a sectional plan view of the latching mechanism shown in Fig. 34, taken along the line 37—37 of Fig. 35, showing the unlatched position of the cycloidal gear, Fig. 38 is an enlarged view of a fragment of the several parts shown in Fig. 37, further illustrating the unlatched position of the cycloidal gear, Fig. 38A is a view in perspective of the locking device for holding the output lever in a fixed position while it is disengaged from the driven arm of the cycloidal device.

Figure 49:
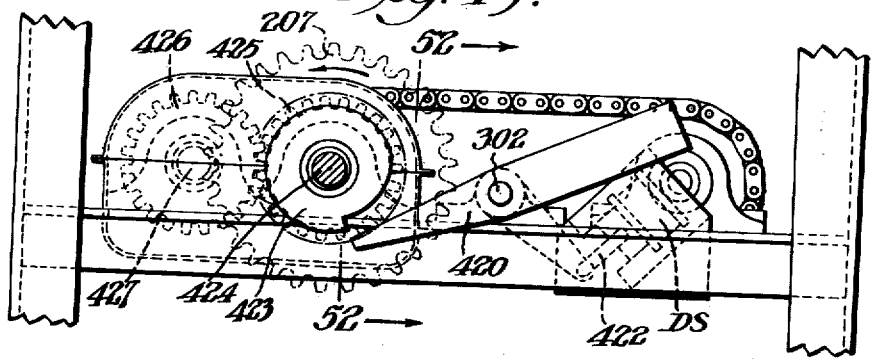
Figure 50:
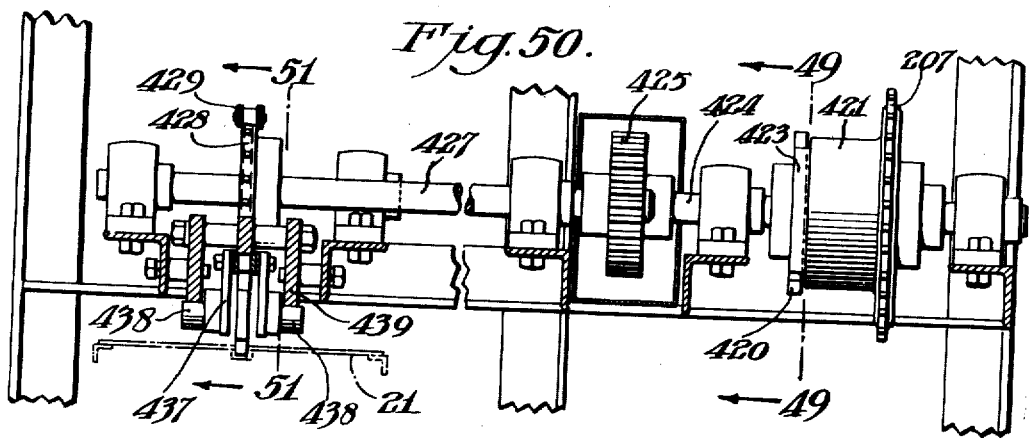
Figure 51:
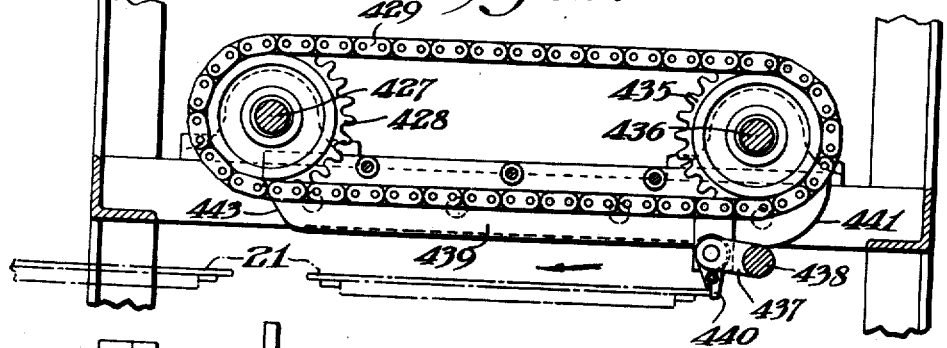
Figure 52:
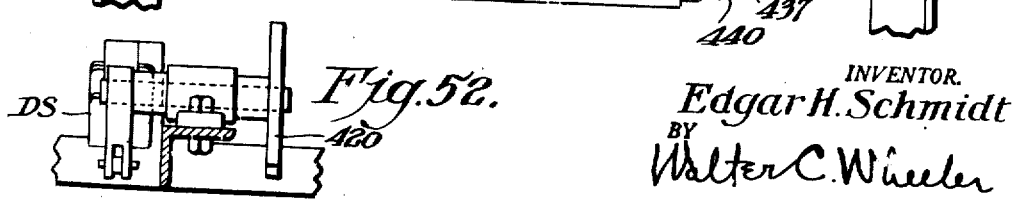
Figure 53:
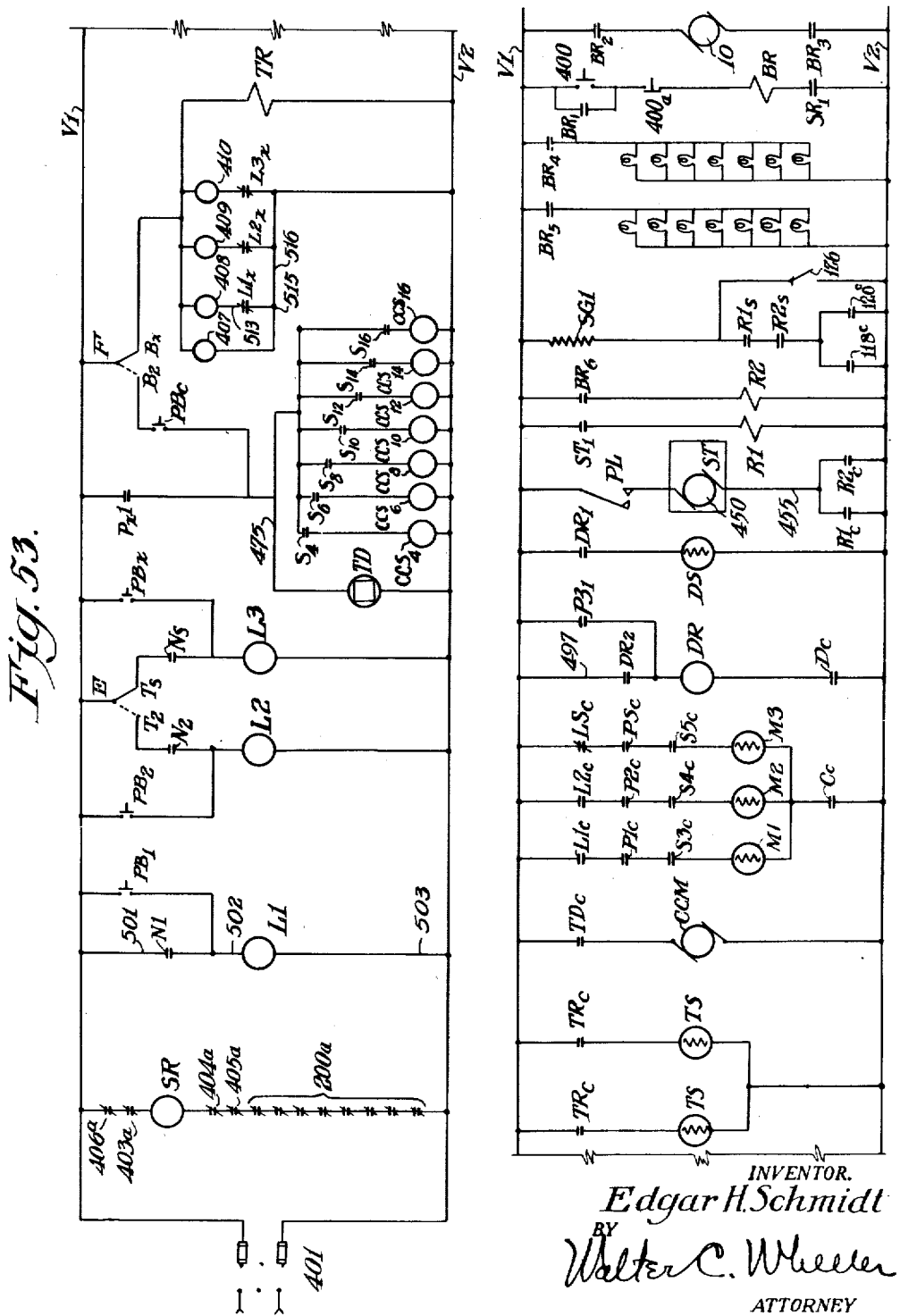

Fig. 38B is schematic view illustrating the structure and operation of the clutch operating cam, Fig. 39 is an end elevational view of the parts shown in Fig. 31, the cover being broken away, Figs. 40, 41 and 42 are partial cross sectional elevational views of an electric control mechanism on the control board, corresponding respectively to section lines 40—40, 41—41 and 42—42 of Fig. 43, Fig. 43 is a front elevational view of the electric control board mechanism, Fig. 44 is an end elevation of the control board parts shown in Fig. 43, Fig. 45 is a top plan view of a switch control mechanism mounted on the squeegee conveyor frame and a plate in position to operate the switch, Fig. 46 is a cross sectional view of the parts shown in Fig. 45, taken along the line 46—46 of Fig. 45, Fig. 47 is a sectional elevational view of a mechanism for operating a switch from one side of the plate, Fig. 48 is a partial sectional view of Fig. 47, taken on the line 48—48 of Fig. 47, Fig. 49 is a partial elevational and partial cross sectional view of the drive for the plate discharge device taken along the line 49—49 of Fig. 50, Fig. 50 is an elevational view partially in cross section of the plate discharge assembly taken along the line 50—50 of Fig. 28, Fig. 51 is an elevational view partially in cross section taken along the line 51—51 of Fig. 50, Fig. 52 is an elevational view partially in cross section taken along the line 52—52 of Fig. 49, Fig. 53 is an electric wiring diagram showing means for controlling the various operations of the machine in their proper sequence, Fig. 54 is a plan view of a composite deposit showing the disposition and arrangement of the thin metallic material which is disposed upon the first and odd-numbered ceramic layers or deposits, Fig. 55 is a plan view of the composite deposit showing the disposition and arrangement of the thin metallic material which is disposed upon the second and even-numbered ceramic deposits or layers, except the last even numbered layer, Fig. 56 is a plan view of the composite deposit showing the disposition and arrangement of the reference markings placed upon the outer surface of the last or cover coating of ceramic material, Figs. 57 to 61 are cross sectional views of composite coatings showing the development of a structure during the course of three successive traverses of the spray booth, Fig. 62 is a cross sectional view of a composite structure before being cut into "chips," having three metallic patterns, a cover coating of ceramic material and an outside reference pattern, Fig. 63 is a view in perspective of a single capacitor produced by cutting apart in the manner prescribed the composite structure built up in the manner illustrated in Fig. 62, Fig. 64 is a plan view of the machine with the superstructure removed for illustrating the positions of various control devices, Fig. 65 is a schematic view illustrating the sequence of operations of the squeegee device, Fig. 66 is a wiring diagram schematically illustrating the operation of the time delay switch ST in the circuit for controlling the operation of the spray guns, Fig. 67 is a wiring diagram schematically illustrating the operation of the time delay switch TD in the circuit for controlling the operation of the cycle control mechanism, Fig. 68 is a wiring diagram schematically illustrating the operation of the relay DR in the circuit for controlling the discharge solenoid and clutch, Fig. 69 is a schematic partial representation of the relays L1, L2 and L3 in the control circuits of the squeegee devices and includes a wiring diagram illustrating the connections made in the operating circuit, and Fig. 70 is a partial representation of the device illustrated in Fig. 69 illustrating the manner in which the circuits are intermittently opened and closed.

Referring to Fig. 1, the device comprises a series of four conveyors which are arranged in rectangular disposition to each other. In operation the four conveyors form a closed cycle, wherein plates upon which alternate layers of construction material are deposited, are transferred from one conveyor to the next. At the start of an operation, a given number of plain surfaced plates or platens, say 176 in number, upon which the composite structures are to be deposited, are disposed on holders 5 of a conveyor 1. At the start the second plate of the series may be the pilot plate which carries certain control and switch operating devices not carried by the other plates, the structure and function of which will hereinafter be made apparent. In operation the plates or platens, upon which the capacitors are built up, are transferred in turn from conveyor 1 to conveyors 2, 3 and 4 in series, and certain different operations are performed upon the material deposited on each of the plates as they progress along the conveyors, sometimes with pauses of controlled duration during which the transferring, discharging and some of the construction operations are performed. A predetermined number and variety of layers and patterns of material are caused to be superimposed on the platens by a cycle control device which regulates operations of different layer producing devices and finally causes the platens to be discharged from the machine.

Upon conveyor 1 through which air is blown by an electric fan (not shown), the platens are carried stepwise with certain regulated dwells through a spray booth 6, wherein a layer 67 (Figs. 57 to 63) of ceramic material in suspension in a liquid, somewhat like a vitreous enamel composition of a consistency of a ceramic slip is sprayed on the plates during dwells of the conveyor of regulated duration, and then the plates are transferred side by side, two at a time during a so-called long dwell of the spray booth conveyor to a second carrier or ceramic drying conveyor 2 which transports the batch of coated plates through a drying tunnel or oven 7 wherein a bank of heating elements 8 is mounted and through which air is blown by a fan (not shown). The coating of ceramic material is thereby somewhat dried and hardened sufficiently to support a layer of conductive material which is thereafter placed on the hardened layer of ceramic material in a predetermined pattern, desirably in the form of a metal-containing paint hereinafter to be more particularly described. When the ceramic coatings are thus hardened so that they will support a pattern or layer of conductive material such as the metallic paint, and the coated plates have progressed to the end of the drying conveyor 2, the plates are mechanically transferred to similar holders 5 like those on conveyors 1 and 2 on the squeegee conveyor 3.

Conveyor 3 is desirably disposed to operate along a line at right angles to the drying conveyors. The plates coated with ceramic material are transferred by a coordinated overhead conveyor, two at a time in single file onto the squeegee conveyor 3, also during a dwell of the squeegee conveyor, thus bringing the pilot plate into the leading position of the leading pair of plates on conveyor 3. This conveyor advances the plates stepwise, in single file and with regulated pauses or dwells to positions or stations underneath one or the other of appropriately positioned squeegee devices which are indicated generally by the numerals 14, 15 and 16. In the first circuit of the series of platens over the conveyors, the ceramic coatings are accurately disposed one at a time under and in register with the first squeegee device 14 for imprinting or depositing a layer or pattern of metallic paint 61 (Fig. 58) in a predetermined pattern on the somewhat hardened deposited first coating 67 of ceramic material. In the second circuit of the coated platens the operations of the squeegee devices are automatically controlled so that the squeegee 15 is used to place a different pattern on the second and even numbered layers of ceramic (except the last even numbered layer). The third squeegee applicator 16 is for marking the outside, covering or last layer of ceramic. Each of the three imprinting or depositing devices 14, 15 and 16 produces a different pattern or marking. The rectangular blocks 61 (Figs. 54, 55 and 58) are produced by the first squeegee device 14. The pattern 63 is produced by the squeegee device 15 and the pattern 65 is produced by the squeegee device 16.

Various devices can be used for the purpose of producing the patterns composed of the blocked-off devices 61, 63 and 65 of conductive material or metal on the layers of dielectric material. A desirable manner of producing this pattern of conductive material is by way of imprinting the ceramic material with a paste or paint-like metal-containing material, such as a paste of suitable properties for use in the silk screen squeegee printing process, containing a silver powder suspended in a suitable vehicle, which vehicle does not materially impair the desired conductive properties of the coating and which vehicle can be substantially eliminated or removed by means of a subsequent treatment such as volatilization or heat treatment. A suitable ceramic silver for this purpose is one which vitrifies and forms a conductive coating upon being fired. This metallic coating material is desirably applied by a squeegee method similar to the known silk screen stenciling or printing process wherein the metallic coating material is squeegeed onto the layer of ceramic material through a fine mesh silk or metal screen during a regulated pause in the forward movement of a platen on the conveyor 3. The screen is held in contact with the surface to be coated and is arranged in the squeegee device in the manner of a stencil so that some of the meshes of the screen are open and constitute the pattern to be produced, and the other meshes of the screen are blocked or filled so that the coating material will not flow through the screen at these points. Accordingly, the first circuit of the platens with their dried or hardened first layers 67 of ceramic material are advanced single file and stepwise and with regulated pauses by the squeegee conveyor 3 to the station 14 where metallic paint is applied in a pattern and then the platens are delivered in pairs to the continuously moving paint drying conveyor 4. The paint drying conveyor 4 is desirably arranged to operate along a line at right angles to the squeegee conveyor and to return the plates after drying the paint pattern to the spray booth conveyor for another coating of ceramic slip.

During the regulated pauses in the stepwise movement of the squeegee conveyor 3, the coating of ceramic material on each plate is brought under the squeegee screen or other pattern-producing device and the pattern of metallic paint-like material or other deposition is impressed upon the ceramic coating by appropriate means. The first squeegee applicator device 14 which produces the first pattern 61 on the first and the odd numbered coatings of ceramic 67 is then disengaged before the plate is again moved by the stepwise movement of the squeegee conveyor 3 and a following plate is then moved into place for a repetition of the operation of the applicator 14. This operation of the first applicator continues to place its pattern on all of the series of ceramic coated plates.

When the first pair of plates thus painted, coated or squeegeed has been moved in front of the end of the paint drier conveyor 4, another coordinated overhead transfer device transfers this pair of plates onto the continuously moving conveyor 4, and the plates travel side by side on conveyor 4 through the paint drying chamber 12. This transfer is made during a pause in the forward movement of the squeegee conveyor while some one of the following plates of the group is being squeegeed. The conveyor 4 carries the plates in pairs through the drying tunnel 12 for drying the pattern or coating produced on the ceramic layer in the preceding operation.

The drying tunnel 12 is also desirably provided with a bank of heating units 8 and ventilation means similar to those in the tunnel 7. The pairs of coated and painted plates progress side by side to the end of this conveyor where they are transferred in pairs by an overhead transfer mechanism coordinated with chain conveyor 1 and conveyor 4 during selected pauses of conveyor 1. From this point, the plates are again carried in single file, as before, through the spray booth 6 with suitable pauses, where a second coating 67 of ceramic material is deposited on the first pattern of metallic paint and dried layer 61. In time, the plates are again transferred to the drying conveyor 2, carried through the drying tunnel 7 and transferred to the squeegee conveyor 3 which again carries them forward in its stepwise movement toward the squeegee applicator device 15 and the latter produces a second pattern on the even numbered ceramic coating. For this operation, a series of control switches and interlocked circuits causes the first squeegee 14 to become inoperative and the second one, 15, to become operative when the plates are disposed, one at a time under the second pattern depositing device.

During the travel of the plates, the leading or master plate of the series engages control devices suitably located at or near the squeegee devices 14, 15 and 16 and along the sides of the squeegee conveyor. These control devices comprise switches connected to an automatic electrical control board 13 upon which suitable relays, switches and other devices operate to put the first applicator 14 out of operation and second applicator 15 into operation. In this second, or subsequent even numbered circuits of the plates (except the last even numbered pass, predetermined by a cycle control device), applicator 15 is actuated to impress pattern 63 on the layer of ceramic material. Thus the second applicator 15 is brought into operation and it produces a new or second pattern such as 63 on the somewhat hardened second coating of ceramic material.

After the pattern 63 is impressed upon the second ceramic layer 67, the plates are again advanced to a transfer position in front of conveyor 4 and they are again transferred side by side in pairs onto this conveyor and through the drying tunnel 12 in the same manner as they were in the first circuit hereinabove described.

At the end of conveyor 4, the plates are again transferred to the conveyor 1 and they again advance in single file as before through the spray booth 6 where they receive another or third coating of ceramic material. Thus each odd numbered newly dried coating of ceramic material is brought first to the squeegee applicator or other pattern-producing device 14 and each new even numbered dried coating of ceramic material (except the last) is brought to the second pattern-producing device 15 until a predetermined number of pairs of coatings is produced. As will hereinafter be explained, control devices made operative by switches actuated by the conveyed plates, are provided whereby applicator 14 is brought into operation and then applicator 15 is brought into operation alternately for a number of cycles for producing the desired number of pairs of capacitor laminations to be incorporated into the capacitor units or chips, eventually to be produced, then a different even numbered ceramic layer, such as 65, is laid on the outside and dried.

The number of such sets of coatings of ceramic and metal, such as 67—61—67—63—67—61—67—65 may be determined by an appropriate manual setting of the cycle control devices hereinafter to be described so that units with the desired number of alternate metallic 61 and 63 type patterns or coatings are producible. When desired, as will usually be the case, one more layer of the 61 coating than of the 63 coating is deposited and a third or reference pattern 65 is impressed on the last or cover layer of hardened ceramic coating 67 instead of the pattern 63. Upon a predetermined odd numbered cycle of the platens, say the 7th cycle, which is predetermined by a proper setting of the cycle control device hereinafter to be described, there will have been deposited, say four 61 type and three of 63 type conductive layers which are disposed sandwich-like between the layers of ceramic material with the last ceramic layer bearing the reference marking impressed by the third applicator 16.

The capacitors are then fashioned by properly cutting the composite laminated cake thus formed into rectangular pieces or "chips" by making cuts through the cake along lines 19 and 19'. Cuts 19 pass through the spaces between the rectangular coatings 63 (Figs. 56 and 62) and cuts through 61 and 65. Cuts 19' pass through the coatings 63 and between 61 and 65. Transversely thereto along the lines 20, the cakes are cut across in the spaces between the rows of superimposed coatings of capacitance material 61 and 63. When such cutting or separation of the "chips" is accomplished, it will be evident from a consideration of the layout set forth in Figs. 54 to 63 that alternate metallic coatings will be cut through in one direction by the cuts 19, and the other metallic coatings will be cut through by the parallel cuts along lines 19'.

The edges of the metallic coatings or capacitor plates in the cut chips and the disposition of these plates in the chips may be relatively thick, or they may be so thin as to be scarcely discernible to the naked eye. The final marking on the last ceramic coating 67 is most desirable when the layers 61 and 63 are thin. This marking comprises the identifying marks 65 in order to provide reference marks for properly disposing the finished chips with reference to each other when the chips are assembled in making composite capacitor devices containing a larger number of plates than is contained in a single chip. The identifying marks or coating 65 (Figs. 56, 62 and 63) may be located and the patterns 61 and 63 may be so designed that the cuts between the edges of the coatings 63 (Fig. 63) which are applied in the even numbered passages of the plates (e. g. by the pattern of squeegee 15) will not be cut through, but the middles or edge portions of the odd numbered coatings 61 (e. g. those made by squeegee 14) will be severed. As indicated, the latter cuts, such as cuts 20 will not traverse the small squares or dots 65 on the last layer of ceramic material. However, the parallel cuts 19 will shear through the square dots 65 and the odd numbered metal coats.

The dots 65 may be located so that the cuts traversing the odd numbered coats will also traverse the dots. When the reference dots 65 are arranged in the manner described (Fig. 56), the marks or dots will indicate the edge where the odd numbered plates are sheared and the even numbered plates are unsheared. On the opposite edge of the chips, the layers which are deposited in the even numbered passes, such as layers 63 will be sheared along the line 19'. Along the other two parallel edges of the chips, the edges of the areas 61 and 63 are submerged in the ceramic material along the line 20. In constructing capacitors, therefore, the plates 61 are interconnected by a suitable conductor contacting their severed edges, and the plates 63 are similarly connected with each other by another conductor connecting their severed edges. By assembling a number of such chips, multiple assemblies of high capacitance can be made. These connections may be made in order to form a condenser as described more particularly in U. S. Patent 2,389,420 of November 20, 1945 by Alden J. Deyrup. The marking or reference coating which produces the spots 65 can be omitted, but, when present, the markings avoid errors in future assemblies and the consequent wastage due to errors in assembling the capacitors.

Prior to receiving the top dried ceramic coating in the last traverse of the spray booth 6 and drier 7, and, if desired, after the marking coating 65 is applied in the last traverse of the squeegee conveyor by the third squeegee 16, the cycle control device operates to make the transfer mechanism inoperative which formerly transferred the plates onto the paint dryer conveyor 4 for returning them to the spray conveyor. This re-routing transfer mechanism having been made inoperative, the plates are permitted to proceed on the carrier 3 past the transfer device and underneath a cutting device generally designated 17 which is provided with a plurality of thin cutting blades which are set to make properly spaced parallel cuts through the composite cake parallel to the travel of the squeegee conveyor 3, such as the cuts 20 (Fig. 56). These cuts pass through the ceramic material and patterns 65 when the squeegees are arranged to make patterns like those shown in Figs. 54 to 62. The plates in turn then engage a control device or switch which causes a discharge mechanism to come into operation during the pauses in the forward movement of the conveyor 3 for discharging the plates from the conveyor onto a stationary skid or bench 20. The discharge device is desirably arranged to discharge the plates onto the skid or bench at one side of the conveyor 3.

As shown in Figs. 1, 27, 28 and 49 to 51, the discharge device slides the coated plates from the plate supports 5 transversely to the direction of travel of conveyor 3 during a dwell of the conveyor which is provided for the operation of the squeegee devices in the earlier part of the operation, and underneath a cutting device generally designated 18 which has blades arranged similarly to those of cutting device 17. This action produces cuts across the longer dimension of the plate, such as cuts 19 and 19' (Fig. 56), which sever the areas transversely to the first cuts as described heretofore. These blades in the cutting devices are arranged to cut along lines whereby the separated rectangularly shaped parts of the composite coating will form structures called "chips" which have opposite external layers of dielectric ceramic material, at least two plates of conductive embedded material having their edges exposed along a face which is transverse to the external layers of ceramic material, and at least one embedded plate of conductive material having one edge exposed along an opposite face which is transverse to the external layers of ceramic material, as illustrated by Fig. 63. In general, the structures are made up of a number of such plates of conductive material, such as 7 to 13 layers or capacitor plates disposed between two parallel outside ceramic layers and an additional even numbered reference mark 65 on the outside so that one set of plates may be connected together at their exposed edges to constitute one side of a multi-plate capacitor, and the intervening plates can be connected together at their exposed edges of the "chips" to constitute the opposite plates of the multi-plate capacitor.

In subsequent operations the chips are disengaged from the plates. Usually such an operation comprises a heat treatment, baking or firing of the "chips" in which these rectangular units or "chips" become disengaged from the plates. In practice, composite capacitors may be built up by combining a number of these units. Accordingly, several units may be stacked and connected together through conductors or wires which are severally and suitably attached to the edges of the plates 61 and 63.

The layers of ceramic slip and conductive material are alternately deposited and after deposition are carried on the rectangular plates 21 (Figs. 3 and 4) which are demountably carried on the endless chain conveyors 1, 2, 3 and 4. Each of the plates 21 has a tongue or key 22 desirably of square or rectangular cross section mounted on its under surface which extends across the plate midway between its edges except for a short space or margin at the ends. This key 22 is fitted for close sliding engagement in a complementary slot 23 in the outer or normally top surface of the plate carriers 5 and transverse to the line of travel of the endless chains 1, 2, 3 and 4. The plate carriers 5 are permanently mounted on the endless chains 1, 2, 3 and 4 and spaced apart so that only a narrow slit remains between the adjacent edges of plates 21 when they are mounted on the conveyors in single file.

There is one odd or master plate in each batch of plates which is routed through the machine. This master plate is like the ordinary plates except that the rounded end of the key 22' (Fig. 45) is longer than the key 22 of the other plates, and may be extended to be flush with the edge of the plate. As illustrated in Figs. 45 and 46, an operating lever 24 engages a micro switch plunger 25 depressing the plunger 25 of the switch N only when the extra long tongue 22' of the master plate engages the lever 24. At the start of an operation, a batch of plates is manually loaded onto the conveyor 1 from the point marked In (Figs. 1 and 4). With the arrangement illustrated herein, the master plate is always the second plate to be placed on the spray conveyor 1 with the tongue 22' located in the slot 23. The elongated tongue 22' is provided on the master plate for engaging various other control devices or switch levers located at appropriate points along the circuit of the plates for actuating cycle control switches and controlling the type of operation to be performed upon the series of plates in any given cycle. The rounded ends of the tongues constitute wiping members to operate the control levers and plungers which are appropriately stationed along the conveyors.

All the mechanically operated parts of the device are actuated through various drives from a single power input which is desirably the motor 10 shown in Figs. 1 and 2. The conveyors and all mechanically operated parts are variously regulated, timed, synchronized and coordinated by devices which receive their power from this power input, except various electrical control devices comprising electrically actuated switches and relays principally located on an electrical relay device or control board 13. The relays are set in operation by closing switches which engage various moving parts of the centrally driven parts. As illustrated in Figs. 1, 2, 3 and 4, the power is transmitted from the motor 10 to the spraying conveyor 1 where the first operations in the cycle are performed, (Fig. 2) through a worm gear 84, drive shaft 26, speed reducer 27, shaft 28, sprocket 29, chain 30, sprocket 31, shaft 32, crank 33 mounted on disc 32' keyed to the shaft 32, Geneva gear mechanism comprising the Geneva gear 34, shaft 35, pinion 36 and gear wheel 37 which is keyed to shaft 38 and mounted in the journals 38' on the frame. Two main sprocket wheels 39 are keyed onto the shaft 38 and they mesh with and drive the slide chains 1 of the first conveyor. At the opposite end of the conveyor from the Geneva gear driving device, the chains are mounted on sprocket wheels 40 which are keyed to the idler shaft 41 mounted in the journals 42 on the rails 43 of the frame.

*The conveyors*

The plates 21, upon which the fluid ceramic slip is deposited in layers by spraying, are removably mounted on the plate carriers 5 from the location marked In in Fig. 1. The plate carriers (Figs. 3, 4, 10, 45 and 47) have flat upper grooved surfaces which are adapted to be in registry with the flat under-surfaces of the plates 21 and the elongated key or tongue 22 attached to the under side of the plates. Lower extensions (Fig. 6) of the carriers 5 are somewhat T-shaped with a cross member 45 of the T and a part of the cross member 45 split so as to form four arms on the upright 44 which extend between and are attached to turn on opposite ends in mountings attached to each of the side chains 1 which are driven by the sprockets 39. The T-shaped link members 48 (Figs. 4 and 10) having an upper extension for attaching the arms 45 are incorporated as links in the roller chain. In the upper flight of the plate carriers the rollers 49 on the modified links 48 roll on the upper surface of the side rails 50 in their upper flight and on the rails 52 in their lower or return flight (Figs. 4, 6 and 9). This provides means for supporting the plates in a generally upright position with the grooved flat plate-supporting surface horizontal and facing upwardly when the plates are progressing along the top flight of the carrier chain. To avoid undue sagging and stretching of the chain and to carry the plates at a constant level, shoe members 48 on the outside of the plate carriers have rolls 49 which ride along the side rails 50 during the upper flight of the carriers.

On the lower or return flight, the carriers are supported by the track on angle bar 52 over which the rolls 49 of the chains are drawn. Provided also at the sides and over the top of the tracks 50 of the spray conveyor only are elongated hood members 51 (Figs. 4 and 9) which terminate at both ends beyond the end walls of the spray booth 6. These hoods 51 are attached to the frame and are low enough to permit the plate carriers 5 to pass freely above them. The hoods 51 serve to prevent an accumulation of ceramic material on the tracks 50 and the chains 1a. In the return flight of the carriers of all conveyors (Fig. 6), the chain is supported by the angle bars 52 which are attached to the frame and constitute rectilinear parallel tracks. The rolls 49 of the chain engage and roll along the track 52.

The Geneva drive (Figs. 4, 5 and 6) at the end of conveyor 1 regulates the progress and dwells of the spray conveyor 1 through the spray booth so that the plates 21 will be stopped in their forward movement or allowed to momentarily dwell for periods of time sufficient to permit the spray of ceramic slip from spray guns 70 to traverse the plates over and back when the plates have been advanced and stopped within spraying range. These stops or dwells for spraying are referred to herein as short dwells. After each short dwell the plates are moved forward a short distance and new areas of the same plates are again traversed by the spray of ceramic slip during a succeeding short dwell. Thus the advances of the chain conveyor are regulated by the Geneva drive so that the plates are coated in overlapping strips of spray, the spray guns being regulated to produce a narrow strip of coating of uniform thickness while a plate underneath the spray guns is in each short dwell, hereinafter to be explained more in detail. The interrupted movement and short dwells of the plates on conveyor 1 continue until the pair of leading plates carrying their coatings of ceramic slip have progressed to the transfer station in front of ceramic drier conveyor 2, near the end of the upper flight of this conveyor and in proper position to be transferred to the drier conveyor 2. At this time the Geneva gear operatively attached to the conveyor 1 is arranged to provide a long dwell which is sufficient to permit the coated plates to be transferred transversely from one end of the conveyor 1 onto the drier conveyor 2 and to transfer plates from the paint drier conveyor 4 to the other end of conveyor 1.

This transfer from conveyor 1 to conveyor 2 is done by an overhead transfer device located at the near end of the drier-tunnel 7 and above the transfer station at the right end of conveyor 1. The transfer device receives power from the central motor 10 through chain 105

(Fig. 13) and is timed to remove the plates from the spray conveyor 1 during the long dwell imposed by the Geneva gear. There are four similar overhead transfer mechanisms for transferring the plates to the four conveyors. Their operation is similar and will be described in detail with reference to the transfer of the plates from conveyor 1 to conveyor 2.

The spray conveyor 1 is driven directly by the Geneva gear from the sprockets 39 (Fig. 2), the ceramic drier conveyor is driven directly from the main motor 10 through shaft 160, worm gear 162, shaft 164, reducing gear 165, sprocket 166, chain 168, sprocket 170, shaft 171 and sprockets 158 which are keyed to the shaft 171. The squeegee conveyor chain 3 is driven by the cycloidal drive in the casing 214 through worm gear 215, shaft 216, and sprocket wheels 217. The paint drying conveyor chains 4 are driven by the motor 10 through shaft 26, worm gear 27, shaft 72, reducing gears 75 and 77, shaft 79, sprocket 166a, chain 168d, sprocket 170d, shaft 171d and sprockets 158d. Except for the differences noted, the construction of all the conveyors is alike.

*The Geneva drive for the spray conveyor*

The Geneva drive (Figs. 4, 5 and 6) comprises a Geneva gear 34, laid out to make possible 14 equally divided spaces 34' and a corresponding number of teeth, one of which teeth is left out to provide an enlarged opening for providing the long dwell of the gear 34 and the conveyor 1 during which the sprayed plates are transferred to the drying conveyor by the overhead transfer device which will later be described in detail. The drive also has a conventional Geneva locking plate 54 and a conventional Geneva gear lock 32a which, together with the sector lock 32c, is driven integrally therewith by the indexing drive shaft 32b. The Geneva locking plate 54 carries an arcuate shaped bracket 53 which is tapped for securing the locking plate and Geneva gear together by means of the screws 55.

Combined with the Geneva drive is a sector shaped plate 60 journaled for controlled rotation to rotate on the hub 35' of the driven indexed shaft 35. The arcuate edge of the sector 60 is cut with teeth like the regularly spaced teeth of the Geneva gear and with locking receptacles similar to and smaller than those of the Geneva locking plate 54. These locking receptacles are engaged by the sector lock 32c for locking the sector during its independent indexing. There are three complete teeth or cogs in the sector 60 and a half cog at either edge of the sector. The sector carries two bosses 62 and 68 which engage the heads of adjusting screws 64 and 66 respectively which are carried by the bosses 64a and 66a respectively on the Geneva gear 34. The bosses 64a and 66a are located so that an abutment 68 will be picked up during the counterclockwise indexing of the Geneva gear 34 and the leading half tooth of the sector will coincide with the corresponding part of the leading tooth at the edge of the sole large space (Fig. 5) of the Geneva gear. For the next three revolutions of the indexing crank pin 33, the Geneva gear will remain stationary or in the herein designated long dwell, during which dwell a pair of spray plates is being transferred from the spray conveyor to the ceramic drying conveyor. Upon the next revolution of the indexing crank pin 33, engagement is made with the regular spacing of the Geneva gear 34 and regular indexing together with the locking of the locking plate 54 between indexes, in the regular manner.

Combined also with the conventional Geneva gear is an auxiliary driven lock and switch cam operator comprising the sprocket wheel 134 (Fig. 5) which is driven by the chain 130 from the sprocket wheel 132, the latter being keyed to the main indexing drive shaft 32 of the Geneva gear. The sprocket wheel 134 is geared to make four revolutions for each revolution of the Geneva gear 34 and its driven shaft 35. The sprocket wheel 134 is keyed to shaft 128 upon which is keyed a switch operating cam 119 and a cam disc 136 in which the cam channel 138 is formed for receiving the roller 140 which is mounted on the Geneva disc 34. The cam channel 138 is arranged so that the cam roller 140 will be passing through the channel during the long dwell while the sector 60 is being indexed by the shaft 33 and Geneva gear 34 is disengaged. With this arrangement, the engagement of the roller 140 in the cam slot 138 locks the Geneva gear 34, and prevents it from turning during the manipulation of the segment 60 or during all of the long dwell. At the end of the indexing of the sector 60, the slot 138 is arranged to be discontinued so that the roller 140 will no longer lock the Geneva gear 34. The entire action just described occurs during the time that a pair of plates is being transferred from the spray conveyor to the ceramic drying conveyor.

The switch cam 119 operates the switch 118 which closes the contacts 118c in the circuit of the solenoid SG₁ (Fig. 53). Cooperating with this cam in the circuit control is cam 124 on the disc 124a which is keyed to the driven shaft 35 and revolves one-fourth as fast as cam 119. Cam 124, as stated, operates switch lever 122 of the switch 120 making, as stated above, one-fourth as many contacts with this switch lever as cam 119 makes with the switch lever 117 of switch 118. During each revolution of the driven shaft 35, the cam 124 causes contacts 120c (Fig. 53) in the circuit of the solenoid valve SG₁ to close. The cams 119 and 124 are arranged so that the contacts 118c and 120c will be closed while the plates on the spray conveyor are in that portion of the long dwell which occurs after the spray guns have made one traverse across the plates for discontinuing the spray of ceramic material for the remainder of the long dwell. Accordingly, cam 119 is shortened to allow the spray guns to make one pass after the long dwell starts and it extends so as to permit the contacts 120c to open when the long dwell ends. Thus during the long dwell of the conveyor 1 while a pair of plates is being transferred onto the drier conveyor 2, the supply of all air to the spray guns is cut off after one pass of the guns across the plates takes place. Although the spray guns continue to reciprocate, no spraying takes place during the remaining period of the long dwell.

The Geneva gear is driven from the main motor 10 through shaft 28, sprocket wheel 29, chain 30 and sprocket wheel 31 which is keyed to the shaft 32. The Geneva gear 34 is keyed to the output shaft 35 which carries the gear wheel 36. The spray conveyor chain is indexed from the Geneva gear 34 by the sprocket wheels 39 which are keyed to the driven shaft 38 and this receives its power from the gear wheel 37 which meshes with the gear wheel 36.

The abutment 62 on the sector 60 and the abutment 64a on the Geneva gear 34 are arranged so that contact is made at the end of the long dwell. Upon the subsequent and regular indexing of the Geneva gear in the counterclockwise direction, the sector 60 is permitted to follow the Geneva gear until it hangs perpendicularly downwards as a pendulum. Then, when the Geneva gear has been indexed forwardly so that the teeth of sector 60 are in position with respect to the teeth of Geneva gear 34 to start the long dwell, the sector 60 is carried along by the Geneva gear 34 by reason of the contacting abutment 66 and 68. Thus the segment is carried along by the Geneva gear 34 until the first half tooth thereof comes into contact with the indexing pin 33 and the long dwell begins.

During the long dwell of the Geneva drive and the spray conveyor 1, the plates are also transferred from the paint drying conveyor 4 to the spray conveyor at the beginning of a repeated circuit of the plates.

The chain 152 carrying the plate transferring finger 172 (Fig. 9) of the overhead transfer mechanism is timed to make a complete circuit for every complete circuit of the disc 34 of the Geneva mechanism, but a part of the movement of the finger 172 is at slow speed and part of it is at a high but variable velocity, the latter being provided to assure that the plates will be removed from the spray conveyor 1 to the drying conveyor 2 during the long dwell of the spray conveyor. The high and variable velocity is attained by a cycloidal device incorporated in the transfer mechanism which drives the chain 152, as will be hereinafter described. The period of time allotted for the long dwell of conveyor 1, such as during the time a pair of plates must be transferred from or to the conveyor 1, is relatively short and the cycloidal mechanism is therefore set so that the rapid part of its cycle will occur during the dwell, as will appear in the detailed description of the overhead transfer device, later to be set forth. Means are provided in the transfer device for adjusting this function.

*The spray guns and control thereof*

The spray guns 70 (Figs. 1, 2, 3, 4, 7 and 8) in the spray booth 6 are constantly carried back and forth transversely across the line of movement of the platens 21 by power supplied from motor 10 through the worm reducing gear 27, shaft 72, sprocket 74, chain drive 76, sprocket 78, shaft 82, sprocket 83 and chain 86 to sprocket 85. This movement of the guns continues whether or not the conveyor 1 is in motion and whether or not the conveyor is being indexed in short or long dwells; but the spray nozzles are closed when the conveyor and plates are in motion, thereby discontinuing the spraying except when the plates are at rest between the short indexings. Thus the spray of ceramic slurry from the guns is ejected only during a part of each of the short dwells. Spraying is discontinued by discontinuing the supply of slurry at the ends of the strokes of the spray guns, all by a control means actuated by mechanism on the spray gun carriage, to be described below, in connection with the operation of the spray guns. Compressed air for spraying is discontinued during long dwells by an electrical control which is actuated by the Geneva drive and closes the solenoid operated air valve SG in the compressed air supply pipe leading to the spray guns as was described in connection with the description of the Geneva drive.

The chain 86 (Figs. 4, 7 and 8) of the spray gun manipulator is driven by the sprocket 83 keyed to the shaft 82 and the chain 86 drives the idling sprocket 85 on the idling shaft 82' mounted on the frame member 88. These sprockets are separated the desired distance for the stroke of the spray guns. The frame member 88 also carries the upper and lower tracks 90 (only one of which is shown in Fig. 4) running longitudinally along the upper and lower parallel webs of the stationary frame 88. The spray guns 70 are supported on a carriage 94 which travels back and forth above the depositories or plates on the spray conveyor. The spray guns direct spray jets of ceramic material onto the surfaces of the plates only during their travel across the plates while the spraying is discontinued at the ends of the strokes of the spray guns. Certain of the operating mechanism for this purpose is carried by the carriage 94 which comprises two vertically arranged trackways 98 for guiding a rider 96. The rider 96 is pivotally attached to chain 86 at the chain pin 97 as the chain is propelled around the sprockets 83 and 85. A reciprocating motion is imparted to the carriage 94 and spray gun 70. Mounted on the rider 96 are four grooved wheels 100 which engage the trackways 98 so that the pivot 97 will be held in proper relation to the chain 86 during its continuous travel around the sprockets 83 and 85. Four pairs of angularly disposed rollers 92 (two pairs above and two below) mounted on the spray gun carriage 94 roll back and forth along the divergently inclined surfaces of the parallel tracks 90 which carry the spray guns 70 and the pusher rod 105 (Fig. 7). The spray guns are of well known design and are not described in detail except in so far as the control of spraying is concerned. The spraying is controlled in part by a compressed air operated valve such as the normally open spring pressed auxiliary air shut-off valve 112 which is mechanically actuated, and in part by a solenoid operated air valve SG the actuating circuit of which is controlled in turn by the Geneva mechanism, as described hereinbefore.

The air and slurry supply to the spray guns is caused to be discontinued by mechanically operated means controlled by the cam 106 and pusher rod 105 every time the carriage, the spray guns and the rider roller 104 approach the ends of their strokes. The spraying is also caused to cease during all long pauses by the operation of solenoid valve SG, except for one traverse of the spray guns at the beginning thereof, although the spray guns continue to reciprocate during all of the long dwell. During the long dwells the spraying is controlled from the Geneva gear mechanism as described hereinabove.

For the purpose of shutting off the spraying air and slurry at the ends of the strokes of the gun carriage during indexing, the roller 104 rides upwardly onto one or the other of the elevated end portions of the cam 106, thereby depressing the opposite end of arm 102 and the push rod 105 against the spring 108. The cam 110 is shaped to thrust the push rod of the valve 112 into depressed position and the valve 112 is closed against a spring (not shown) that normally holds it open, thereby shutting off the auxiliary air which, when so discontinued, allows a spring closed valve (not shown) in casing 70 to close, shutting off both slurry and spray air. When the roller 104 is traversing the lower level of the cam 106 and the spray gun is traversing the plates, the push rod 105 and cam 110 are withdrawn by the spring 108 and the spring biased air valve 112 is opened to admit compressed air from the auxiliary compressed air line 114 to the air pressure operated valve in the casing 70 of the spray guns (not shown). When this air is admitted, it operates air operated shut-off valves in the casings 70 which open the ports for supplying slip and air for spraying. Thus the spray guns are always shut off at the ends of the strokes, or approximately during the travel of the rider 96 around the sprocket wheels 83 and 85 whether or not they are supplied with material to be sprayed. The spraying is additionally regulated by controlling the supply of material to be sprayed to the guns during the entire cycle when the plates are in the long dwells. The latter is done by discontinuing the entire supply of air and is regulated by the solenoid operated valve SG in the stationary part of the main air line which is controlled in turn by the Geneva device. The latter, or electrically controlled means operates independently of the mechanically controlled shut-off valve 112.

During the time that the spray guns are at the ends of their strokes, compressed air and slip is cut off from the spray guns and they are therefore inoperative; but during the time that the guns are being moved across the platens at constant speed, compressed air and slip are admitted to the nozzles by the mechanically controlled valve (except when the platens are in a long dwell). This produces uniformity along the entire length of the strip of ceramic deposit produced on the plates by single transverse passes of the spray guns. The foregoing spraying of the spray guns takes place during the short dwells of the conveyor 1 and platens 21, but not during the long dwell. There being 12 short dwells of the conveyor and Geneva gear in the illustrated embodiment for each pair of plates, it follows that each plate is moved into 6 positions under the spray nozzles during the production of the coating and it is found that a coating of uniform thickness is thus produced.

The above mentioned solenoid-operated spring closed valve SG (not shown) is located in the main air supply line 116' through which air is supplied both to the auxiliary air line 112' and spray air line 116 (Fig. 8). This valve is closed when the solenoid $SG_1$ (Fig. 53) of the solenoid-operated valve is deenergized. Therefore, when the solenoid $SG_1$ is deenergized, control valve 112 ceases to perform its function although the cam 110 may continue to open and close it. Regardless of this, however, no spraying can take place during the long dwell since the supply of spraying air and the supply of auxiliary air to the spray gun and to the control valve 112 are both discontinued.

The solenoid of valve SG is deenergized when contacts 118c and 120c (Fig. 53) are both open since these contacts are parallel with each other and in series with solenoid $SG_1$. Both contacts are open, solenoid $SG_1$ is deenergized and the main air supply to the spray guns is shut off during the long dwell of the plates from the time that the spray guns have made one traverse of the plates after the long dwell has started until the long dwell has ended as described above. This time interval is established by a proper setting of cams 119 and 124 on the Geneva mechanism (Figs. 5 and 6). These contacts 118c and 120c are controlled by switches 118 and 120 which are operated by cams 119 and 124, respectively, of the Geneva mechanism. The switches 118 and 120 are normally opened by springs operating against the switch levers 117 and 122 (Figs. 5 and 6), and they are closed when the cams are impressed upon the switch levers. Cam 119 is mounted to turn with shaft 128 and is geared to engage the switch lever 117 of switch 118 four times for each engagement of the cam 124 with the switch lever 122 of switch 120 so that both switches will be open simultaneously every fourth revolution of cam 119. The cams 119 and 124 are set so that the period when both switches 119 and 120 are in open position will be a short interval after the spray gun has made its first pass during the long dwell. Cam 119 is proportioned so that the end of the open position of switch lever 117 of switch 118 will occur at the moment that the long dwell ends.

The solenoid operated valve SG is also caused to close and the spraying is caused to discontinue when one or a number of other operating conditions occur in the system, namely, when the starter circuit for the main motor 10 is opened as by pressing the stop button 400a (Fig. 53), when the succession of plates entering the spray booth is discontinuous or is at an end and the plate switch PL is opened or when the machine is stopped by operation of any of the safety switches to operate relay SR and open contacts SR1 in the motor starter circuit. The possibility of energizing solenoid SG1 is delayed after starting a series of plates in the spray booth by the operation of the timer ST which actuates the contact ST1 to closed position after it has timed out. The operating lever of the plate detector switch PL is constructed to engage the plates entering the spray booth and to remain closed as long as a series of plates enters the booth in an unbroken succession. When, however, the succession of plates is broken or ends, the switch PL opens, deenergizing the timer ST and causing contacts ST1 to open, deenergizing R1 and opening contact R1S in the circuit of coil SG1, so that the solenoid SG becomes deenergized in the manner hereinafter more particularly described and the supply of air to the spray guns is shut off. When another batch of succeeding plates enter the spray booth, switch PL is operated to closed position and a new sequence of operations is initiated.

*The ceramic drying conveyor*

When a pair of sprayed platens 21 is brought onto conveyor 1 into position for transferring them to the drier conveyor 2, the overhead transfer device mounted on the frame of the machine (Figs. 1–4, 9–14) is arranged to effect the transfer. Referring more particularly to Figs. 4, 9 to 12 and 24, the overhead transfer device has a pair of fingers 172 mounted on tubular rotatable members 150 which rotate on bars 151 which are intermediately carried by endless chains 152. The fingers 172 engage the outside edges of the platens 21 and push them transversely from the supports 5 of the spray conveyor during a long dwell of conveyor 1 onto parallel bars, rails or skids 154 and 154' (Fig. 23) of the conveyor 2. The keys 22 and 22' of the platens 21 readily slide endwise (Fig. 9) out of the slots 23 of carriers 5 and the platens are received on the rails or skids 154 and 154' upon which they readily slide. The rails 154 extend along the length of the upper flight of drier conveyors 2 or 4. The four chains 2 and 4 of the drier conveyors are carried on the four sets of sprocket wheels namely driving wheels 158 and 158d and driven wheels 174 and 174c. Conveyor chains 2 are driven from the motor 10 through shaft 160, worm gear 162, shaft 164, reducing gear 165, sprocket wheel 166, chain 168, sprocket wheel 170 which is keyed to shaft 171 and shaft 171 to sprocket wheels 158 which are also keyed on shaft 171. The sprocket wheels 174 at the other end of the conveyor are keyed on idling shaft 176 and are driven by the chains 2. At the outer end of shaft 176 is keyed the sprocket wheel 184 carrying the chain 185 through which the overhead transfer device (later to be described) is driven. The sprocket wheels 174 are located to carry the outer chains outside of the outer rails 154 and the inside chains in the space between the inner rails 154.

The chains 2 carry the lugs 180 (Fig. 9) which are spaced apart lengthwise thereof so that they will just meet the trailing edges of the platens 21 when the platens are pushed onto the skids by the fingers 172 of the overhead transfer device. After being engaged by the lugs 180, the platens 21 carrying their coatings of ceramic slip are carried forward underneath the heating units 6 (Figs. 1 and 9) and through the drying tunnel 7. Air is blown into the drying tunnel through the pipe 182 which is supplied with air from a blower (not shown). The blower is electrically driven and a safety switch 405a opens when the main switch connecting the power line to the blower is opened to prevent the machine from operating unless air is being supplied.

*The overhead transfer devices*

There are four similarly constructed overhead transfer devices. The one for transferring plates from spray conveyor 1 to drier conveyor 2 and the one for transferring the plates from drier conveyor 4 are timed to transfer the plates in accordance with the timing of the long dwell of the spray conveyor. The squeegee conveyor 3 is regulated to have an average speed like that of the spray conveyor, all dwells, however, being alike. The squeegee conveyor is synchronized with the long dwells or discharges of the plates from the spray conveyor so that two plate carriers will be brought into position for receiving two plates from the drier conveyor 2 for every complete cycle of the Geneva mechanism. Likewise, the overhead transfer devices at the receiving and discharge ends of squeegee conveyor 3 have an average time cycle the same as those at the opposite ends of the drier conveyors but their movements during the actual transfer of the plates are synchronized with the dwells of the squeegee conveyor.

The overhead transfer devices are driven by the conveyor chains from sprockets 184 keyed to shafts 176, 171, 176c and 171d through sprocket chains 185, 185a, 185b and 185c (Figs. 2, 9, 10, 11 and 12) to sprocket wheels 186 (Figs. 11 and 12) of the four overhead transfer devices. The overhead transfer device which comprises the continuous chain 152 and fingers 172 is driven continuously from the same source of power that furnishes movement for conveyor chain 2 (Fig. 2). However, the chain 152 and fingers 172 are driven directly through a planetary gear interposed between driven sprocket 186 and sprocket 190 carrying chain 152, and the movement of chain 152 is variable. Sprocket wheel 186 is rotatably mounted on a fixed stub shaft 181 (Figs. 11 and 14). Attached to sprocket wheel 186 is a crank arm 183 (Figs. 11 and 12) which is provided with a stub shaft 188 near its outer end.

The stub shaft 188 has a dual purpose, firstly to support a gear 193 which is rotatably mounted thereon and adapted to mesh with and revolve about a second similar or sun gear 195 which latter is keyed on stub shaft 181; and secondly (at its outer end) to support an arm 197 which is integral with gear 193 and which in turn carries a stub shaft 197' upon which the roller 199 is mounted, the latter being adapted to traverse a radial slot 201 formed in an arm 202. Thus the rotation of the planet gear 193 and its dependent arm 197 around the sun gear 195 results in a travel of variable velocity of the roller 199 which engages and drives the output arm 202. The arm 202 is attached to a gear 203 by means of a bolt 203' and the arm rotates with the gear 203 which is journaled on the stub shaft 181. A pinion 204 keyed to shaft 187 meshes with gear wheel 203. The shaft 187 is rotatably supported in suitable bearings on the frame of the machine. Pinion 204 is keyed to the end of the shaft 187 to which is keyed the two sprocket wheels 190 (Figs. 11, 13 and 14) carrying the sprocket chains 152.

In operation the sprocket chain 185 is continuously driven, imparting like movement to sprocket 186 and causing it to rotate about the fixed stub shaft 181, and simultaneously swing the arm 183 (Fig. 12) and therewith stud 188 in a circular path. This movement will cause the gear 193 to rotate on its stud due to its meshing with fixed gear 195 and at the same time to revolve as a planet about the stub shaft 181. The planet arm 197 supporting roller 199 also carried by this stub 188 will follow an arcuate path while the roller 199 supported at its outer free end tracks within the slot 201 formed in variable speed arm 202. Due to the planetary action the arm 202, and therewith the attached gear 203, rotate with a variable speed. This movement is imparted to pinion 204 and shaft 187 causing the sprockets 190 to move the sprocket chains 152 in the direction of the arrow shown in Figs. 11 and 13. These sprocket chains 152 support the cross bar arrangement shown in Figs. 14 and 24 hereinbefore described, and carry the fingers 172. The fingers in turn are caused to be lowered by the action of cam 178 (Fig. 13) in their lower flight in order to engage the edges of two adjacent platens to be transferred to or from the drier conveyor.

The planetary on the transfer devices for transferring the plates to and from the spray conveyor are set so that the rapid portion of the cycloidal movement of fingers 172 occurs immediately after the beginning of a long dwell of the spray conveyor and the fingers are arranged so that the plates will then be engaged for removing them from or loading them onto the carriers of the spray conveyor. The squeegee conveyor is arranged to have two equal dwells between each long dwell of the spray conveyor 1, the transfer devices which load and unload the squeegee conveyor are arranged and so timed that they will pick up or deposit a set of plates from the drying conveyors at the beginning of every second dwell of squeegee conveyor 3. Due to the planetary action above described, the movement of the plates is accelerated and the fingers quickly move the two platens in their side-by-side relation onto the skids 154 of the drier conveyors or carriers 5 of chains 1 and 3. The chain 3 being arranged at right angles to chain 2, the platens 21 are received by the former and advanced in a single line formation. The action of fingers 172 in the operation of engaging the edges of the plates is best seen in Figs. 24 to 26, wherein the chain 152 is shown carrying the fingers forward in the direction of the arrow.

The fingers 172 (Figs. 14 and 24) are carried intermediately by the chain 152 and immediately by tubular members 150 which are rotatably mounted on the shaft 151. This shaft is mounted at its ends in blocks 153 which are carried in turn by two bolts 157 of the chains 152. The fingers 172 are projections on the tubular shafts 150 and the latter one is free to turn on the shaft 151. The lever members 179' are likewise projections on the tubular shafts 150 and the tubes 150 are fastened together at the ends of the levers 179' by a roller 179 which is secured to the ends of the levers 179' by set screws.

Blocks 153 carrying inwardly projecting pins 155 are secured with the pins 157 to the chain 152 and the shaft 151 is carried in holes in the blocks 153. One end of the coil spring 175 is attached to a projection 177 on each of the fingers 172 and at the other ends to the blocks 153 for maintaining the fingers 172 in a raised position and out of engagement with the plates, such as that shown in Fig. 26 when the spring 175 presses against the pin 155 and maintains a cam roller 179 in the upright position shown in Figs. 24 and 26. The fingers 172 and roller 179 are in this normal position for the major part of the circuit of chain 152 so that fingers 172 may not engage the edges of the platens 21 or come in contact with the coating on the plates. The cam 178 is fixedly mounted on the frame midway between the sprocket wheels 190 in position to engage the roller 179 on the lever 179', the latter being integral with the tubular cross bar 150. This cam 178 is shaped at the leading end to present a somewhat circular track to depress arms 179' and finger 172 at the beginning of the engagement. At the following end at 178' the track is concave to the rider portion so that the rider 179 will travel upwardly permitting the finger 172 to pivot backwardly, upwardly and out of engagement with the platens at the end of the engagement. (Fig. 13.) Then in a short travel of the rider, the cam 178 is terminated and the fingers again are permitted to be positioned in the fully non-engaging or normal position shown in Fig. 26.

*The adjusting and safety device*

Due to the stretching of the drive chains or to maladjustment after the replacement of parts, it may happen that the platens 21 will not be cleared from the conveyor 1 before the conclusion of the long dwell, and the platens resting partly on the skids 154 will be pushed to one side thereof. In order to avoid damage in such a contingency, an end section 154' (Figs. 23 and 24) of the skid which would engage the keys 22 of the platens 21 if the platens were pushed to one side by the advance of the conveyor 1, is pivoted on the frame at its inner end 191 so that its end nearest the conveyor 1 will swing in the direction of travel of conveyor 1. The bars 154' are held in a normal position by biasing them against the springs 192 which are held on the bolts 194 and are pressed against collars 196 interposed between the skid members 154 and section 154'. Electric switches 209 mounted on the frame are in the circuit of relay SR and have operating levers 198 which are disposed to engage the bars 154' and are actuated to open one of the contacts 200a in the switches 200 (Fig. 53) when either of the two platens being transferred is pushed to the right thereby causing the main motor to cut out and stop the machine. There are four safety devices of this kind which operate in conjunction with the drier conveyors 2 and 4. Two of the devices are at the receiving ends of conveyors 2 and 4, and the other two are at the discharge ends of these conveyors. At the discharge ends, movable skid members 154' and the switch levers 198 are arranged to be operated to open circuit positions by the squeegee conveyor or the spray conveyor, as the case may be, when the plates are tardily removed from such conveyor.

The pairs of platens 21 travel side by side through the drying oven 7 on conveyor 2 toward the squeegee conveyor 3 and have on their surfaces a layer of ceramic material which is dried and hardened sufficiently in its passage through the drying oven to sustain a coating of conductive material, such as the metallic ceramic paint, next to be applied. Near the end of their travel on the drying conveyor 2, the platens 21 are again engaged by a transfer device, similar to the transfer device described above. The latter transfers the pairs of platens onto the platen supports 5 of the squeegee conveyor 3. At the same time, the squeegee conveyor is caused to dwell by the action of a combined Geneva and planetary device housed in casing 214 (Figs. 34 and 35) through which the squeegee conveyor is driven. On the squeegee conveyor the plates are arranged in single file similar to the arrangement on conveyor 1 except that the leading platen of each pair of platens on the squeegee conveyor 3 was the following platen on the spray conveyor 1.

The transfer mechanism is like that used to transfer the platens onto the conveyor 2 except that it operates to push the plates away from conveyor 2 instead of toward it. The transfer mechanism is driven by shaft 171, sprocket 184 and chain 185a in the same way that the transfer device at the opposite end of the drier conveyor is driven. The drive is arranged to bring the fingers 172 of the transfer device in contact with the following edges of the platens by finger-tilting cam 178 as the platens are pushed along by the dogs 180 on the drier conveyor 2 and the platens approach the squeegee conveyor 3. The second pair of platens 21 as shown in Fig. 13 follow some distance behind the first pair, e. g. a distance proportional to the time required for the Geneva plate 34 to be operated through one complete cycle. The leading pair of platens is desirably started on the spray conveyor 1 with the master plate second in line so that the master plate will be the first in line on the squeegee conveyor 3, and the platens with short keys will follow thereon the same as they did on conveyor 1 except that each pair will be reversed in order from their order of arrangement on the spray conveyor.

While the platens 21 are being transferred to the squeegee conveyor, the conveyor is caused to dwell by the action of the planetary mechanism in casing 214 a sufficient period for the platens to become accurately positioned on the squeegee conveyor with the keys 22 of the platens in the slots 23 of the carriers 5. As soon as the platens are properly located on the squeegee conveyor, the convexed portion 178' (Fig. 13) at the following end of cam 178 permits the fingers 172 of the transfer device to move upwardly, backwardly and away from contact with the edges of the platens, thereby permitting the fingers 172 to pass over the coated platens without contacting therewith. As soon as this action is completed, the platens on the squeegee conveyor are advanced step by step and with predetermined dwells toward the squeegee mechanisms in response to the planetary mechanism in the manner just described.

The chains bearing the platen carriers 5 of squeegee conveyor 3 are driven by motor 10 (Fig. 2) through shaft 160, worm gear 162, shaft 210, sprocket 211, chain 212, sprocket 213, the planetary mechanism in the casing 214, worm gear 215, shaft 216 (mounted on the frame) and driven sprockets 217 which are keyed to the shafts 216 and over which the chains 3 of the squeegee conveyor are disposed like the chain 1 and carrier at the sprayer end of the system. The chains are spanned over the idler sprockets 218 on the jack shaft 219 which is mounted on the frame at the other end.

*The planetary drive for the squeegee conveyor*

The squeegee conveyor is driven and indexed by the planetary drive which is located in casing 214 (Figs. 31 to 35). This device also comprises an attached casing 214' for operating cams in an attached casing 214' for operating switches C and D (Fig. 33) which operate contacts Cc and Dc (Fig. 53) in the squeegee solenoid and discharge solenoid circuits, respectively. Switch C is actuated by cam 258c on the cam wheel 257 which is keyed to shaft 232 of the Geneva gear actuated clutch control cam 235 of the planetary drive. The cam 258c is arranged to operate the switch lever 258d and close the switch Cc when the squeegee conveyor dwells so that the squeegee devices may operate when other contacts in these circuits are closed; and to open the switch Cc when the squeegee conveyor indexes so that the squeegee devices may not operate. The contacts Dc of the main discharge solenoid switch D are actuated to closed position by the cam 259c which engages switch operator 259d and closes the contacts and permits the operation of relay DR and the discharge solenoid DS (Fig. 28), when the switch P3 at the discharge station is operated to closed position by the plates. These operations of the switches C and D are controlled by the Geneva gear which also controls the engagement and disengagement of the planetary drive which indexes the squeegee conveyor.

Referring to Figs. 31 to 38, 38A, and 38B, the planetary drive comprises a base 214a which may be mounted on a suitable support. Brackets 227 on the base 214a are journaled for supporting the operating members. A casing or cover 214 encloses the operating parts. The power input is through the sprocket wheel 213 which is keyed to the shaft 220. The shaft 220 is journaled near one end in the journal 221 which is carried by bracket 227 and within the revolving hub 222 of the output driven lever 255 (Fig. 34) which is journaled in turn in the main output end bearing 223 at the output end of the device.

The Geneva driving gear 224 is keyed to the shaft 220 and meshes with the gear 225 which is journaled on a stub shaft 226 bolted on the bracket member 227. A Geneva disc operating lever 228 is journaled on stub shaft 226 and is secured to gear 225 by the bolt 229. This lever is extended for mounting the roller 231 at the end on the stub shaft 231' for engaging the slot and cam faces of the four-part Geneva gear 230. The Geneva gear 230 is keyed to the shaft 232 which is mounted to rotate in the journals 233 and 234 of the brackets 227. On the shaft 232 is also keyed the latch operating cam 235 which directly actuates the clutch or latch on the power output lever 255 into engaging and disengaging position with the driven slotted lever 246 of the epicycloid mechanism. The train including the four-part Geneva gear regulates the frequency that the output lever 255 is actuated. The gears 224 and 225 are of equal diameter so that in operation the Geneva gear 230, shaft 232 and cam 235 are rotated one revolution for each four revolutions of the input gear 213, shaft 220 and Geneva driving gear 224.

The planetary unit or mechanism comprises the sun gear 243, pinned to the bracket 227, which meshes with the planet gear 242. The planet gear 242 is keyed to a stub shaft 241 (Fig. 34) which is journaled in the end of the driving arm 240. The driving arm 240 is keyed to the shaft 220 so that it revolves with the shaft. The crank lever 244 is secured to the outer end of stub shaft 241. At the extremity of the crank lever 244 is fastened a stud 244' upon which is journaled the sliding block 245 which engages the slotted arm 246. The slotted arm 246 is journaled on the main shaft 220. This arm is provided with the slot 246' or longitudinal runway in which the sliding block 245 slides from end to end of the slot 246' as the crank lever 244 is turned and simultaneously propels the slotted lever 246 through a variable movement controlled by the cycloidal path of the slide block (Figs. 36, 37 and 38). Engagement between arm 246 and lever 255 is then made and broken by means of a suitable clutch or latch for producing an intermittent variable drive or indexing of the output power lever 255 and the device sought to be driven or indexed.

The engagement and disengagement of the driven member 255 with the slotted arm 246 is made in the present device during a short dwell of the block 245 when the arm is at virtual rest or average zero power output. The latter is accomplished by making the crank arm 244 slightly longer than the pitch radius of the planet gear 242. By this increase of the arm 244 the path of a point in the axis of the stub shaft 244' is a loop at that point where a cusp otherwise occurs in a cycloidal curve when the radius of crank arm 244 is made equal to the pitch radius of the planet gear 242. For example, a desirable arrangement comprises making the arm 244 eight-thousandths of an inch longer than the pitch radius of the planet gear 242 for each inch of pitch radius of the planet gear. Each 0.008 of an inch lengthening of the arm per inch of pitch radius produces an arcuate movement of the slotted arm 246 of 0.001 of a radian. While the slotted arm 246 moves 0.001 radian, the arm 240 moves 18°. Therefore the duration of virtual rest or average zero power application to the arm 246 to which an output member is engaged and disengaged is the time required for the arm 240 to turn 18°. A slight backward movement of the slotted arm 246 is produced theoretically when the axis of the stub shaft 244' describes the loop in the epicycloidal path but this presents no difficulty in practice since a slight reversal of the movement of arm 246 does not interfere with the engagement of a clutch with the arm. In large machines where the usual tolerance is provided in the gear train, the negative characteristic is negligible.

Where it is required to stop the driven device only momentarily, the driven member may be connected directly to the arm 246. In such case, the Geneva drive and cam 235 may be omitted. Where, however, an extended dwell is desired in the driven mechanism in order, for example, to provide time for performing other operations on objects borne by a conveyor driven by the output arm 246, a clutch, latch or other form of connector must be provided. For this purpose, an abutment or clutch block 252 on the slotted arm 246 is arranged to engage a clutch, latching member or clutch latch 250 which is movable radially into and out of engagement with the clutch block 252 by means of the Geneva operated cam 235.

The clutch latch 250 is carried by the arm 237 which is mounted to slide radially in a slot 255a in the output power lever 255. The output power lever 255 is integral with the enlarged end of stub shaft 256, and this enlarged end 222 carries an internal bearing in which the shaft 220 is journaled so that the bearing 223 directly supports the short stub shaft 256 and intermediately supports the end of the shaft 220. A cover plate 260 (Fig. 38) is held in place by screws 255c and retains the arm 237 in the slot 255a so that it can freely move radially. On the outer end of the clutch latch 250, a cam follower or roller 238 is mounted to engage the track 235a of the cam 235. The track of the cam 235 (Figs. 35 and 38B) is formed with the track portions 235a, 235b, 235c and 235d. The cam is set so that the roller 238 follows the track or groove 235a while the four-part Geneva indexes the cam 235 through three-quarters of a revolution. This retains the clutch latch 250 out of engagement with the clutch block 252. In this position, the latch 250, sliding block 237 and output power arm 255 are withheld from angular displacement by the clutch latch anchor block 247. The traverse of roller 238 over the portion 235a of the cam track therefore takes place during the dwell of the arms 246 and 255. In the illustrated embodiment in which gears 224 and 225 are in 1:1 ratio, this takes place during three revolutions of the shaft 220.

With this setting of the cam 235 on the shaft 232 the roller 238 traverses the intermediate track portions 235b and 235d during the time that the axis of stud 244' is describing the loops in the cycloidal path which occur during zero motion of the power output arm 255. Cam 235 is set so that during the time the roller 238 traverses the cam track portions 235b and 235d and there is zero power transmission, the slide 237 will be moved radially inward in its slot in the arm 255 so that the clutch latch 250 will be brought into engagement with the clutch block 252 on the arm 246 for indexing the output power arm 255. In the other cam track portion 235d, the clutch 250 will be disengaged during the following zero power position of the arm 244 and slide block 245.

While the output power arm 255 is being carried through one revolution of its indexing travel and the clutch is engaged, a holding device is provided to securely retain the clutch latch 250 in engagement with the clutch block 252. This device comprises the circular upright track 251 which is mounted on a bracket member by angle clips 253 and stud bolts 253'. When the sliding block 237 and latch 250 are advanced by the cam roller 235 rolling upon the track porton 235c of the cam, the arm 255 is rotated by the arm 246 and the roller 239 rolls over the beveled edge of the circular band or track 251 and along the inside circular surface thereof. The roller 239 is mounted to turn on a pin 239' near the outer end of the sliding member 237 so that the roller 239 will enter smoothly onto the inner peripheral surface of the holding band 251 when the latch 250 is depressed by the cam track 235c into latching or clutching position. The holding ring holds the latch 250 in clutching position and prevents disengagement while the driven arm 255 carrying the sliding member 237 and clutch latch 250 are carried through one revolution of the arm 246. Towards the end of the revolution of the arm 255, the cam 235 is turned by the Geneva disc so that as the roller 239 rides off the other beveled end of the track 251, roller 238 proceeds into the other intermediate portion 235d of the cam track which has been advanced by the operation of Geneva disc 230 into position for receiving the roller 238.

Then during three indexes of the four-part Geneva disc 230, the roller 238 follows the groove 235a and the latch 250 is held out of engagement with the clutch block 252 during this time. The arm 237 and latch 250 are locked in this disengaged position by the notched clutch anchor block 247 so that they cannot turn. The anchor block 247 (Fig. 38A) is provided with a notch 248 corresponding to the cross section of the outer end of sliding bar 237 so that the outer end of bar 237 which carries the rollers 238 and 239 will slide into the notch when the sliding bar 237 is drawn into unlatching position as the roller 238 approaches groove 235a through the groove 235d. The anchor block 247 is mounted on the bracket 227 by means of bolts 247' so that the radially sliding bar 237 will enter the notch 248 when the arm 246 and slide 255 are turned by the arm 246 to the unlatching position between the ends of the circular track 251. Then the roller 238 follows the groove 235d of the cam 235 and draws the arm 237 into the notch 248. The indexed arm 255 is thus positively held from turning while it is disengaged from output lever 240 of the planetary.

Referring to Fig. 38B, the roller 238 dwells on cam 235 at the four points R, S, T and U. Between these points, the roller tracks along the cam path by reason of the turning of the cam 235 which is turned by the four-part Geneva gear in the direction indicated by the arrow. With the cam 235 turned so that the roller 238 is at T, the arm 255 dwells while the shaft 232 and cam 235 are being indexed twice by the Geneva gear. In the third indexing of the Geneva gear, the cam 235 is turned so that the roller 238 starts to track from the point R toward the point S. During the time that the roller 238 is tracking through the intermediate channel 235b from W to V, the cam 235 is moving at its maximum speed and at that time the arm 246 is at rest. The outside rim of the channel portion 235c is cut away so that the guide roller 239 on the arm 237 will travel smoothly onto the beveled end of the retainer ring 251 as the output power lever 255 rotates. At the completion of the revolution of the output power lever and the clutch latch 250, the roller 239 rides over the other beveled end of the retainer ring. By the time the roller 239 has reached this point, the Geneva gear will have turned the cam 235 so that the roller 238 will enter the intermediate channel 235d at the other end of portion 235a and the clutch latch will be drawn into release position.

The hub 222 is desirably reduced in diameter to provide a projecting portion 256 to which one member of a coupling 256' is attached for transmitting the variable speed output to a device to be indexed. It is evident that more or less variation than that illustrated can be made in the relative length of the arm 244 in order to provide more or less time for shifting the clutch latch 250. A great variety of variable movements can be provided by varying the relative size of the sun and planet gears, by varying the parting of the Geneva disc 230 and by varying the cam 235. For example, more than one cam track 235a, 235b and 235c can be formed in the cam 235 so that the reciprocating bar 237 and latch 250 will engage the clutch block 252 for more frequent indexing. The Geneva gear 230 could be parted 8 times instead of four and produce one half as many engagements of the cam latch or dwells of the conveyor without varying other parts of the device. Still another modification may comprise substituting an internally toothed ring gear for the sun gear whereby a point in the axis of stub shaft 244' will describe a hypocycloidal instead of the epicycloidal curve described by the same part in the embodiment shown. The variable movement of the indexed power output shaft 256 would then correspond to the characteristics of a hypocycloidal curve.

The squeegee applicator

As described heretofore, the first pair of switches P and N (Figs. 45, 46 and 64) at the first squeegee station are closed by the master plate upon its first traverse of the squeegee conveyor when the first plate is at the first squeegee station, thereby causing the closing of contacts P1c, and N1 (Fig. 53), thereby operating solenoid L1 which closes contacts L1c. The contacts S3c having been closed by the squeegee screen frame (Fig. 18) when the same is mounted for operation in the squeegee applicator and the contacts Cc (Fig. 53) of switch C (Fig. 33) having been closed momentarily by the cam 258c which rotates with the Geneva gear 230 of the planetary drive 214, all occurring during the long dwell of the conveyor, the circuit to the clutch solenoid relay M1 is closed, and M1 operates to close momentarily the circuit of solenoid M1 of the first squeegee applicator, and armature 300 (Figs. 17, 18, 19 and 20) on the first squeegee applicator. The armature on this squeegee applicator is withdrawn, actuating the bell crank 301 to release position. The bell crank 301 is mounted to turn on a shaft 302 which is mounted in a journal on the frame. The crank 301 is provided with a counter weight 303 which tends to hold the squared end of the leading arm of the bell crank as a stop or pawl in contact with a stop or abutment 304 on the clutch release disc 305. Upon momentarily moving the crank 301 into release position, the leading end of the crank is withdrawn from the stop 304 and the disc 305 of a single revolution clutch is allowed to turn one revolution.

The single revolution clutch of which the disc 305 is a part is constantly driven from the motor 10, through shaft 210, sprocket 311, chain 312, sprocket 313 which is keyed to jackshaft 314 journaled on the frame, sprocket 315 keyed to jackshaft 314 and drive chain 316 which drives the single-revolution-clutch driving sprocket 317. When the pawl on arm 301 engages the abutment 304 on the clutch disc 305, the squeegee is inoperative but when the arm 301 is disengaged from the abutment 304, the disc 305 keyed to the shaft 318 rotates the shaft through one revolution or until the disc 305 has revolved until the end of the momentarily lifted arm 301 again engages the abutment 304, stops the disc and again brings about the idling of the driving parts of the clutch within the disc 305. The single revolution clutch of which disc 305 is a part is a device of well known design. The single revolution clutch is hereinafter described in detail under the heading "The Clutch on the Squeegee and Discharge Devices," with special reference to Figs. 20A and 20B.

During a complete revolution of the disc 305 and shaft 318 (Figs. 17 to 20), the squeegee drive chain 319 spanning sprockets 320 and 321 is driven by bevel gear 322 keyed to shaft 318 through meshing bevel gear 323 and the sprocket 320 which are both keyed to shaft 324. Bevel gear 323 and sprocket 320 are keyed to a stub shaft 324 which is journaled in the frame 325 of the squeegee applicator. The sprocket 321 is journaled on a stub shaft 326 which is mounted on the frame 325. A transverse slot or race 327 is formed in the transversely disposed part of cross head 328 and a follower 329 attached to the chain 319 reciprocates in the slot as the chain 319 and sprocket 321 are driven by the sprocket 320, thereby causing the cross head carrying the squeegee to reciprocate longitudinally. The squeegee carriage cross head 328 has two longitudinal bores. A pair of longitudinal support rods 331 supported at their ends at the front and back by the frame 325 are journaled in the longitudinal bores, and the squeegee cross head 328 slides back and forth longitudinally on these rods. At the front end of the squeegee cross head 328 are two upper and two lower journals 332. Two slide rods 333 are adapted to reciprocate vertically in the journals 332. At the lower ends of the slide rods is attached a tie plate 334 to which the squeegee blade is directly attached. The tops of the slide rods 333 are attached to a somewhat U-shaped yoke 336 which carries a boss 337 upon which a roller 338 is appended from a bolt 339. The roller 338 rolls along the longitudinal tack 340 when it is manipulated by the cranks 341, thereby causing the vertical rods 333 and the squeegee blade to reciprocate vertically. The upper face of frame 325 is provided with two longitudinal slots 325' which are arranged to permit the reciprocations of journals 332 and associated mechanism comprising the squeegee carrier.

The driven cranks 341 and 344, upon the arms of which the inner ends of rods 340 and 340' are pivoted, are keyed to the rocker shaft 345 and the rocker shaft is mounted in journals 346 on the frame. On one end of the rocker shaft 345 is keyed a cam lever 347 having a roller or follower 348 held in engagement with the face of cam 349 on wheel 350 by the spring 351. The cam 349 is keyed to the driven or output shaft 318 of the single revolution clutch 305 so that for each revolution of the single revolution clutch (or each releasing impulse of the solenoid M1), the cam goes through one cycle. When the roller 348 is at the high point of the cam as shown in Fig. 18, the rocker arm 347 is depressed, thereby rotating the lever 341 counterclockwise and raising the end attached to the bar 340. By the same action the lever 344 is rotated lowering the bar 340'. The idler levers 342 and 343, attached to the idler shaft 345' are rotated with the bar 340 against the roller 338 mounted to rotate on the stub shaft 339, thereby elevating the squeegee carriage and squeegee to its highest point as shown in Fig. 19. The chain 319 on sprockets 320 and 321 is arranged so that the squeegee cross head has moved to the end of its stroke when the squeegee is raised to its highest point by the levers 341 and 342, and the cam is desirably proportioned so that the cam follower 348 starts to enter the raised part of cam 349 and the squeegee starts to move upwardly when the rider on the chain has traveled about 45° (Fig. 65) around the sprocket 320 or 321 depending upon the terminal position of the squeegee and cross head 328. The cam 349 is desirably proportioned also so that during the next 30° of travel of the slide 329 around the sprocket 320 or 321 the squeegee will pass through its elevational movement, during a linear displacement like that from 309 to 308 of Fig. 65. It is at the end of this displacement that the single revolution clutch disconnects the drive and causes the squeegee to remain at the end of its stroke in a raised position. At the start of the next cycle, the cam causes the squeegee to be lowered while the sprockets travel through the two 15° angles each side of the horizontal axis. This causes the squeegee to be lowered during a relatively short advance corresponding to the distance between 306 and 307 so that the squeegee descends in the rear of the puddle of paint. Thus the puddle of paint is again in position with respect to the squeegee to be swept across the squeegee screen when the squeegee is caused to make its next passage thereof.

The short traverse of the squeegee blade while it is approaching the end of its stroke and while it is being lifted provides for raising the squeegee blade over an elongated pile of paint which the blade has been propelling across the screen while the blade was in contact with the screen during the travel of the chain from the point 310' to the point 309 and from the point 310 to point 309'. In making a return or downward trip from the point 307' to the point 308' the cam 349 is shaped to cause a rapid descent of the squeegee blade during an angular travel of the chain of say 15° so that when the squeegee blade again comes into engagement with the screen, it rests on the screen along a line in back of the pile of paint. This action causes the squeegee blade to be elevated over the pile of paint from the front thereof near the conclusion of each stroke and to be lowered again in back of the pile near the beginning of its travel across the screen in the opposite direction. During about 270° of the travel of the slide 329 around the sprocket the squeegee blade 361 is in contact with the screen.

Each plate carrying the dried layer of ceramic slip to be impressed with the paint pattern by the squeegee must be halted underneath the screen in exactly the same place with reference to the squeegee pattern. The keys 22 and master key 22' underneath the plates in the grooves of the holders extend transversely across the conveyors so that there can be no variation in the relative positions of a given plate under a given squeegee applicator when a pattern is to be repeated, as for example, in a third or fifth cycle of the plate; but the plate may become displaced longitudinally of the key by sliding along the key groove as the result of vibration of the machine or from other causes. In order to assure correct longitudinal alignment of every plate before the paint pattern is impressed, a push rod, plunger or plate 355 (Fig. 19) is fitted to reciprocate in a slot in the frame 356 of the squeegee screen holder and engage the side of the plates 21 when they are stopped under the squeegee applicator. The plunger 355 is reciprocated by a linkage which is actuated by the cam 349 through the rocker shaft 345, lever 357 keyed to the end of rocker shaft 345, link 358 and crank 359 which is journaled to rock on a pin 360 which is attached to the frame of the squeegee applicator. The crank 359 is positioned on the rocker shaft 345 so that it is thrust downwardly and the plunger 355 is thrust horizontally against the plate 21 immediately upon movement of the single revolution clutch and before the squeegee blade 361 is lowered into contact with the squeegee screen 362 thereby pushing the plate 22 into engagement with the aligning pins 363. At least two of the aligning pins 363 are desirably mounted in the frame 356 to abut the end of the plates 22. The pins 363 are threaded to screw into complementary tapped holes in the frame and lock nuts 364 are provided to lock the abutment in an adjusted position. A take-up in the push rod 358 comprising the plunger 365 on the abutment 366, spring 367, push rod and spring mounting bracket 368 on the end of link 359 is provided so that when the plunger 355 has pushed the plate 21 into engagement with the aligning pins 363 the push rod can depress spring 367 between the abutments 366 and 368 and permit the link 358 to proceed to the end of its stroke.

The squeegee screen 362 is a fine mesh screen, desirably composed of woven stainless steel wire. The pattern to be impressed on the layer of dried ceramic slip consists of the open meshes of the screen and the meshes of the screen are closed where the pattern is not to be printed. The screen is mounted in a frame 369 which has a sliding fit in slots of the frame 356. The frame depresses the switch plunger (not shown) of the safety switch S3 (Fig. 53) closing the contacts S3c, S4c or S5c (Fig. 53), depending upon a squeegee station being operated, when the screen is in place in the squeegee stations. This closes one of the contacts in series in the circuit of the squeegee solenoids M1, M2 or M3 at a point in the connection between the control board and the relay so that the squeegees cannot be put into operation unless the screens are in proper operating position. The squeegee frame 369 is retained in operative position by a latch 370 (Figs. 18 and 19) which is mounted to swing 90° on a pivot 371 which is mounted on the frame of the squeegee applicator. One end of the latch 370 is biased against the spring 372 which holds the other end against the outer end of the squeegee screen frame. The latch is shown in open position in Fig. 19 so as to admit of inserting or removing a framed squeegee screen and in closed position in Fig. 18 with the framed screen in operative position.

The second squeegee station is provided with the proper screens for impressing the second pattern upon the even numbered layers of ceramic material. This plate closes the contacts S4c (Fig. 53) in the circuit of relay M2 when the plate is inserted in the frame and it encounters the operating lever of switch S4 corresponding to switch S3. The framed screen of the pattern to be impressed on the last layer of ceramic is inserted in the third squeegee device and this frame similarly closes the switch S5c in the circuit of relay M3. The construction of the three squeegee devices is the same. The only difference between the stations is the pattern formed on the squeegee screens. In the even numbered circuits of the plates, except the last, the relay M2 closes the circuit of the solenoid of the single revolution clutch of the second squeegee station and in the last pass of the plates over the squeegee conveyor the solenoid M3 closes the circuit of the solenoid of the single revolution clutch of the third squeegee station.

The clutches on the squeegee and discharge devices

Power is transmitted to operate the squeegee and discharge devices through clutches. A desirable form of clutch is the type generally referred to as the single revolution clutch although such clutches are capable of being operated for a single revolution or for several revolutions, depending upon the controlled operation of the pawl or trip member 301 (Figs. 17 to 20, 20A and 20B) which engages an abutment 304 when the abutting member has revolved once or a predetermined desired number of times after the trip member has been moved out of contact with the abutment 304. The clutch will be described with reference to its use on the squeegee device (Fig. 17, 20A and 20B) wherein it receives its power from the continuously driven sprocket wheel 317 which is keyed to the flanged sleeve 520 by the key 532. The output shaft 318 rotates within the flanged sleeve 520. The flanged sleeve 520 is secured to the housing member 521 by screws 522 and a hardened steel ring 523 is secured to the inner periphery of the housing member 521. The intermittently driven part of the clutch is keyed to output shaft 318 (Fig. 17) and comprises the rollers 524 which are mounted in the retaining cage formed of the member 525 having partial cylindrical members or fingers 526 spaced from the central wedging polygonal member 527. The backing plate 528 is secured to the free ends of the fingers 526 by the screws 529.

The wedging member 527 is polygonal in cross section having 12 sides and is keyed to the sleeve 530 by means of key 531. The sleeve 530 supports plates 305 and 535. Plate 535 is fixed to sleeve 530 while plate 305 is free to rotate on the sleeve so that when the pawl 301 is withdrawn from the abutment 304 on the plate 305, the plate will be rotated by the spring 537 which is stretched between the pins 538 and 539 which are affixed to plates 305 and 535, respectively.

The movable plate 305 carries a slide block 540 which fits into a slot 541 in the flanged portion of roller cage 525 and which is attached to plate 305 by the pin 542. The slide block 540 abuts against the side of the slot in the flange of the cage 525 so that when the tension spring 537 rotates the plate 305, the cage 525 is similarly rotated, moving the rolls 524 peripherally along the flat polygonal sides of the central member 527 and wedging the rolls between the flat sides of member 527, the cage members and the hardened steel ring 523 of the constantly moving member. This locks the constantly rotating member and the central member 527 together and rotates the power output shaft 318 which drives the squeegee or discharge device, as the case may be. When the pawl 301 again engages the abutment 304 after one revolution in the case of the squeegee drive or after three revolutions in the case of the discharge drive, the plate 305 and the rollers 524 are again returned to the position shown in Fig. 20A, resulting in disengaging the constantly turning part of the clutch from the central part 527 and output members.

The cycle control

The cycle control comprises a system of electrical circuits containing relays, the most of which are mounted on an electrical control board 13 (Fig. 1) for opening and closing the control circuits. The relays are in circuit with switches which are mounted on the operating mechanism, some of which are manually operated, others of which are operated by the mechanically driven parts and still others are operated by actuated relays. The control circuit is connected to a source of current such as a 110 volt, 60 cycle, alternating current source through the manually operated switch 401 (Fig. 53). Upon closing switch 401, the cycle control circuit is energized operating the holding relay SR. The relay SR closes contacts SR₁ in the starter circuit. The safety switch contacts 200a, 403a, 404a, 405a and 406a are normally closed so that when any of these contacts is opened, the relay SR will operate to open the contacts SR₁ in the starter circuit and the motor will be stopped. The contacts 406a are closed by a switch in the compressed air supply line leading to the slurry container and are operated by air pressure, so that when the pressure falls below the optimum operating pressure for the slurry supply, the switch 406a will be opened, thereby causing the motor to stop. The eight contacts 200a are in the switches 200 (Fig. 23) on the skid sections 154' of the drier conveyors. Contacts 403a are in safety switch 403 (Fig. 29) at the discharge end of the squeegee conveyor, contacts 404a are in a switch which controls a motor fan (not shown) for blowing air into the spray booth and these contacts open when the fan ceases to operate. Contacts 405a are in the circuit of a fan (not shown) which exhausts air from the drying tunnels and they open when this fan ceases to operate. Whenever the circuit of the relay SR is broken by opening any of the safety contacts, the contact SR₁ of the starter circuit is broken, resulting in deenergizing the relay BR and opening the contacts BR₁ to BR₅, inclusive, the total effect of which will be apparent from the following description.

The machine is driven by the motor 10 which is energized by closing the contacts at the push button switch 400 (Fig. 53) in the push button starting and stopping device. The starter circuit comprises the contacts of the stop button 400a. As described above, the contacts SR₁ are closed when the system is energized. When the starter button 400 is closed, the relay BR is energized closing contacts BR₁ in the shunt circuit around the starter button 400 which maintains the starter circuit closed after the push button switch 400 is released. The relay BR thus being energized by closing the switch 400, it closes five other contacts, namely BR₂ and BR₃, which close the power supply circuit of the motor 10, BR₄ and BR₅ which close the lamp circuits of the drying tunnels, and BR₆ in the circuit of the relay R2. The relay R2 operates to close contacts R2s in series with the spray gun solenoid SG₁, and contacts R2c in series with the time delay switch ST and in parallel with contacts R1c.

In normal operation, the plates enter the spray booth and the keys on the bottoms of the plates operate the plate switch PL closing its contacts and maintaining them closed as long as a continuous succession of plates enters the booth. Upon closing the plate switch PL, the circuit through the time delay switch ST and contacts R2c are closed whenever the starter switch is closed as explained above. The time delay switch (Fig. 66) comprises the motor 450 which is connected parallel with the relay R1 (Fig. 53). Upon energizing the motor 450 of the time delay switch ST, the closing of the contacts ST₁, the energizing of relay R1 and the closing of contacts R1S with the consequent energization of solenoid SG₁, the starting of spraying by the spray guns is delayed for a predetermined time dependent upon the operation of the time delay switch ST.

Referring to Fig. 66 which is a diagrammatic representation of the time delay switch ST, the device comprises the motor 450 which is connected on one side through the terminal 451 and the plate switch PL to the main lead V₁, and on the other side through the contacts 452 of a normally closed switch, lead 453, terminal 454 and lead 455, parallel connection containing contacts R1c and R2c to the opposite main lead V₂. The relay 456 is connected from terminal 451 to lead 453 in parallel with the motor 450. Upon closing the switch PL, the relay 456 operates to close contacts ST₁ after motor 450 has built up sufficient torque to open the switch containing the normally closed contacts 452. This short but definite delay is desirably regulated with respect to the speed of the spray conveyor so that the solenoid SG₁ will not be energized to effect spraying by the spray guns until the first plate to close the switch PL has reached the discharge side of the spray booth.

When the time delay switch ST closes contacts ST₁, relay R1 is energized closing the series parallel contact R1c in the time delay and plate switch circuit, and the series contact R1S in the solenoid valve circuit. The contacts R1S and R2S in series with the solenoid SG₁ having been closed, the solenoid SG₁ will be energized and the valve SG will be opened to effect spraying of the spray guns when contacts 118c and 120c of the switches 118 and 120 (Fig. 5) of the Geneva drive are closed. The shunt circuit around contacts R1s, R2s, 118c and 120c which contains the hand operated switch 126 is provided for independent operation and testing of the soleniod valve circuit.

Whenever there is a discontinuance of the succession of plates entering the spray booth, the plate switch opens returning timer ST to its initial setting, opening contacts ST₁, operating relay R1 to open contacts R1S in the solenoid valve circuit and thereby discontinuing all spraying until the succession of plates is again started in the booth to close the plate switch PL. Contacts R1c in parallel with contacts R2c are arranged to be closed by the relay R1 so that the motor 10 may be stoped at any time during the operation without breaking the circuit of the timer ST or initiating the timing out of the timer ST, thereby causing the spray guns to become inactive until the timer has again timed out.

After a layer of ceramic material has been deposited on a pair of plates in the succession of plates and a pair of coated plates has reached the transfer station on the spray conveyor 1, the pair of coated plates is transferred to the drying conveyor during the long dwell, the coating is thereafter dried and the plates are then transferred to the squeegee conveyor by the mechanically controlled devices heretofore described. The plates then proceed in single file on the indexed squeegee conveyor with the master plate leading until the master plate enters the first squeegee station where the elongated key 22′ on the master plate (Figs. 45 and 46) depresses the operating lever of switch N which closes contacts N1, as well as the operating lever of switch P, closing P1c (Fig. 53). The succeeding plates having a shorter key than the master plate operate the lever 24 to close only the switch P and contacts P1c. At the second and third squeegee stations, the switches P and N are similarly operated.

The operation of the device will be described with reference to the making of capacitors having four squeegee-produced layers, such as those assembled on plates 21 and illustrated in Fig. 62. Such capacitors contain, for example, two positive capacitor plates 61 deposited by the first squeegee device, one negative capacitor plate 63 deposited by the second squeegee device, a reference mark 65 deposited by the third squeegee device and four sprayed layers of ceramic material.

*The first circuit of the plates*

Just before the master plate enters the first squeegee station in its first circuit, the cycle control board is arranged in the manner shown in solid lines in Fig. 53 except that the starter switch 400 contacts SR1 and contacts BR1 to BR6 are closed and the manually operated selector switch is operated to close contacts S₄ (Fig. 53) in circuit with solenoid CCS₄ in order to make operable the cycle control for the selected number of plates which is illustrated in detail in Figs. 40–42. Upon entering the first squeegee station, the master plate operates switches N and P, closing contacts N1 in the circuit of relay L1 and contacts P1c in the circuit of the squeegee solenoid M1 as long as the plate dwells in this position for effecting the operation of the first squeegee device. The relay L1 operates to close contacts L1c. The relay L1 is of the type shown in Figs. 69 and 70 wherein upon one impulse or energization the contacts L1c are closed and contacts L1x are opened. Upon the next operation thereof the contacts L1c are opened and contacts L1x are closed. The switch S3c in the circuit of the squeegee solenoid M1 is closed when the squeegee screen is set or locked in the squeegee device in proper position for operation. The contacts Cc (Fig. 53) in the switch C (Figs. 31–33 and 53) are held closed by cam 259c and controlled by the Geneva gear 230 of the cycloidal drive so that the contacts Cc will be momentarily closed during the dwell of the squeegee conveyor and open when the squeegee conveyor is being indexed. This arrangement prevents the operation of the squeegee device during indexing of the plates and permits the operation of a chosen first, second or third squeegee when the plates are at rest.

In the first cycle now being considered, the squeegee solenoid circuit is now closed causing operation of the one revolution clutch pawl 301 (Figs. 17 and 18) to release position and the operation of the squeegee device as described hereinbefore. Upon entering the second squeegee station on the first cycle, the switch E (Fig. 42) is open so that the operation of switch N₂ at the second squeegee station will not effect the operation of relay M₂ or the closing of the contacts L2c in the circuit of the second squeegee solenoid, thus leaving the second squeegee station in its initial inoperative condition. The switch N₃ at the third squeegee station on being closed during the first circuit of the master plate, relay L3 will be operated and the initially closed contacts L3c will be opened, thereby preventing the energization of the solenoid M3 at the third squeegee station and preventing operation of the third squeegee station.

Thus the last two squeegee stations are rendered inoperative during the first cycle of the ceramic coated plates since the circuit through switch E and contact T₂ is open rendering relay L2 inoperative, and the circuit through contacts LSc is opened by the operation of relay L3. Upon successive operations of the switch P at the first squeegee station by the shorter keys 22 of the succeeding plates, the contacts P1c are successively closed and the squeegee device is operated to impress its paint pattern on each of the plates as they are caused to dwell at this station.

When the master plate has been indexed in its first cycle into the transfer station in front of the entrance to the paint drying conveyor 3, the long key 22' of the master plate encounters the operating lever of the self-resetting cycle control circuit solenoid switch Px (Fig. 15) which is located on the opposite side of the conveyor from the switches P and operates switch plunger 265 (Fig. 47) closing contacts Px1. This closes the circuit through the time delay switch TD (Fig. 43) on the control board 13 which is schematically illustrated in Fig. 67.

Referring to Fig. 67, the lead 475 containing the contacts Px1 has a switch terminal 476 and it contains a switch operating solenoid 477 which is directly connected to the opposite main lead $V_2$. The solenoid 477 operates the switch 478 closing the circuit between contacts 476 and 479 when the solenoid is energized. In a branch circuit connected to the terminal 480 is an opposed solenoid 481 operating on the armature 482 of switch 478, and the normally open contacts 483 which are closed by heating a bi-metallic thermal responsive contact member 484. A resistance heater 485 for heating the bi-metallic element 484 is connected on one side to the terminal 480 and on the other side to terminal 479 and the latter is connected through lead 486, motor CCM and lead 487 to the line $V_2$. When the contacts Px1 are closed, the solenoid 477 is energized and operates switch 478 to close the circuit of motor CCM through contacts 476 and 479 and lead 486, and the motor CCM tends to turn against the spring connector 291 (Fig. 43). The circuit through the heater 485 is also closed. When heater 485 has heated the bi-metallic element 484 sufficiently to close contacts 483, a series connection is established from terminal 480 to motor CCM through solenoid 481, lead 488, contacts 483 and 484, and lead 486. This causes the switch 478 to open the direct circuit to motor CCM. When the contacts Px1 are opened by the passing of the plate past the switch Px (Fig. 21) and the retracting of switch lever 265, the resistance heating element is thereby disconnected from the source of current and the parts return to the positions shown in Fig. 67.

The closing of the contacts Px1 also closes the circuit through one of the cycle control selector switches $S_4$, $S_6$, $S_8$, $S_{10}$, $S_{12}$, $S_{14}$ and $S_{16}$, one of which is manually closed, depending upon whether 4, 6, 8, 10, 12 or 14 cycles of the plates will be required to build up the capacitors of the desired number of plates. In the present illustration, selector switch $S_4$ is manually closed in order to produce capacitors having two 61 plates, one 63 plate and a reference pattern composed of impressions 65 as illustrated in Fig. 62. The closing of contacts Px1 also closes the circuit through the selector solenoid $CCS_4$ which is in parallel with the time delay switch TD. Thus the solenoid $CCS_4$ (Fig. 44) is energized to operate to release position the pawl 280 of the cycle control ratchet 282 (Figs. 40 to 44) before the time delay switch times out to open the contacts TDc of the motor CCM.

The cycle control device (Figs. 40 to 44) comprises the motor CCM which is connected through a suitable worm gear and the spring closed friction clutch 290, to turn the ratchet and cam shaft 281 when the motor is connected to the source of power through the contacts TDc which are closed as the time delay switch TD times out. Just before the master plate closes Px1, the ratchet 282 keyed to the shaft 281 is in the position shown in Fig. 41 and the pawl 280 is out of engagement with the ratchet 282 in the unengaged position indicated by the full lines. At the same time the ratchet 288 is in the position shown in Fig. 40 and the pawl 289 is in the locking engaging position shown in full lines in Fig. 40. The energization of solenoid $CCS_4$ raises the ratchet operating lever 284 of the selector mechanism (Figs. 40-43) thereby bringing the pawl 280 pivoted on the pin 280' in contact with the first tooth on ratchet wheel 282 in the intermediate unengaged position shown in dotted lines in Fig. 41. The lifting of thrust rod 284 brings the pin 292 in the slot 285' into engagement with the lever 283' and rotates shaft 287 in a clockwise direction as illustrated in Fig. 41 and rotates pawl 289 into the position shown in dotted lines out of engagement with the ratchet wheel 288 as shown in Fig. 40. The spring 284' is inserted between the rod 284 and pawl 280 to provide for positive but resilient engagement of the pawl 280 and ratchet wheel 281.

The closing of contacts Px1 also closes the branch circuit through time delay switch TD which, upon being operated, closes the contacts TDc and thereby closes the circuit to the motor CCM (Fig. 43).

As the master plate is transferred, switch Px1 opens and solenoid $CCS_4$ is deenergized causing pawl 280 to drop out of engagement with ratchet 282 and pawl 289 to engage ratchet 288 on the following tooth. During this time, the motor remains energized by virtue of the time delay contact TDc being closed and advances the ratchet 281 until it is stopped by the engagement of a tooth of ratchet 288 with the pawl 289. Thus each passage of the master plate at this transfer station causes the ratchet shaft 281 to advance one tooth.

The cam wheels 285 and 286 are keyed to the shaft 281 and carry cams E" and F". These cams operate, respectively, switch E in the squeegee circuit and switch F in the by-pass transfer circuit which comprises the relay TR contacts TRc and solenoids TS (Figs. 21 and 53). As the plates approach the first squeegee station in their first cycle, the switch operating arms E and F are depressed by the cams E" and F" into the position shown in solid lines in Fig. 53. On the first indexing of the ratchet wheels 282, 288 and shaft 281 the switch levers ride off the cams E" and F" permitting the switch E to move into the position shown in dotted lines in Fig. 53, and make contact with point $T_2$, and the switch F to move into the position shown in dotted lines and make contact with point $B_2$. The longer cam E" is arranged to permit switch E to remain in this dotted position until the cycle control ratchets are advanced up to the next to the last of the master plates, later to be described. The short cam F" is arranged to again encounter the switch lever and return switch F to the position shown in solid lines when the ratchet wheels have been indexed to come into contact with switch Px1 after the painted plate bearing the reference pattern of the third squeegee is transferred. The setting of the switch F into the position shown in dotted lines in Fig. 53 opens the circuit through the contact Bx and relay TR, thereby insuring transfer of the painted plates to the paint drying conveyor. When, however, the next to the last ceramic layer has received the paint pattern 61 of the first squeegee station, the plates are transferred to the paint drying conveyor, given the last ceramic layer and finally the pattern 65 or outside reference pattern by the operation of the third squeegee station. The plates are not transferred to the paint drier for drying the reference pattern 65. Instead of transferring the plates to the paint drying conveyor, the cam F" is arranged to close the circuit through contact Bx, and relay TR which closes the two contacts TRc in the circuits of by-pass solenoids TS. These solenoids then operate to raise one end of the cam 178 pivoting it on the pin 383 (Figs. 21 and 21a) so that the finger operating cam 178 cannot encounter the traveling roller 179 (Fig. 25) and the fingers 172 will remain retracted and not engage the plates 21 when they are in the transfer station at the end of the paint drying conveyor. Instead, the plates are carried forward on the squeegee conveyor toward the cutting and discharge stations. While the switch F contacts B₂ during the major part of the operation the operator is enabled by manual operation of the switch PBc to establish a shunt circuit around the contacts Pxf for resetting or emergency operation of time delay switch TD and the circuit control solenoids.

The shifting of switch E from the contact T₃ to the contact T₂ prevents operation of the third squeegee station until switch E is returned and enables future operation of the second squeegee station upon the even numbered passes, except the last. The shifting of switch E in contact with T₂ enables the closing of the squeegee operating solenoid circuit when the switch N₂ at the second squeegee station is operated to closed position by the master plate. Before switch E is shifted to contact T₂, the manually operated switch PB₂ may be closed for emergency or resetting operations of the second squeegee device. The shunt circuit containing the manually operated switch PB₁ may be similarly closed to effect emergency or resetting operations of the first squeegee station. The switch E is not returned to its contact with T₃ until all the operations of the first and second squeegees are completed. The cam E" is so formed that the switch operating lever for switch E does not ride onto the cam for returning the switch E to the position shown in solid lines until the ratchets 282, 288 and shaft 281 are indexed while the master plate is entering the transfer station at the end of the paint drying conveyor.

The relays L1, L2 and L3 are illustrated schematically in Figs. 69 and 70 by special reference to the type of circuit of the relay L₁. When the switch N at the first squeegee station is moved to closed position by the master key and contacts N₁ are closed, the circuit of solenoid 500 is closed from line V₁ through lead 501, contacts N₁, lead 502, solenoid 500 and lead 503 to line V₂. This energizes core 504 and the armature 505 is thereby displaced. The displacement of armature 505 draws the lever 506 to one side against the tension of spring 507, pivoting the lever on pin 508, thereby moving the push rod 509 endwise against the ratchet wheel 510 to turn the same through 90°. The four part ratchet wheel 510 is keyed to one end of shaft 511 and the cam 512 is keyed to the other end. The turning of ratchet wheel and cam 512 through 90° from the position shown in Fig. 70 breaks the circuit from power line V₁ through switch F (Fig. 53) pilot lamp 408, lead 513, spring 514 and contact L1x, to the other side of the power line. This brings contacts 517 in contact with contact L1c, closing the squeegee solenoid circuit when contacts P1c, S3c and Cc are closed. A second operation of switch N on the next circuit of the plates energizes solenoid 500, turning ratchet 510 through 90° and returns armature 517 to its original position in contact with contact L1x.

*The second circuit of the plates*

When the master plate has received the second coating of ceramic and is transferred again onto the squeegee conveyor to receive the second paint pattern, switch E is in the position shown in dotted lines in Fig. 53 in order to make the second squeegee device capable of operation and switch F is in the position indicated by dotted lines in order to prevent operation of the by-pass solenoid TR on the transfer device. The pawl 280 is poised above the second tooth of the ratchet 282 by reason of the previous indexing of the ratchet. Upon entering the first squeegee station, the master plate operates the plunger of switch N closing contacts N1. This energizes the relay L1 which opens the contacts L1c and prevents the operation of the first squeegee station as the coated plate dwells underneath the same.

When the master plate reaches the second squeegee station and operates its switch N to close contacts N2, the circuit of the relay L2 is closed since switch E has been closed in a previous operation as described. Relay L2 operates to close contacts L2c. Since contacts P2c are closed by the plate switch (there being a continuous succession of plates in normal operation), contacts S4c are closed by proper positioning of the squeegee screen, and contacts Cc are closed as described above, the solenoid M2 of the second squeegee station is energized and the one revolution clutch of the second squeegee mechanism is released to operate the second squeegee device and impress the second or pattern 63 on the second ceramic layer. The painted plate is then indexed forwardly but since the switch E is in the position shown in dotted lines in Fig. 53, the circuit of the third squeegee is open and the third squeegee is inoperative, although contacts N₃ are closed when the master plate operates the switch N on the third squeegee. When the master plate arrives at the transfer station, the switch Px is again operated to closed position and the time delay switch TD, motor CCM, solenoid CCS4 and the cycle control mechanism are operated as described in the preceding cycle, advancing the ratchet shaft 282 one more tooth. The plates are transferred to the paint drying conveyor and returned to the ceramic spray conveyor for the third cycle of the plates.

*The third circuit of plates*

When the plates have received the third coating of ceramic material and they are returned to the squeegee conveyor, the master plate operates the plunger of switch N energizing relay L₁ which closes the previously opened contacts L1c. The first squeegee device then operates to impress pattern 61 on the coating as previously described. Upon being indexed underneath the second squeegee device, the master plate closes the N switch at this station closing contacts N2 and operating relay L2 to open contacts L2c so that the second squeegee device will not operate. In this circuit of the plates, the switch E is in the position shown in dotted lines in Fig. 53 so that the third squeegee station will not operate.

At the transfer station, the master plate operates the switch Px as before and the plates are transferred to the paint drying conveyor as before. In case additional coatings 61 and 63 are desired, the cycle control is set accordingly, by means of the selector switch and its continues to index, the plates continue to return over the paint drying conveyor and relays L1 and L2 continue appropriately to open or close on every other passage of the master plate, L1 being closed and L2 being opened in a given circuit.

Finally, when the predetermined number of patterns of layers 61 and 63 are deposited and the master plate bearing the last 61 pattern enters the transfer station, the cycle control relay is energized as before; but the ratchet wheel 282 having been previously indexed to the point where the pawl 280 will miss the last tooth on the ratchet wheel, the pawl engages the smooth part of the ratchet wheel and the motor CCM consequently turns the wheel 282 until the pawl 280 again engages the first tooth of the ratchet wheel. This indexing brings cam E'' into position to again depress the operating lever of switches E into the position shown in solid lines in Fig. 53 for preventing any operation of the second squeegee device and allowing operation of the third squeegee device. The plates, however, are transferred to the paint drying conveyor as described above and they proceed toward the spray conveyor in order to receive the last coating of ceramic.

The last circuit of the plates

When the plates have received their last ceramic coating, the master plate enters the first squeegee station operating the previously closed switch N to open contacts L1c, thereby rendering the first squeegee device inoperative. At the second station, the operation of switch N does not cause the squeegee device to operate since the switch E was returned to open position by the indexing of cam E'' in the last previous indexing of the cycle control device. The return of switch E to contact Ts in the circuit of the third squeegee device renders this squeegee capable of operation so that when the master plate operates the switch N at the third squeegee station, contacts Ns are closed causing relay L3 to operate and close the previously opened contacts LSc. The P switch at the third squeegee station is operated by the master plate to close contacts PSc and the contacts S5c are closed by placing the squeegee plate frame in operative position. The circuit of solenoid M3 is thus closed and this solenoid then operates the holding latch of the single revolution clutch on the third squeegee device and the outside or reference pattern 65 is imprinted on the last layer of ceramic.

Upon being indexed this time into the transfer station, the master plate closes switch Px causing the indexing of the cycle control and switching switch F from contact B2 to contact Br, causing by-pass solenoid TS to be energized, and preventing the transfer of the plates to the drying conveyor. Shaft 281 is indexed one tooth bringing ratchet 280 into the position shown in solid lines in Fig. 41. The relay thus being operated, the contacts TRc and solenoids TS are operated to render the transfer fingers inoperative. In this operation, the solenoids TS (Figs. 21 and 21a) rotate the bell cranks 380 into the position shown in Fig. 21a. The arms 380 and 382 are hingedly joined by the pin 384 so that the rotation of arm 380 opens the hinge and raises the arm 382. At its lower end the arm 382 is arranged to rotate on the pin or rod 385 which joins the end of arm 382 with the bracket 386 which is attached to cam 178. At the other end of the cam the uprights 387 are journaled and turn on the pins 388 which are secured to the frame. The operation of solenoid TS thus permits the plates to pass through the transfer station without being transferred from the squeegee conveyor.

Consequently the line of plates continues to be indexed forwardly on the squeegee conveyor under the first cutting device 17 (Fig. 27). This progress of the plates on the squeegee conveyor continues underneath the cutting device 17 which carries a series of parallel knives such as the thin razor blades 390 suitably mounted on the arms 391 for bearing onto and cutting through the composite deposit in one direction. These knives are desirably adjusted to cut entirely through the deposits on the plates. The plates then continue in single file on the squeegee conveyor until they reach the discharge station which is to one side of the second cutting device 18.

For producing structures having a greater number of 61, 63 and ceramic layers, another cycle control device is selected, such as the one containing solenoid CCS6 (Fig. 53) by manually operating to open position the switch controlling contacts S4 and closing the switch which closes the contacts S6. The ratchet wheel turned by CCS6 corresponding to the four-toothed ratchet wheel 282 (Fig. 41) has six teeth, providing for six indexes and six circuits of the plates. In like manner, other even numbered cycles of the plates on the machine may be acquired and controlled by selecting, for example, the circuit containing solenoid CCS8 in which the pilot ratchet wheel corresponding to wheel 282 has eight teeth, or CCS16 wherein the pilot ratchet wheel has sixteen teeth.

The cutting devices

The cutting device (Fig. 27) generally designated as 17 has thin knives or cutters 390, such as safety razor blades mounted to make parallel cuts through the layers of ceramic material, such as the cuts 20 (Fig. 56) when the coated plates are carried by the squeegee conveyor past the transfer station. The cutting device (Figs. 1 and 27) generally designated as 18 is located in line with the discharge carriage so that the coated plates will be cut at right angles to the first cuts 20. The cutters in cutter 18 are arranged to cut through the coating along the lines 19 and 19' as indicated in Fig. 56. The cutting devices 17 and 18 are similarly constructed and they comprise the cutters 390 secured to the ends of bell cranks 391. The bell cranks are supported by stands 392 which are mounted at the ends of each cutter device and secured to the frame. The bell cranks 391 are mounted to rock or rotate at their central portions on the bolt 394 which is secured by nuts screwed on the bolt at one end to one of the upright stands 392. The ends 392 of the cutter stands are secured together by the upper and lower rods 396 which span the frame. The bell crank shaped cutter carriers 391 are mounted between separators 391' which are carried on the rods 396 and space the knives apart the desired distance. Mounted also on the rods 396 are the spring and knife lever housings 398. The housings at the right end of cutter assembly 18 (Fig. 27) carry no knife levers and they are not separated by separators 381'. The rods 396 are threaded for the nuts 398' which are screwed down to hold the housings and separators in place. The housings 392 have mounted therein springs (not shown) which bear outwardly against the inner ends of the bell crank levers 391 tending to depress the knives 390 downwardly. Set screws 389 are mounted in the housings 398 which engage the ends of the bell crank levers 391 and oppose the action of the springs. In this manner the knives 390 are positively prevented from raising beyond a predetermined height but the springs permit a limited tolerance so that the knives may follow imperfections in the surfaces of the depositories or plates upon which the coating are deposited.

*The discharge device*

At the completion of the indexing of each plate into the discharge station, the edge of the plates 21 engage the roller 415 (Figs. 28, 29 and 30) on the switch operating push rod 416 of switch P₃ which is mounted on a bracket 417 on the frame opposite the discharge platform location 26. This closes the contacts P3₁ in the circuit of the impulse relay DR (Fig. 53) which closes contacts DR₁ in the circuit of the discharge solenoid DS.

The discharge solenoid DS (Fig. 28) operates the counter weighted crank 420 which constitutes the pawl for holding and releasing the one revolution clutch 421 on the plate discharge transfer device. The constantly driven drum of this clutch is driven from the main motor through sprocket wheel 207, chain 206, sprocket wheel 205 and shaft 210 (Figs. 2, 28 and 50). Upon energization of the solenoid DS, the armature pull rod 422 (Fig. 49) is drawn toward the solenoid and the opposite end of the attached crank arm 420 is disengaged from the holding disc 423 of the one revolution clutch 421, permitting the clutch to operate the discharge device through the shaft 424.

The pinion 425 keyed to shaft 424 meshes with and drives a like pinion 426 which is keyed to the shaft 427. Sprocket wheel 428 carrying endless chain 429 is keyed to shaft 427, and the chain 429 is passed over sprocket 435 which rotates on the stub shaft 436. A discharge finger operating yoke 437 is carried by the chain 429 and the yoke carries roller 438 which engages a finger depressor cam 439. The yoke 437 operates to depress the discharge finger 440 into engagement with the edge of the plate when the roller 438 of the yoke 437 engages the track portion 441 of the cam 439, and the plate 21 is discharged from the squeegee conveyor in the direction indicated by the arrow in Fig. 51 onto the discharge skids 442 (Figs. 1 and 28).

The discharge end of the track of the cam 439 has a portion 443 fromed so that the finger 440 will be retracted backwardly and away from the edge of the plate 21 when the plate has been moved onto the discharge skids and is free of the squeegee conveyor so that in the disengaging action, the finger 440 will not injure the somewhat fragile coating of material deposited on the plate. Instead of a discharge device driven by one revolution clutch and comprising switch P3, the discharge of the plates can be effected by a modified device in which the shaft 427 and sprocket 428 are driven by a device comprising a planetary drive like that used to drive the sprocket 199 and chain 152 (Fig. 11) of the transfer device.

The normally closed contacts Dc (Figs. 31, 33 and 53) of the switch D in the circuit of relay DR are opened by the cam 259c at the end of the shaft 232 of the planetary drive. This cam is operated by the Geneva gear of the planetary drive which also controls the clutch for effecting indexing of the squeegee conveyor by the planetary drive. The cam 259c is arranged so that the operating lever 259d of the switch D will be pushed to open contacts Dc when the clutch cam 235 of the planetary drive is in the position which operatively connects the planetary drive with the squeegee conveyor drive, i. e. when the squeegee conveyor is being indexed. The cam 259c permits the switch D to close again when the conveyor dwells. By this arrangement, the transfer solenoid and transfer device are prevented from operating except when the squeegee conveyor is in a dwell. It thus operates to control the period within which the discharge solenoid may be energized.

Referring to Fig. 68, the impulse solenoid DR is in circuit with the contacts P3₁ and comprises the switch solenoid 495 which is energized when contacts P3₁ are closed by the operation of the plate on switch P3 (Fig. 29) and contacts Dc are closed by the operation of cam 259c on the lever 259d of switch D of the planetary drive (Fig. 33). The cam 259c is long enough to keep Dc closed a sufficient time for the clutch on the discharge device to make three revolutions in order to drive the chain 429 carrying the discharge finger 440 (Figs. 49 and 51) through one complete revolution and bring the finger 440 into position to engage the edge of a plate 21 immediately after the solenoid operated pawl 420 releases the disc 423. The energization of solenoid 495 moves switches 496 and DR to closed position closing the contacts DR₁ in the circuit of discharge solenoid DS, and the contacts DR₂ in the holding circuit between conductors V₁ and V₂, comprising leads 497, contacts DR₂, lead 498, solenoid 495 and contacts D₁. The opening of switch P3 or switch D allows the parts to return to normal position shown in Fig. 68.

If the discharge switch P3 fails to operate, or contacts P3₁ fail to close for any reason, or the discharge device fails to operate for any reason so that the plates are not discharged from the squeegee conveyor, the plate 21 will be indexed into the next dwell beyond the discharge station where its edge will engage the roller 430 (Fig. 29) on the end of the push rod lever 431 of discharge safety switch 403. This engagement depresses the pushrod lever 431 and plunger 432 of the switch 403 to open the contacts 403a in the safety switch circuit (Fig. 53) which also contains the safety relay and the closed contacts of switches 200a, 404a and 406a. The opening of this circuit operates to break the motor starter circuit through the contacts SR₁ stopping the main driving motor 10. Thereupon all of the circuits containing the contacts BR₁ to BR₆ are opened.

When the cycle control has indexed the last time at the end of a series of operations, the operating levers of switches E and F will have ridden onto the cams E'' and F'' (Fig. 42) bringing switches E and F into the positions shown in solid lines in Fig. 53. The circuit from V₁ through switch F and the pilot lamp 407 to V₂ will be closed, lighting the lamp 407 and indicating the end of a complete operation. The solenoids L1, L2 and L3 will have been operated to close contacts L1x, L2x and L3x lighting lamps 408, 409 and 410 in the parallel circuits from lead V₂ through switch F, indicating that the relays are properly disposed for the start of a new operation.

Numerous of the means employed in the above described illustrative embodiment of the invention may be varied, or other parts having similar functions may be used instead of some of them, without departing from the invention. For example, a squeegee type of coating, printing or pattern producing device is described in the illustrative embodiment, but another kind of a coat forming device could be used, such as a printing roller or a paint spray which is carried by the reciprocating member of the illustrated squeegee device. The planetary indexing could be done by a Geneva drive. Instead of applying the ceramic layer by spraying, a coating of the material could be floated onto the plates. In the illustrative embodiment, the construction of capacitors upon demountable platens or depositories having plane surfaces is described, but other objects besides plane surfaces may be used as the depositories and means for depositing other materials besides the ceramic slurry and paint may be used, such as irregularly shaped depositories and devices for manipulating any kind of coating material. Various modifications of the transfer, discharge and cycle control devices can be made. Still other modifications not mentioned heretofore can be made in the specifically described embodiment of the invention without departing from the spirit and scope thereof, and it is to be understood that the invention is not restricted to the specific illustration thereof which is herein set forth except within the limitations of the appended claims.

I claim:

1. A device of the kind described comprising a conveyor means having a device for securing thereon a removable transferable depository upon which a plurality of layers of material are to be deposited, a device for advancing said conveyor means in a series of movements separated by dwells for carrying said depository into positions to receive said layers, means for depositing a layer of material on said depository during some of said dwells, control means operative to actuate said depositing means for depositing said material during some of said dwells and for preventing the deposition of material during the advancing of the depository, means for discharging said depository from said conveying means after the depository has received a predetermined number of layers, and control means for preventing the operation of said discharge means, for causing a predetermined repetitious conveying of said depository in position to receive said layers and for regulating the number of layers of material to be deposited on said depository.

2. A device of the kind described comprising depositories upon which a plurality of coatings of material are to be deposited, a coating conveyor having means for detachably mounting said depositories, means for indexing said coating conveyor in a series of movements separated by dwells, a plurality of coating devices located at different coating stations along said conveyor at some of said dwell points, a loading station located at a dwell point in advance of the series of coating stations and a transfer station located at a dwell point at the other side of the series of coating stations, power driven means in each of said coating devices for forming the coatings, power connections having selective means for operatively connecting and disconnecting each of said power driven means with a source of power for effecting the operation of the same, and means for connecting a selected power connection with the source of power for effecting the operation of a corresponding selected coating device.

3. A device of the kind described comprising a spray conveyor, a first drying conveyor, a squeegee conveyor and a second drying conveyor arranged in a closed cycle in the order named; means for driving said conveyors; means on said conveyors to secure thereon a removable transferable depository upon which a plurality of layers of material are to be deposited; indexing means for advancing said spray conveyor in a series of movements separated by dwells; indexing means for driving said squeegee conveyor in a series of movements separated by dwells; transfer devices for transferring the depositories from the spray conveyor and squeegee conveyor to the drying conveyors during dwells; transfer devices for transferring the depositories from the drying conveyors to said other conveyors; a device for spraying material on the depositories having means therein to prevent spraying during indexing of the spray conveyor; and control means on said indexing means for preventing the operation of said spraying devices during some of said dwells of the spray conveyor and for permitting spraying during the other dwells; and means for depositing a coating on the depository while it dwells on the squeegee conveyor.

4. A device in accordance with claim 3 in which the indexing means for the spray conveyor is a Geneva-drive having a series of equally spaced indexing means for providing short dwells and means for providing a long dwell between each series of short dwells; said control means on the Geneva-drive comprising switches operated by cams, electrically actuated means in said spray device for preventing the operation of said spraying device during said long dwells, a control circuit containing said switches and said electrically actuated means, said cams being arranged to dispose the switches and control circuit for preventing operation of the spraying device during said long dwell.

5. A device in accordance with claim 3 in which the means to transfer the depositories to the first drying conveyor comprises means for engaging the edges thereof and propelling the same, said means for transferring the depositories comprising a variable speed drive and a cam shaped for depressing the engaging means into engaging position prior to the beginning of said engagement and for moving the engaging means backward and upwardly away from said depositories when the depositories have been transferred.

6. A device of the kind described which comprises a spray conveyor, a first drying conveyor, a coating conveyor and a coating drying conveyor arranged in a closed cycle in the order named; motor means for driving said conveyors; means on said conveyors to secure thereon a removable transferable depository upon which a plurality of layers of material are to be deposited; means for advancing said spray conveyor with the depositories thereon; means for moving said coating conveyor in a series of movements separated by dwells for advancing said depositories along said coating conveyor; transfer devices for transferring the depositories from the first named drying conveyor to the coating conveyor and from the coating conveyor to the second drying conveyor during the dwelling of the coating conveyor; a coating device for the superimposing a coating of material on the depository during a dwell of the conveyor; means for actuating said coating device comprising a constantly rotated clutch driving member, a driven rotating clutch member and a clutch for engaging the device which includes electrically actuated solenoid operated means for impressing said clutch engaging device into operative position, and means for manipulating the solenoid circuit in clutch operating position when a depository is in position to be coated on the coating conveyor.

7. A device in accordance with claim 6 in which the clutch actuated coating device comprises a reciprocating member for distributing the coating material on the depository and means interposed between the rotating clutch and the distributing member for actuating the distributing member which comprises a cross head, a distributor carrier adapted for vertical reciprocation in said cross head, a lifting bar contacting said distributor carrier for elevating the carrier and distributing member, a cam follower, a rectilinear transversely disposed cam track in said cross head, disposed to be driven by said cam follower, means driven by said rotating cam for driving said cam follower through a closed cycle in a plane parallel to the plane of the cross head thereby imparting a reciprocating motion of variable speed to the cross head in which the points of minimum velocity are at the ends of the reciprocating movement; a rotatable cam driven by said rotating clutch, said rotatable cam having a non-circular portion in its track, a cam follower disposed to follow the track on said rotatable cam, means operatively connecting said follower and said lifting bar whereby upon the operation of the follower over said non-circular portion the lifting bar and distributor carriers are raised and lowered as the distributor carrier is reciprocated horizontally, said rotating cam being disposed to raise the distributor shortly before the end of each stroke of the reciprocating movement and to lower the distributor before the beginning of the reverse reciprocating movement.

8. A device in accordance with claim 6 in which the clutch actuated coating device comprises a reciprocating member for distributing the coating material on the depository and means interposed between the rotating clutch and the distributing member for actuating the distributing member which comprises a cross-head, a distributor carrier adapted for vertical reciprocation in said cross-head, a lifting bar contacting said distributor carrier for elevating the carrier and distributing member, a cam follower, a rectilinear transversely disposed cam track in said cross-head, disposed to be driven by said cam follower, means driven by said rotating cam for driving said cam follower through a closed cycle in a plane parallel to the plane of the cross-head thereby imparting a reciprocating motion of variable speed to the cross-head in which the points of minimum velocity are at the ends of the reciprocating movement; a rotatable cam driven by said rotating clutch, said rotatable cam having a non-circular portion in its track, a cam follower disposed to follow the track on said rotatable cam, means operatively connecting said follower and said lifting bar whereby upon the operation of the follower over said non-circular portion the lifting bar and distributor carriers are raised and lowered as the distributor carrier is reciprocated horizontally, said rotating cam being disposed to raise the distributor shortly before the end of each stroke of the reciprocating movement and to lower the distributor before the beginning of the reverse reciprocating movement, said coating distributor comprising a removable squeegee printing screen, a squeegee applicator, a screen adjuster and a screen safety switch, said screen adjuster comprising an aligning member for adjusting the screen into a fixed position before each use thereof, means actuated by said rotatable clutch for operating said aligning member; means in said removable squeegee printing screen for operating said safety switch, said switch being connected in the supply circuit of said electrically actuated solenoid and having means for permitting the operation of the solenoid only when the squeegee printing frame is placed in operative position.

9. A device of the kind described which comprises a spray conveyor, a first drying conveyor, a coating conveyor and a coating drying conveyor arranged in a closed cycle in the order named; motor means for driving said conveyors; means on said conveyors to secure thereon a removable transferable depository upon which a plurality of layers of material are to be deposited; means for advancing said spray conveyor with the depositories thereon; means for moving said coating conveyor in a series of movements separated by dwells for advancing said depositories along said coating conveyor; transfer devices for transferring the depositories from the first named drying conveyor to the coating conveyor and from the coating conveyor to the second drying conveyor during the dwelling of the coating conveyor; a coating device for superimposing a coating of material on the depository during a dwell of the conveyor; transfer fingers on the transfer devices, means including a depressor cam shaped for depressing the fingers into contact with the depositories during the transferring operation and for permitting the fingers to retract into a non-contacting position after the depositories are transferred; one of said transfer devices being disposed to transfer depositories from a coating conveyor to said second drying conveyor, and means on said last-named transfer device for preventing transfer of the depositories when a predetermined number of coatings are completed, which comprises a solenoid operated retracting device operatively connected to said cam, a solenoid operatively connected to said retracting device for retracting the cam into an inoperative position when it is energized, and a circuit opening and closing means for connecting the solenoid to an energizing source which is progressively operated to circuit closing position as the coatings are deposited.

10. A device of the kind described comprising depositories upon which a plurality of coatings of material are to be deposited, a plurality of coating conveyors and a plurality of drying conveyors for transporting the depositories, said conveyors being arranged alternately in a closed cycle with the drying conveyors disposed to receive the depositories from a coating conveyor and deliver them to the next alternately arranged coating conveyor, means for indexing each of said coating conveyors in a series of movements separated by dwells, means located at transfer stations for transferring the depositories from each conveyor to the next succeeding conveyor during dwells of the coating conveyors, means for preventing the operation of one of said transfer devices when a depository has been indexed on one of said conveyors into the corresponding transfer station and a predetermined series of superimposed coatings has been deposited on the depositories whereby the depositories are allowed to advance beyond said transfer station, coating devices cooperating with the coating conveyors for depositing coatings on the depositories, a discharge station located at a dwell point of one of said conveyors beyond said transfer station on that conveyor, and means operable at said discharge station for discharging the depositories from said conveyor as the depositories dwell in said discharge station.

11. A device in accordance with claim 10 in which the indexing means comprises means for indexing one of the coating conveyors in a series of advances separated by short dwells, one of said coating devices comprising spray guns disposed for spraying coating material onto the depositories when they are indexed into coating stations on said conveyor and while they dwell thereon, and means for controlling the operation of said spray guns comprising a driving means for reciprocating said guns transversely across the direction of travel of said depositories during said short dwells and means for discontinuing the spray at the ends of the strokes of the guns and re-establishing the spray while the guns traverse the depositories during said short dwells.

12. A device of the kind described comprising depositories upon which a plurality of coatings of material are to be deposited, a plurality of coating conveyors and a plurality of drying conveyors for transporting the depositories, said coating and drying conveyors being arranged alternately in a closed cycle with a drying conveyor disposed to receive the depositories from a coating conveyor and each drying conveyor to deliver them to the next alternately arranged coating conveyor, means for indexing each of said coating conveyors in a series of movements separated by dwells, means located at transfer stations for transferring the depositories from each conveyor to the next succeeding conveyor during dwells of the coating conveyors, means for preventing the operation of one of said transfer devices when a depository has been indexed into the corresponding transfer station and a predetermined series of superimposed coatings has been deposited on the depositories whereby the depositories are allowed to advance beyond said transfer station to a discharge station, coating devices cooperating with the coating conveyors for depositing coatings on the depositories, said discharge station being located at a dwell point of one of said conveyors and means operable at said discharge station for discharging the depositories from said conveyor as the depositories dwell in said discharge station; other coating devices operatively located at different coating stations which correspond to different dwell positions of the coating conveyor from which the depositories are finally discharged; means for controlling said other coating devices for depositing different coatings on the depositories during different traverses of the depositories on the conveyor; a normally disconnected clutch in each of said coating devices for effecting operation of the devices and solenoid controlled releases for connecting the clutches and operating the coating devices; interlocked control circuits including a solenoid circuit and a master relay circuit for controlling the operation of each of said devices; a clutch activating solenoid, master relay contacts and solenoid circuit contacts in said solenoid circuits; master switch contacts and a relay in the master relay circuit; a switch operating means; a depository having a master switch operator and another depository having a solenoid circuit switch operator, said master switch operator being arranged to engage the switch operating means for closing both the master relay contacts and the solenoid circuit contacts when the depository having the master switch operator is caused to dwell at any coating station and said other switch operator being arranged to engage the switch operating means to close only the solenoid circuit contacts when the other depository is caused to dwell at any coating station; means for indexing the depositories into the coating stations whereby upon the engagement of said master key and said switch operating means the relay contacts and the solenoid circuit contacts are closed, the master relay is energized and the relay contacts in the solenoid circuit are closed, the solenoid circuit switch is then operated to close the solenoid circuit and the solenoid for operating the solenoid controlled release of the coating devices becomes energized, permitting operation of the coating device.

13. A device in accordance with claim 12 in which said other coating devices have demountable means for producing patterns; a switch operable to closed position when said demountable means is in position for a coating operation, the contacts of said switch being connected in the clutch activating solenoid of said coating device; said switch being disposed to retain said contacts in open position and the solenoid inactive when the demountable means are not in position for coating and to retain the contacts closed when the demountable means are in position for coating.

14. A device in accordance with claim 12 in which the circuits containing the clutch activating solenoids are parallel to each other and each such solenoid is in series with another pair of normally open contacts; a switch for opening and closing said last named contacts; the means for indexing the coating conveyor from which the depositories are finally discharged having a cam operable to open and close said switch; said cam and switch being disposed to maintain said contacts in open position for preventing operation of said coating device when the conveyor is being indexed.

15. A device in accordance wits claim 12 in which said other coating devices comprise means for depositing three different coatings on the depositories which are traversed over one of the conveyors and in which the means for controlling said other coating devices for depositing said different coatings on the depositories during different traverses of the depositories on the conveyor comprises a cycle control device having a circuit transfer cam; a circuit transfer switch operable to connect a master solenoid circuit of the second coating device to the source of power whilst disconnecting the master solenoid circuit of the third master solenoid and to be returned to its original position all by the operation of a circuit transfer cam; said cycle control device comprising a transfer cam, a circuit containing a solenoid for indexing the cam, and a switch located for engaging the master depository for closing the solenoid circuit, said switch being located so as to be operated after the depository has passed the third coating station and before the depository has been transferred from said coating conveyor to a drying conveyor, said indexing means and cam being arranged to return said circuit transfer switch to close the circuit of the third master solenoid and open the circuit of said second master solenoid upon the indexing of said cam after the last operation of said second coating device and before the coated depository has transferred to the drying conveyor.

16. A device in accordance with claim 12 in which said other coating devices comprise means for depositing three different coatings on the depositories which are traversed over one of the conveyors and in which the means for controlling said other coating devices for depositing said different coatings on the depositories during different traverses of the depositories on the conveyor comprises a cycle control device; said cycle control device having a transfer solenoid; a transfer solenoid circuit having a transfer solenoid circuit switch for opening and closing the connection with a source of power; a cam for operating the transfer solenoid circuit switch; means for indexing said cam into position to open and close said circuit; said indexing means comprising a circuit containing an indexing solenoid and a switch located for engaging the master depository for closing the circuit of the indexing solenoid, said switch being located to close the indexing solenoid circuit for operating the indexing device and opening the transfer solenoid circuit after said first coating device on said conveyor has operated and before the depository is transferred from said conveyor to a drying conveyor, and again to energize said solenoid for indexing said cam and transfer switch to closed position after the last coating is disposed on the depository and before the depository is transferred to a drying conveyor.

17. A device in accordance with claim 12 which comprises a cycle control device having means for preventing the transfer of the depository to a drying conveyor after the last coating is applied thereto, and means for cutting the composite coatings on the depositories into units of predetermined shape.

18. A device in accordance with claim 12 which comprises a cycle control device having means for preventing the transfer of the depository to a drying conveyor after the last coating is applied thereto, and means for discharging the depositories from the last coating conveyor after the last coating is applied thereto.

19. A device in accordance with claim 12 in which the means for indexing said coating conveyors includes a driving motor having a starter device, said starter device comprising a circuit having a manually operated switch for closing the circuit to a source of power, a series connected holding relay energized when the manually operated switch is closed and a manually operated means for opening the circuit of said relay, said holding relay being operable to close a plurality of circuits including a parallel connected holding circuit for maintaining the supply of power to the series connected holding relay when the manually operated switch is opened, a supply circuit for supplying heaters for the driers, a circuit directly connecting said motor to a source of power and another relay circuit, said other relay circuit containing a third relay having contacts in the circuit of a valve operating solenoid, said solenoid being operable when deenergized to stop the operation of a spray coating device for depositing a coating on the depositories; whereby upon the breaking of said starter circuit of said motor, said drier heaters and said spray coating device become inoperative.

20. A device of the kind described comprising depositories upon which a plurality of coatings of material are to be deposited, a plurality of coating conveyors and a plurality of drying conveyors for transporting the depositories, said conveyors being arranged alternately in a closed cycle with the drying conveyors disposed to receive the depositories from a coating conveyor and deliver them to the next alternately arranged coating conveyor, means for indexing each of said coating conveyors in a series of movements separated by dwells, means located at transfer stations for transferring depositories from each conveyor to the next succeeding conveyor during dwells of the coating conveyors, a plurality of means for depositing coatings on the depositories as the depositories are transported by different conveyors, one of said conveyors being a spray conveyor and the coating means for producing a coating on the depositories transported by said conveyor comprising a spraying device for spraying a layer of coating material on the depositories, said spraying device having a gas pressure supply line for supplying gas under pressure for spraying and a solenoid controlled shut-off valve for initiating and discontinuing said supply of gas, said shut-off valve having a solenoid, a circuit connected to a source of power in series with said solenoid, a normally open plate switch having means for engaging the depositories and closing the switch before the plates have been transported into coating position, a circuit containing said plate switch, a time delay switch in said circuit having a solenoid for closing normally open contacts in a control relay circuit, means for delaying said closing a predetermined time after the plate switch is closed, said control relay circuit having a control relay for opening and closing other contacts in the circuit of said gas shut-off valve solenoid; whereby upon the closing of said plate switch by a continuous series of advancing depositories the energization of said control relay and the operation of said gas shutoff valve solenoid for enabling the operation of said spraying device is delayed a predetermined time after the plate switch is closed, and whereby the operation of said spraying device is discontinued when the plate switch is momentarily opened by a discontinuance in series of advance depositories.

21. A device of the kind described comprising depositories upon which a plurality of coatings of material are to be deposited, a plurality of coating conveyors and a plurality of drying conveyors for transporting the depositories, said conveyors being arranged alternately in a closed cycle with the drying conveyors disposed to receive the depositories from a coating conveyor and deliver them to the next alternately arranged coating conveyor, means for indexing each of said coating conveyors in a series of movements separated by dwells, one of said conveyors being a spray coating conveyor, said means for indexing said spray coating conveyor comprising a Geneva gear for indexing the same in a series of movements separated by short dwells, each of which series is separated by a long dwell, a spraying device for spraying a coating of material on said depositories, said spraying device being provided with means for passing it transversely across the line of travel of the spray conveyor while spraying said material; and means for discontinuing the operation of said spraying device during a part of said long dwell which comprises a solenoid operated valve for discontinuing the supply of gas under pressure for operating the spraying device, said valve having a solenoid operator connected across a power line and having therein a pair of contacts in series with said solenoid and in parallel with each other so that the solenoid circuit will remain unbroken and operating gas will continue to be supplied to the spraying device as long as one of said contacts is closed, and said gas will be discontinued for stopping the operation of the spraying device when both of said contacts are simultaneously open, means for opening one of said parallel contacts which comprises a cam operated switch, a cam driven directly by said Geneva gear, said cam being arranged to open one pair of said contacts after the spraying device has passed transversely across the spray conveyor once after the start of said long dwell and to permit said contacts to close again at the end of said long dwell, and means for opening the other of said parallel contacts which includes a cam for operating a corresponding switch, means for operating said cam switch and contacts a plurality of times during one complete operation of said first named cam, one of said operations being effective to open said other contacts coincidentally with said first named contacts; whereby the spraying device is made inoperative to deposit coating material during all traverses of the device across the depositories during said long dwell, except the first traverse thereof.

22. A device in accordance with claim 12 in which the means for indexing said coating conveyors includes a driving motor having a starter device, a branch power line across which said starter device is connected, means for connecting the branch power line to a source of power, a safety relay circuit connected across said branch circuit, a safety relay in said safety relay circuit, said starting device comprising a starter circuit having in series therein a holding relay which is energized when the driving motor is normally driving the coating conveyors, safety relay contacts in said safety relay operable to open and close said starter circuit, said safety relay being operable to close said safety relay contacts when said branch power line is connected to the source of power and to open said relay contacts and stop the motor when the safety relay circuit is broken.

EDGAR H. SCHMIDT.

No references cited.